(12) United States Patent
Onyon et al.

(10) Patent No.: US 8,611,873 B2
(45) Date of Patent: Dec. 17, 2013

(54) ADVANCED CONTACT IDENTIFICATION SYSTEM

(75) Inventors: Richard Onyon, San Jose, CA (US);
Liam Stannard, San Jose, CA (US);
Leighton Ridgard, San Jose, CA (US)

(73) Assignee: Synchronoss Technologies, Inc., Bridgewater, NJ (US)

( * ) Notice: Subject to any disclaimer, the term of this patent is extended or adjusted under 35 U.S.C. 154(b) by 0 days.

(21) Appl. No.: 11/128,121

(22) Filed: May 12, 2005

(65) Prior Publication Data

US 2006/0052091 A1 Mar. 9, 2006

Related U.S. Application Data

(60) Provisional application No. 60/570,409, filed on May 12, 2004.

(51) Int. Cl.
*H04M 3/42* (2006.01)
(52) U.S. Cl.
USPC ........... 455/415; 455/461; 370/331; 370/328; 370/392; 379/88.13; 379/201.02
(58) Field of Classification Search
USPC ........... 455/411, 415, 458, 456.1, 456.3, 418, 455/414.1, 566, 518, 519, 567, 413
See application file for complete search history.

(56) References Cited

U.S. PATENT DOCUMENTS

| | | | |
|---|---|---|---|
| 4,887,212 A | 12/1989 | Zamora et al. | 364/419 |
| 5,111,398 A | 5/1992 | Nunberg et al. | 364/419 |
| 5,115,466 A | 5/1992 | Presttun | |
| 5,130,993 A | 7/1992 | Gutman et al. | 371/42 |
| 5,146,221 A | 9/1992 | Whiting et al. | 341/67 |
| 5,204,902 A | 4/1993 | Reeds et al. | |
| 5,329,619 A | 7/1994 | Page et al. | 395/200 |
| 5,392,390 A | 2/1995 | Crozier | 395/161 |
| 5,418,854 A | 5/1995 | Kaufman et al. | 713/156 |
| 5,418,908 A | 5/1995 | Keller et al. | 395/200 |
| 5,425,079 A | 6/1995 | Noda et al. | |
| 5,483,352 A | 1/1996 | Fukuyama et al. | 358/402 |
| 5,485,161 A | 1/1996 | Vaughn | 342/357.13 |
| 5,509,070 A | 4/1996 | Schull | |
| 5,519,433 A | 5/1996 | Lappington et al. | 725/110 |
| 5,519,606 A | 5/1996 | Frid-Nielsen et al. | 364/401 |

(Continued)

FOREIGN PATENT DOCUMENTS

| | | |
|---|---|---|
| CN | 1202662 | 12/1998 |
| CN | 1455522 | 11/2003 |

(Continued)

OTHER PUBLICATIONS

Final Office Action mailed Mar. 9, 2010 in U.S. Appl. No. 11/437,554, 20 pgs.

(Continued)

*Primary Examiner* — Nimesh Patel
(74) *Attorney, Agent, or Firm* — Haverstock & Owens LLP

(57) ABSTRACT

A system and method of advanced identification information to be created and distributed to users of wireless communication devices, such as mobile phones. Subscribers can define their own personas as collections of information which define the users. Subscribers can then publish their persona(s) to their friends' and associates' mobile phones, and update the others' address books with the subscriber's contact information. Users can specify different personas to be presented to different users.

13 Claims, 29 Drawing Sheets

(56) References Cited

U.S. PATENT DOCUMENTS

| | | | |
|---|---|---|---|
| 5,543,789 A | 8/1996 | Behr et al. .................... 340/995 |
| 5,544,061 A | 8/1996 | Morimoto et al. ............ 340/995 |
| 5,561,446 A | 10/1996 | Montlick ..................... 345/173 |
| 5,574,906 A | 11/1996 | Morris ......................... 395/601 |
| 5,579,489 A | 11/1996 | Dornier et al. |
| 5,588,009 A | 12/1996 | Will .............................. 371/33 |
| 5,592,470 A | 1/1997 | Rudrapatna et al. |
| 5,623,406 A | 4/1997 | Ichbiah ................ 364/999.999 |
| 5,623,661 A | 4/1997 | Hon ............................ 395/601 |
| 5,628,005 A | 5/1997 | Hurvig ........................ 395/608 |
| 5,630,081 A | 5/1997 | Rybicki et al. ............... 395/348 |
| 5,638,508 A | 6/1997 | Kanai et al. .................... 714/20 |
| 5,640,577 A | 6/1997 | Scharmer .................... 395/765 |
| 5,644,709 A | 7/1997 | Austin |
| 5,647,002 A | 7/1997 | Brunson ....................... 380/49 |
| 5,649,195 A | 7/1997 | Scott et al. ................... 395/617 |
| 5,650,800 A | 7/1997 | Benson |
| 5,657,372 A | 8/1997 | Ahlberg |
| 5,666,397 A | 9/1997 | Lamons et al. |
| 5,666,553 A | 9/1997 | Crozier ........................ 395/803 |
| 5,682,524 A | 10/1997 | Freund et al. ................ 395/605 |
| 5,684,990 A | 11/1997 | Boothby ...................... 395/619 |
| 5,694,596 A | 12/1997 | Campbell .................... 395/610 |
| 5,699,255 A | 12/1997 | Ellis et al. .................... 701/212 |
| 5,701,423 A | 12/1997 | Crozier ........................ 395/335 |
| 5,706,509 A | 1/1998 | Man-Hak Tso .............. 395/617 |
| 5,710,922 A | 1/1998 | Alley et al. .................. 395/617 |
| 5,727,202 A | 3/1998 | Kucala ......................... 395/610 |
| 5,727,950 A | 3/1998 | Cook et al. .................. 434/350 |
| 5,729,735 A | 3/1998 | Meyering .................... 395/610 |
| 5,729,739 A | 3/1998 | Cantin et al. ................ 395/614 |
| 5,729,743 A | 3/1998 | Squibb ......................... 395/619 |
| 5,742,792 A | 4/1998 | Yanai et al. .................. 395/489 |
| 5,745,750 A | 4/1998 | Porcaro ........................ 707/102 |
| 5,745,906 A | 4/1998 | Squibb ......................... 707/203 |
| 5,757,920 A | 5/1998 | Misra et al. .................... 380/25 |
| 5,758,150 A | 5/1998 | Bell et al. .................... 395/610 |
| 5,758,354 A | 5/1998 | Huang et al. |
| 5,758,355 A | 5/1998 | Buchanan .................... 707/201 |
| 5,764,899 A | 6/1998 | Eggleston et al. ........... 709/203 |
| 5,768,480 A | 6/1998 | Crawford, Jr. et al. |
| 5,768,597 A | 6/1998 | Simm .......................... 395/712 |
| 5,771,354 A | 6/1998 | Crawford ................ 395/200.59 |
| 5,778,346 A | 7/1998 | Frid-Nielsen et al. ........... 705/9 |
| 5,778,361 A | 7/1998 | Nanjo et al. ................. 707/500 |
| 5,778,367 A | 7/1998 | Wesinger et al. .............. 395/10 |
| 5,778,388 A | 7/1998 | Kawamura et al. .......... 707/203 |
| 5,781,901 A | 7/1998 | Kuzma ........................... 707/10 |
| 5,787,247 A | 7/1998 | Norin et al. ............... 395/200.5 |
| 5,787,262 A | 7/1998 | Shakib et al. ............ 395/200.35 |
| 5,794,228 A | 8/1998 | French et al. .................. 707/2 |
| 5,804,803 A | 9/1998 | Cragun et al. ................ 235/375 |
| 5,809,497 A | 9/1998 | Freund et al. .................. 707/2 |
| 5,812,773 A | 9/1998 | Norin ...................... 395/200.34 |
| 5,812,793 A | 9/1998 | Shakib et al. ............ 395/200.31 |
| 5,818,437 A | 10/1998 | Grover et al. ................. 345/811 |
| 5,826,245 A | 10/1998 | Sandberg-Diment ........... 705/44 |
| 5,828,376 A | 10/1998 | Solimene et al. |
| 5,832,489 A | 11/1998 | Kucala .......................... 707/10 |
| 5,832,518 A | 11/1998 | Mastors ...................... 707/202 |
| 5,832,519 A | 11/1998 | Bowen et al. ............... 707/203 |
| 5,832,520 A | 11/1998 | Miller |
| 5,845,283 A | 12/1998 | Williams et al. ............. 707/101 |
| 5,859,973 A | 1/1999 | Carpenter ................ 395/200.33 |
| 5,864,864 A | 1/1999 | Lerner ......................... 707/102 |
| 5,875,296 A | 2/1999 | Shi et al. .................. 395/188.01 |
| 5,884,323 A | 3/1999 | Hawkins et al. ............. 707/201 |
| 5,884,325 A | 3/1999 | Bauer et al. ................. 707/201 |
| 5,893,119 A | 4/1999 | Squibb ........................ 707/203 |
| 5,896,321 A | 4/1999 | Miller .................... 365/189.01 |
| 5,897,640 A | 4/1999 | Veghte et al. ............... 707/202 |
| 5,897,642 A | 4/1999 | Capossela et al. ........... 707/203 |
| 5,903,723 A | 5/1999 | Beck et al. .................. 709/203 |
| 5,907,793 A | 5/1999 | Reams .......................... 455/3.1 |
| 5,909,568 A | 6/1999 | Nason |
| 5,923,756 A | 7/1999 | Shambroom ................ 713/156 |
| 5,923,848 A | 7/1999 | Goodhand et al. ........ 395/200.49 |
| 5,926,816 A | 7/1999 | Bauer et al. ..................... 707/8 |
| 5,933,653 A | 8/1999 | Ofek ............................ 395/826 |
| 5,933,778 A | 8/1999 | Buhrmann et al. |
| 5,933,816 A | 8/1999 | Zeanah et al. ................. 705/35 |
| 5,935,262 A | 8/1999 | Barrett et al. .................. 714/46 |
| 5,937,405 A | 8/1999 | Campbell ....................... 707/10 |
| 5,941,944 A | 8/1999 | Messerly ..................... 709/203 |
| 5,943,676 A | 8/1999 | Boothby ...................... 707/201 |
| 5,944,787 A | 8/1999 | Zoken .......................... 709/206 |
| 5,946,615 A | 8/1999 | Holmes et al. ............... 455/412 |
| 5,948,066 A | 9/1999 | Whalen et al. .............. 709/229 |
| 5,950,193 A | 9/1999 | Kulkarni |
| 5,951,636 A | 9/1999 | Zerber .......................... 709/202 |
| 5,961,572 A | 10/1999 | Craport et al. ............... 340/990 |
| 5,961,590 A | 10/1999 | Mendez et al. .............. 709/206 |
| 5,966,717 A | 10/1999 | Sass |
| 5,968,131 A | 10/1999 | Mendez et al. .............. 709/246 |
| 5,970,149 A | 10/1999 | Johnson ......................... 714/46 |
| 5,970,490 A | 10/1999 | Morgenstern ................. 707/10 |
| 5,971,277 A | 10/1999 | Cragun et al. ........... 235/462.01 |
| 5,974,238 A | 10/1999 | Chase, Jr. ................ 395/200.78 |
| 5,974,563 A | 10/1999 | Beeler, Jr. ........................ 714/5 |
| 5,987,381 A | 11/1999 | Oshizawa .................... 340/990 |
| 5,987,609 A | 11/1999 | Hasebe ........................ 713/200 |
| 5,995,118 A | 11/1999 | Masuda ....................... 345/467 |
| 6,000,000 A | 12/1999 | Hawkins et al. ............. 707/201 |
| 6,006,215 A | 12/1999 | Retallick ......................... 707/2 |
| 6,006,274 A | 12/1999 | Hawkins et al. ............. 709/248 |
| 6,009,462 A | 12/1999 | Birrell et al. ................. 709/206 |
| 6,012,063 A | 1/2000 | Bodnar ......................... 707/101 |
| 6,012,088 A | 1/2000 | Li et al. ........................ 709/219 |
| 6,014,695 A | 1/2000 | Yamashita et al. ........... 709/219 |
| 6,016,394 A | 1/2000 | Walker ......................... 717/104 |
| 6,016,478 A | 1/2000 | Zhang et al. ..................... 705/9 |
| 6,023,620 A | 2/2000 | Harisson |
| 6,023,708 A | 2/2000 | Mendez et al. .............. 707/203 |
| 6,023,723 A | 2/2000 | McCormick et al. ......... 709/206 |
| 6,026,414 A | 2/2000 | Anglin ......................... 707/204 |
| 6,034,621 A | 3/2000 | Kaufman ................ 340/825.44 |
| 6,038,665 A | 3/2000 | Bolt et al. .................... 713/176 |
| 6,044,381 A | 3/2000 | Boothby et al. .............. 707/201 |
| 6,049,776 A | 4/2000 | Donnelly et al. ................ 705/8 |
| 6,052,735 A | 4/2000 | Ulrich et al. ................. 709/236 |
| 6,058,399 A | 5/2000 | Morag et al. ................. 707/201 |
| 6,061,790 A | 5/2000 | Bodnar ......................... 713/171 |
| 6,061,796 A | 5/2000 | Chen et al. ................... 713/201 |
| 6,063,134 A | 5/2000 | Peters et al. |
| 6,064,880 A | 5/2000 | Alanara ........................ 455/419 |
| 6,065,018 A | 5/2000 | Beier et al. ................... 707/202 |
| 6,067,582 A | 5/2000 | Smith et al. |
| 6,073,133 A | 6/2000 | Chrabaszcz .................... 707/10 |
| 6,076,109 A | 6/2000 | Kikinis ........................ 709/228 |
| 6,078,960 A | 6/2000 | Ballard ........................ 709/229 |
| 6,081,900 A | 6/2000 | Subramaniam et al. ........ 713/201 |
| 6,094,618 A | 7/2000 | Harada ......................... 701/207 |
| 6,101,480 A | 8/2000 | Conmy et al. .................... 705/9 |
| 6,108,330 A | 8/2000 | Bhatia et al. ................. 370/352 |
| 6,108,703 A | 8/2000 | Leighton et al. ............. 709/226 |
| 6,112,024 A | 8/2000 | Almond et al. |
| 6,115,797 A | 9/2000 | Kanda et al. |
| 6,131,096 A | 10/2000 | Ng et al. ........................ 707/10 |
| 6,131,116 A | 10/2000 | Riggins et al. ............... 709/219 |
| 6,141,011 A | 10/2000 | Bodnar et al. ................ 345/357 |
| 6,141,621 A | 10/2000 | Piwowarski et al. .......... 340/989 |
| 6,141,659 A | 10/2000 | Barker et al. ................ 707/102 |
| 6,141,664 A | 10/2000 | Boothby ...................... 707/201 |
| 6,145,088 A | 11/2000 | Stevens |
| 6,148,260 A | 11/2000 | Musk et al. .................. 701/200 |
| 6,151,606 A | 11/2000 | Mendez ....................... 707/201 |
| 6,157,630 A | 12/2000 | Adler et al. .................. 370/310 |
| 6,163,773 A | 12/2000 | Kishi ............................. 706/16 |
| 6,163,779 A | 12/2000 | Mantha et al. ............... 707/100 |
| 6,163,844 A | 12/2000 | Duncan et al. ............... 713/201 |
| 6,167,120 A | 12/2000 | Kikinis ..................... 379/90.01 |
| 6,173,310 B1 | 1/2001 | Yost et al. .................... 709/201 |
| 6,173,311 B1 | 1/2001 | Hassett et al. ............... 709/202 |
| 6,182,117 B1 | 1/2001 | Christie et al. ............... 709/205 |

(56) References Cited

U.S. PATENT DOCUMENTS

| | | | |
|---|---|---|---|
| 6,182,141 B1 | 1/2001 | Blum et al. ................... 709/227 |
| 6,185,598 B1 | 2/2001 | Farber et al. .................. 709/200 |
| 6,189,030 B1 | 2/2001 | Kirsch et al. ................. 709/224 |
| 6,189,096 B1 | 2/2001 | Haverty ....................... 713/155 |
| 6,195,695 B1 | 2/2001 | Cheston et al. ............... 709/221 |
| 6,195,794 B1 | 2/2001 | Buxton .......................... 717/11 |
| 6,202,085 B1 | 3/2001 | Benson et al. ................. 709/205 |
| 6,205,448 B1 | 3/2001 | Kruglikov et al. ............. 707/200 |
| 6,209,034 B1 | 3/2001 | Gladwin et al. |
| 6,212,529 B1 | 4/2001 | Boothby et al. ............... 707/201 |
| 6,212,556 B1 | 4/2001 | Arunachalam |
| 6,216,131 B1 | 4/2001 | Liu et al. ...................... 707/102 |
| 6,219,680 B1 | 4/2001 | Bernardo et al. .............. 707/501 |
| 6,219,694 B1 | 4/2001 | Lazaridis et al. .............. 709/206 |
| 6,223,187 B1 | 4/2001 | Boothby et al. ............... 707/201 |
| 6,226,650 B1 | 5/2001 | Mahajan et al. ............... 707/201 |
| 6,233,565 B1 | 5/2001 | Lewis et al. .................... 705/35 |
| 6,233,589 B1 | 5/2001 | Balcha et al. .................. 707/203 |
| 6,243,760 B1 | 6/2001 | Armbruster et al. .......... 709/243 |
| 6,246,889 B1 | 6/2001 | Boltz |
| 6,247,048 B1 | 6/2001 | Greer et al. .................... 709/219 |
| 6,247,135 B1 | 6/2001 | Feague ........................... 713/400 |
| 6,249,690 B1 | 6/2001 | Mashiko |
| 6,252,547 B1 | 6/2001 | Perry et al. ................ 342/357.06 |
| 6,255,989 B1 | 7/2001 | Munson et al. ........... 342/357.13 |
| 6,256,750 B1 | 7/2001 | Takeda ............................ 714/11 |
| 6,260,124 B1 | 7/2001 | Crockett et al. ............... 711/162 |
| 6,272,545 B1 | 8/2001 | Flanagin et al. .............. 709/228 |
| 6,275,831 B1 | 8/2001 | Bodnar et al. ................. 707/201 |
| 6,278,941 B1 | 8/2001 | Yokoyama .................... 701/209 |
| 6,282,435 B1 | 8/2001 | Wagner et al. ................ 455/566 |
| 6,282,698 B1 | 8/2001 | Baker et al. ..................... 717/1 |
| 6,285,889 B1 | 9/2001 | Nykanen et al. .............. 455/557 |
| 6,286,029 B1 | 9/2001 | Delph |
| 6,286,053 B1 | 9/2001 | Van Peursem et al. 709/999.999 |
| 6,286,085 B1 | 9/2001 | Jouenne et al. ............... 711/162 |
| 6,289,212 B1 | 9/2001 | Stein et al. |
| 6,292,743 B1 | 9/2001 | Pu et al. ........................ 455/456 |
| 6,292,905 B1 | 9/2001 | Wallach et al. .................. 714/4 |
| 6,295,502 B1 | 9/2001 | Hancock et al. .............. 701/201 |
| 6,295,541 B1 | 9/2001 | Bodnar et al. ................. 707/203 |
| 6,304,881 B1 | 10/2001 | Halim et al. .................. 707/201 |
| 6,317,755 B1 | 11/2001 | Rakers et al. |
| 6,321,236 B1 | 11/2001 | Zollinger et al. ............. 707/201 |
| 6,324,467 B1 | 11/2001 | Machii et al. ................. 701/200 |
| 6,324,526 B1 | 11/2001 | D'Agostino ................... 705/44 |
| 6,324,544 B1 | 11/2001 | Alam et al. ................... 707/201 |
| 6,327,533 B1 | 12/2001 | Chou ............................. 340/988 |
| 6,329,680 B1 | 12/2001 | Yoshida et al. ............... 257/296 |
| 6,330,568 B1 | 12/2001 | Boothby et al. ............... 707/201 |
| 6,332,158 B1 | 12/2001 | Risley et al. .................. 709/219 |
| 6,333,973 B1 | 12/2001 | Smith et al. ................. 379/88.12 |
| 6,338,096 B1 | 1/2002 | Ukelson ....................... 719/319 |
| 6,339,710 B1 | 1/2002 | Suzuki .......................... 455/458 |
| 6,341,316 B1 | 1/2002 | Kloba et al. .................. 709/248 |
| 6,345,308 B1 | 2/2002 | Abe .............................. 709/248 |
| 6,349,336 B1 | 2/2002 | Sit et al. |
| 6,353,448 B1 | 3/2002 | Scarborough et al. ........ 345/349 |
| 6,356,910 B1 | 3/2002 | Zellweger ..................... 707/100 |
| 6,356,961 B1 | 3/2002 | Oprescu-Surcobe |
| 6,360,252 B1 | 3/2002 | Rudy et al. ................... 709/206 |
| 6,360,330 B1 | 3/2002 | Mutalik et al. ................. 714/4 |
| 6,363,249 B1 | 3/2002 | Nordeman et al. ........... 455/418 |
| 6,363,412 B1 | 3/2002 | Niwa et al. .................... 709/203 |
| 6,374,250 B2 | 4/2002 | Ajtai et al. .................... 707/101 |
| 6,381,700 B1 | 4/2002 | Yoshida ........................ 713/201 |
| 6,389,462 B1 | 5/2002 | Cohen et al. .................. 709/218 |
| 6,396,482 B1 | 5/2002 | Griffin et al. ................. 345/169 |
| 6,397,307 B2 | 5/2002 | Ohran ........................... 711/161 |
| 6,397,351 B1 | 5/2002 | Miller et al. .................. 714/13 |
| 6,401,104 B1 | 6/2002 | LaRue et al. .................. 707/203 |
| 6,405,218 B1 | 6/2002 | Boothby ........................ 707/201 |
| 6,418,309 B1 | 7/2002 | Moon et al. ................... 455/418 |
| 6,430,289 B1 * | 8/2002 | Liffick .......................... 370/352 |
| 6,434,627 B1 | 8/2002 | Millet et al. ................... 709/245 |
| 6,437,818 B1 | 8/2002 | Ludwig et al. ............. 348/14.09 |
| 6,449,622 B1 | 9/2002 | LaRue et al. .................. 707/201 |
| 6,453,392 B1 | 9/2002 | Flynn, Jr. ...................... 711/151 |
| 6,457,062 B1 | 9/2002 | Pivowar et al. ............... 709/248 |
| 6,460,036 B1 | 10/2002 | Herz ............................... 707/10 |
| 6,462,644 B1 | 10/2002 | Howell et al. |
| 6,463,464 B1 | 10/2002 | Lazaridis et al. .............. 709/207 |
| 6,466,967 B2 | 10/2002 | Landsman et al. ............ 709/203 |
| 6,473,621 B1 | 10/2002 | Heie .............................. 455/466 |
| 6,480,896 B1 | 11/2002 | Brown et al. .................. 709/231 |
| 6,484,143 B1 | 11/2002 | Swildens et al. ................ 705/1 |
| 6,487,560 B1 | 11/2002 | LaRue et al. .................. 707/203 |
| 6,490,655 B1 | 12/2002 | Kershaw ....................... 711/151 |
| 6,496,944 B1 | 12/2002 | Hsiao et al. ..................... 714/15 |
| 6,499,108 B1 | 12/2002 | Johnson ........................ 713/201 |
| 6,505,216 B1 | 1/2003 | Schutzman et al. |
| 6,507,891 B1 | 1/2003 | Challenger et al. ........... 711/122 |
| 6,516,314 B1 | 2/2003 | Birkler et al. |
| 6,516,327 B1 | 2/2003 | Zondervan et al. ........... 707/200 |
| 6,519,452 B1 | 2/2003 | Agostino et al. |
| 6,523,063 B1 | 2/2003 | Hanson ......................... 709/206 |
| 6,523,079 B2 | 2/2003 | Kikinis et al. ................. 710/303 |
| 6,532,588 B1 | 3/2003 | Porter |
| 6,535,743 B1 | 3/2003 | Kennedy et al. ........... 455/456.1 |
| 6,535,949 B1 | 3/2003 | Parker |
| 6,539,494 B1 | 3/2003 | Abramson et al. ................ 714/4 |
| 6,542,933 B1 | 4/2003 | Durst, Jr. et al. .............. 709/229 |
| 6,546,425 B1 | 4/2003 | Hanson et al. ................ 709/227 |
| 6,549,933 B1 | 4/2003 | Barrett et al. .................. 709/203 |
| 6,553,375 B1 | 4/2003 | Huang et al. .................... 707/10 |
| 6,553,410 B2 | 4/2003 | Kikinis ......................... 709/218 |
| 6,553,413 B1 | 4/2003 | Lewin et al. .................. 709/219 |
| 6,564,336 B1 | 5/2003 | Majkowski |
| 6,567,850 B1 | 5/2003 | Freishtat et al. .............. 709/224 |
| 6,567,857 B1 | 5/2003 | Gupta et al. |
| 6,581,065 B1 | 6/2003 | Rodkin et al. ................. 707/102 |
| 6,584,454 B1 | 6/2003 | Hummel et al. ................ 705/59 |
| 6,589,290 B1 | 7/2003 | Maxwell et al. .............. 707/507 |
| 6,591,266 B1 | 7/2003 | Li et al. .......................... 707/10 |
| 6,591,306 B1 | 7/2003 | Redlich ......................... 709/245 |
| 6,591,362 B1 | 7/2003 | Li .................................... 713/1 |
| 6,597,700 B2 | 7/2003 | Golikeri et al. ............... 370/401 |
| 6,601,143 B1 | 7/2003 | Lamparter |
| 6,609,005 B1 | 8/2003 | Chern ........................... 455/457 |
| 6,628,194 B1 | 9/2003 | Hellebust et al. |
| 6,636,894 B1 | 10/2003 | Short et al. .................... 709/225 |
| 6,640,302 B1 | 10/2003 | Subramaniam et al. ....... 713/169 |
| 6,643,707 B1 | 11/2003 | Booth ........................... 709/245 |
| 6,647,399 B2 | 11/2003 | Zaremba |
| 6,654,746 B1 | 11/2003 | Wong et al. .................... 707/10 |
| 6,662,212 B1 | 12/2003 | Chandhok et al. |
| 6,665,721 B1 | 12/2003 | Hind et al. |
| 6,668,254 B2 | 12/2003 | Matson et al. |
| 6,671,724 B1 | 12/2003 | Pandya et al. ................. 709/226 |
| 6,671,757 B1 | 12/2003 | Multer et al. ................. 710/100 |
| 6,684,206 B2 | 1/2004 | Chen et al. ...................... 706/61 |
| 6,684,302 B2 | 1/2004 | Kershaw ....................... 711/151 |
| 6,694,335 B1 | 2/2004 | Hopmann et al. ............. 707/200 |
| 6,694,336 B1 | 2/2004 | Multer et al. ................. 707/100 |
| 6,701,316 B1 | 3/2004 | Li et al. .......................... 707/10 |
| 6,704,849 B2 | 3/2004 | Steegmans ..................... 711/162 |
| 6,714,987 B1 | 3/2004 | Amin et al. ................... 709/249 |
| 6,718,336 B1 | 4/2004 | Saffer et al. |
| 6,718,348 B1 | 4/2004 | Novak et al. .................. 707/201 |
| 6,718,390 B1 | 4/2004 | Still et al. ..................... 709/229 |
| 6,725,239 B2 | 4/2004 | Sherman et al. .............. 707/201 |
| 6,728,530 B1 | 4/2004 | Heinonen et al. .......... 455/414.1 |
| 6,732,101 B1 | 5/2004 | Cook ............................. 707/10 |
| 6,732,264 B1 | 5/2004 | Sun et al. ........................ 713/2 |
| 6,738,789 B2 | 5/2004 | Multer et al. ................. 707/201 |
| 6,741,851 B1 | 5/2004 | Lee et al. |
| 6,745,040 B2 * | 6/2004 | Zimmerman ................. 455/458 |
| 6,757,696 B2 | 6/2004 | Multer et al. ................. 707/201 |
| 6,757,698 B2 | 6/2004 | Davidson et al. ............. 707/204 |
| 6,757,712 B1 | 6/2004 | Bastian et al. ................ 709/206 |
| 6,781,575 B1 | 8/2004 | Hawkins et al. .............. 345/173 |
| 6,795,848 B1 | 9/2004 | Border et al. .................. 709/213 |
| 6,799,214 B1 | 9/2004 | Li .................................. 709/226 |
| 6,804,690 B1 | 10/2004 | Dysert et al. .................. 707/204 |

(56) References Cited

U.S. PATENT DOCUMENTS

| | | | |
|---|---|---|---|
| 6,804,783 B1 | 10/2004 | Wesinger, Jr. et al. | 713/200 |
| 6,810,411 B1 | 10/2004 | Coughlin et al. | |
| 6,812,961 B1 | 11/2004 | Parulski et al. | 348/231.2 |
| 6,813,487 B1 | 11/2004 | Trommelen | |
| 6,816,481 B1 | 11/2004 | Adams et al. | 370/352 |
| 6,829,654 B1 | 12/2004 | Jungck | |
| 6,836,657 B2 | 12/2004 | Ji et al. | |
| 6,836,765 B1 | 12/2004 | Sussman | 705/41 |
| 6,839,022 B1 * | 1/2005 | Benco et al. | 342/357.43 |
| 6,839,568 B2 | 1/2005 | Suzuki | |
| 6,842,695 B1 | 1/2005 | Tu et al. | 701/213 |
| 6,850,944 B1 | 2/2005 | MacCall et al. | 707/100 |
| 6,868,451 B1 | 3/2005 | Peacock | 709/231 |
| 6,870,921 B1 | 3/2005 | Elsey et al. | 379/218.01 |
| 6,886,013 B1 | 4/2005 | Beranek | 707/10 |
| 6,892,225 B1 | 5/2005 | Tu et al. | 709/217 |
| 6,892,245 B1 | 5/2005 | Crump et al. | 709/245 |
| 6,904,449 B1 | 6/2005 | Quinones | |
| 6,904,460 B1 | 6/2005 | Raciborski et al. | 709/224 |
| 6,920,488 B1 | 7/2005 | Le Pennec et al. | 709/219 |
| 6,925,476 B1 | 8/2005 | Multer | 707/200 |
| 6,925,477 B1 | 8/2005 | Champagne et al. | 707/203 |
| 6,934,767 B1 | 8/2005 | Jellinek | 709/247 |
| 6,944,651 B2 | 9/2005 | Onyon et al. | 709/217 |
| 6,944,676 B1 | 9/2005 | Armbruster et al. | 709/243 |
| 6,954,660 B2 | 10/2005 | Aoyama | |
| 6,954,783 B1 | 10/2005 | Bodwell et al. | 709/218 |
| 6,959,331 B1 | 10/2005 | Traversat et al. | |
| 6,963,914 B1 | 11/2005 | Breitbart et al. | 709/226 |
| 6,973,299 B2 | 12/2005 | Apfel | |
| 6,975,709 B1 | 12/2005 | Wullert, II | |
| 6,996,617 B1 | 2/2006 | Aiken, Jr. et al. | |
| 6,996,631 B1 | 2/2006 | Aiken, Jr. et al. | 709/242 |
| 7,003,555 B1 | 2/2006 | Jungck | 709/219 |
| 7,003,668 B2 | 2/2006 | Berson et al. | 713/182 |
| 7,007,041 B2 | 2/2006 | Multer et al. | 707/201 |
| 7,010,578 B1 | 3/2006 | Lewin et al. | |
| 7,016,964 B1 | 3/2006 | Still et al. | |
| 7,023,868 B2 | 4/2006 | Rabenko et al. | 370/419 |
| 7,024,491 B1 | 4/2006 | Hanmann et al. | |
| 7,030,730 B1 | 4/2006 | Zondervan | |
| 7,035,878 B1 | 4/2006 | Multer et al. | 707/201 |
| 7,039,656 B1 | 5/2006 | Tsai et al. | 707/201 |
| 7,051,275 B2 | 5/2006 | Gupta et al. | 715/512 |
| 7,054,594 B2 | 5/2006 | Bloch et al. | 455/41.2 |
| 7,054,952 B1 | 5/2006 | Schwerdtfeger et al. | |
| 7,082,476 B1 | 7/2006 | Cohen et al. | |
| 7,085,817 B1 | 8/2006 | Tock et al. | |
| 7,096,418 B1 | 8/2006 | Singhal et al. | |
| 7,099,915 B1 | 8/2006 | Tenereillo et al. | |
| 7,103,794 B2 | 9/2006 | Malcolm et al. | |
| 7,107,043 B2 | 9/2006 | Aoyama | |
| 7,110,954 B1 | 9/2006 | Yung et al. | |
| 7,116,681 B1 | 10/2006 | Hovell et al. | 370/466 |
| 7,133,503 B2 | 11/2006 | Revisky | |
| 7,146,161 B2 | 12/2006 | Chou | |
| 7,158,805 B1 * | 1/2007 | Park et al. | 455/519 |
| 7,159,032 B2 | 1/2007 | Jim et al. | |
| 7,162,494 B2 * | 1/2007 | Arellano | 707/104.1 |
| 7,167,728 B1 | 1/2007 | Wagner et al. | 455/566 |
| 7,181,628 B2 | 2/2007 | Sato et al. | |
| 7,197,574 B1 | 3/2007 | Ishiyama | 709/245 |
| 7,233,791 B2 | 6/2007 | Gilbert et al. | 455/419 |
| 7,237,027 B1 | 6/2007 | Raccah et al. | |
| 7,249,175 B1 | 7/2007 | Donaldson | 709/225 |
| 7,269,433 B2 | 9/2007 | Vargas et al. | 455/502 |
| 7,284,051 B1 | 10/2007 | Okano et al. | 709/226 |
| 7,289,964 B1 | 10/2007 | Bowman-Amuah | 705/1 |
| 7,293,074 B1 | 11/2007 | Jellinek et al. | 709/205 |
| 7,308,651 B2 | 12/2007 | Kling et al. | |
| 7,315,826 B1 | 1/2008 | Guheen et al. | 705/7 |
| 7,317,907 B2 | 1/2008 | Linkert et al. | |
| 7,328,341 B1 | 2/2008 | Eun et al. | |
| 7,343,568 B2 | 3/2008 | Jiang et al. | |
| 7,349,719 B2 | 3/2008 | Buniatyan | |
| 7,356,559 B1 | 4/2008 | Jacobs et al. | 709/203 |
| 7,363,233 B1 | 4/2008 | Levine | 705/1 |
| 7,383,061 B1 | 6/2008 | Hawkins | |
| 7,392,034 B2 | 6/2008 | Westman et al. | 455/402 |
| 7,415,486 B2 | 8/2008 | Multer et al. | 709/201 |
| 7,440,746 B1 | 10/2008 | Swan | |
| 7,447,743 B1 | 11/2008 | Jordan, Jr. | 709/206 |
| 7,454,500 B1 | 11/2008 | Hsu et al. | 709/226 |
| 7,499,888 B1 | 3/2009 | Tu et al. | 705/44 |
| 7,505,762 B2 | 3/2009 | Onyon et al. | 455/419 |
| 7,519,702 B1 | 4/2009 | Allan | |
| 7,539,697 B1 | 5/2009 | Akella et al. | |
| 7,587,398 B1 | 9/2009 | Fredricksen et al. | |
| 7,596,609 B1 | 9/2009 | Refuah et al. | |
| 7,663,652 B1 | 2/2010 | Reese | |
| 7,707,150 B2 | 4/2010 | Sundararajan et al. | |
| 7,853,664 B1 | 12/2010 | Wang et al. | |
| 8,010,095 B2 | 8/2011 | Natsuno et al. | |
| 8,073,954 B1 | 12/2011 | Tu et al. | |
| 8,224,308 B1 | 7/2012 | Gavrylyako et al. | |
| 2001/0014893 A1 | 8/2001 | Boothby | 707/201 |
| 2001/0028363 A1 | 10/2001 | Nomoto et al. | |
| 2001/0034737 A1 | 10/2001 | Cane et al. | |
| 2001/0044805 A1 | 11/2001 | Multer et al. | 707/201 |
| 2001/0047471 A1 | 11/2001 | Johnson | 713/1 |
| 2001/0051920 A1 | 12/2001 | Joao et al. | 705/41 |
| 2001/0056473 A1 | 12/2001 | Arneson et al. | |
| 2002/0007303 A1 | 1/2002 | Brookler et al. | 705/10 |
| 2002/0010868 A1 | 1/2002 | Nakashima et al. | 713/201 |
| 2002/0016818 A1 | 2/2002 | Kirani et al. | 709/206 |
| 2002/0016912 A1 | 2/2002 | Johnson | 713/165 |
| 2002/0023136 A1 | 2/2002 | Silver et al. | |
| 2002/0032751 A1 | 3/2002 | Bharadwaj | 709/218 |
| 2002/0040369 A1 | 4/2002 | Multer et al. | 707/200 |
| 2002/0049852 A1 | 4/2002 | Lee et al. | 709/231 |
| 2002/0055909 A1 | 5/2002 | Fung et al. | 705/42 |
| 2002/0056011 A1 | 5/2002 | Nardone et al. | 709/248 |
| 2002/0059116 A1 | 5/2002 | Bulatovic et al. | 705/27 |
| 2002/0062365 A1 | 5/2002 | Nishikawa et al. | 709/223 |
| 2002/0067816 A1 * | 6/2002 | Bushnell | 379/201.02 |
| 2002/0069178 A1 | 6/2002 | Hoffman | |
| 2002/0072350 A1 | 6/2002 | Fukuzato | |
| 2002/0073212 A1 | 6/2002 | Sokol et al. | 709/229 |
| 2002/0078075 A1 | 6/2002 | Colson et al. | 707/204 |
| 2002/0082995 A1 | 6/2002 | Christie | 705/44 |
| 2002/0083325 A1 | 6/2002 | Mediratta et al. | 713/191 |
| 2002/0087588 A1 | 7/2002 | McBride et al. | |
| 2002/0091785 A1 | 7/2002 | Ohlenbusch et al. | 709/208 |
| 2002/0116444 A1 | 8/2002 | Chaudhri et al. | 709/201 |
| 2002/0118192 A1 | 8/2002 | Couckuyt et al. | |
| 2002/0120600 A1 | 8/2002 | Schiavone et al. | 707/1 |
| 2002/0126814 A1 | 9/2002 | Awada et al. | |
| 2002/0128908 A1 | 9/2002 | Levin et al. | 705/14 |
| 2002/0138582 A1 | 9/2002 | Chandra et al. | 709/206 |
| 2002/0138765 A1 | 9/2002 | Fishman et al. | 713/201 |
| 2002/0152278 A1 | 10/2002 | Pontenzone et al. | |
| 2002/0162011 A1 | 10/2002 | Tanaka et al. | 713/200 |
| 2002/0168964 A1 | 11/2002 | Kraft | |
| 2002/0168975 A1 | 11/2002 | Gresham et al. | |
| 2002/0194196 A1 | 12/2002 | Weinberg et al. | |
| 2003/0021274 A1 * | 1/2003 | Siikaniemi et al. | 370/392 |
| 2003/0028451 A1 | 2/2003 | Ananian | 705/27 |
| 2003/0028554 A1 | 2/2003 | Koskimies et al. | 707/201 |
| 2003/0028603 A1 | 2/2003 | Aktas et al. | |
| 2003/0028647 A1 | 2/2003 | Grosu | |
| 2003/0037020 A1 | 2/2003 | Novak et al. | 707/1 |
| 2003/0043195 A1 | 3/2003 | Kling et al. | |
| 2003/0046433 A1 | 3/2003 | Luzzatti et al. | |
| 2003/0061163 A1 | 3/2003 | Durfield | 705/44 |
| 2003/0065934 A1 | 4/2003 | Angelo et al. | 713/200 |
| 2003/0069874 A1 | 4/2003 | Hertzog et al. | 707/1 |
| 2003/0084121 A1 | 5/2003 | De Boor et al. | 709/218 |
| 2003/0093797 A1 | 5/2003 | Bazzaz | |
| 2003/0110280 A1 | 6/2003 | Hinchliffe et al. | |
| 2003/0115240 A1 | 6/2003 | Cho | |
| 2003/0134625 A1 | 7/2003 | Choi | 455/418 |
| 2003/0135463 A1 | 7/2003 | Brown et al. | 705/44 |
| 2003/0139172 A1 * | 7/2003 | Lampela et al. | 455/415 |
| 2003/0158960 A1 | 8/2003 | Engberg | |

(56) References Cited

U.S. PATENT DOCUMENTS

| | | |
|---|---|---|
| 2003/0163483 A1 | 8/2003 | Zingher et al. |
| 2003/0172236 A1 | 9/2003 | Iyengar et al. |
| 2003/0204568 A1 | 10/2003 | Bhargava et al. ............ 709/206 |
| 2003/0208546 A1 | 11/2003 | DeSalvo et al. ............. 709/206 |
| 2003/0217181 A1 | 11/2003 | Kiiskinen |
| 2003/0224760 A1 | 12/2003 | Day .......................... 455/412.1 |
| 2003/0229723 A1 | 12/2003 | Kangas et al. |
| 2003/0229898 A1 | 12/2003 | Babu et al. ....................... 725/87 |
| 2003/0233383 A1 | 12/2003 | Koskimies .................. 707/204 |
| 2003/0236933 A1 | 12/2003 | Shigeta et al. |
| 2004/0003390 A1 | 1/2004 | Canter et al. |
| 2004/0054746 A1 | 3/2004 | Shibata ........................ 709/207 |
| 2004/0058673 A1 | 3/2004 | Irlam et al. |
| 2004/0093317 A1 | 5/2004 | Swan ............................. 707/10 |
| 2004/0093342 A1 | 5/2004 | Arbo et al. ................... 707/102 |
| 2004/0093385 A1 | 5/2004 | Yamagata .................... 709/206 |
| 2004/0110497 A1 | 6/2004 | Little |
| 2004/0111465 A1 | 6/2004 | Chuang et al. ............... 709/203 |
| 2004/0120477 A1* | 6/2004 | Nguyen et al. ............. 379/88.19 |
| 2004/0128324 A1 | 7/2004 | Sheynman et al. |
| 2004/0132428 A1* | 7/2004 | Mulligan ...................... 455/411 |
| 2004/0142711 A1 | 7/2004 | Mahonen et al. ............. 455/502 |
| 2004/0146150 A1 | 7/2004 | Barnes |
| 2004/0148408 A1* | 7/2004 | Nadarajah .................... 709/229 |
| 2004/0162830 A1* | 8/2004 | Shirwadkar et al. ........... 707/10 |
| 2004/0192260 A1 | 9/2004 | Sugimoto et al. ........... 455/412.1 |
| 2004/0192282 A1 | 9/2004 | Vasudevan .................... 455/419 |
| 2004/0193953 A1 | 9/2004 | Callahan et al. ............... 714/15 |
| 2004/0204120 A1 | 10/2004 | Jiles |
| 2004/0224665 A1 | 11/2004 | Kokubo ......................... 455/411 |
| 2004/0235523 A1 | 11/2004 | Schrire et al. ................. 455/558 |
| 2004/0267390 A1 | 12/2004 | Ben-Yaacov et al. |
| 2004/0267676 A1 | 12/2004 | Feng et al. |
| 2004/0267944 A1 | 12/2004 | Britt ............................... 709/229 |
| 2005/0021571 A1 | 1/2005 | East ............................... 707/101 |
| 2005/0032527 A1 | 2/2005 | Sheha et al. ................. 455/456.1 |
| 2005/0038863 A1 | 2/2005 | Onyon et al. ................. 709/206 |
| 2005/0044404 A1 | 2/2005 | Bhansali et al. |
| 2005/0050117 A1 | 3/2005 | Seo et al. |
| 2005/0054354 A1 | 3/2005 | Roman et al. |
| 2005/0060392 A1 | 3/2005 | Goring et al. ................ 709/220 |
| 2005/0064859 A1 | 3/2005 | Kotzin et al. ................. 455/419 |
| 2005/0081152 A1 | 4/2005 | Commarford |
| 2005/0086296 A1 | 4/2005 | Chi et al. ...................... 709/203 |
| 2005/0086318 A1 | 4/2005 | Aubault ........................ 709/213 |
| 2005/0090253 A1 | 4/2005 | Kim et al. ................... 455/435.1 |
| 2005/0096975 A1 | 5/2005 | Moshe |
| 2005/0100150 A1* | 5/2005 | Dhara et al. ............. 379/142.01 |
| 2005/0102257 A1 | 5/2005 | Onyon et al. ................. 709/206 |
| 2005/0102328 A1 | 5/2005 | Ring et al. .................... 707/204 |
| 2005/0114470 A1 | 5/2005 | Bal |
| 2005/0131990 A1 | 6/2005 | Jewell ............................ 709/201 |
| 2005/0144200 A1 | 6/2005 | Hesselink et al. |
| 2005/0144251 A1 | 6/2005 | Slate |
| 2005/0157858 A1 | 7/2005 | Rajagopalan |
| 2005/0191998 A1 | 9/2005 | Onyon et al. |
| 2005/0203971 A1 | 9/2005 | Koskimies et al. ........... 707/203 |
| 2005/0203992 A1 | 9/2005 | Tanaka et al. |
| 2005/0204001 A1 | 9/2005 | Stein et al. .................... 709/206 |
| 2005/0210101 A1 | 9/2005 | Janik ............................. 709/203 |
| 2005/0216300 A1 | 9/2005 | Appelman et al. |
| 2005/0227674 A1 | 10/2005 | Kopra et al. |
| 2005/0233800 A1 | 10/2005 | Jones |
| 2005/0240494 A1 | 10/2005 | Cue et al. |
| 2005/0246325 A1 | 11/2005 | Pettinati |
| 2005/0273632 A1 | 12/2005 | Kawakami |
| 2005/0283741 A1 | 12/2005 | Balabanovic et al. |
| 2006/0021059 A1 | 1/2006 | Brown et al. ................... 726/26 |
| 2006/0035647 A1* | 2/2006 | Eisner et al. ................. 455/456.1 |
| 2006/0095397 A1 | 5/2006 | Torres et al. |
| 2006/0129627 A1 | 6/2006 | Phillips et al. |
| 2006/0190626 A1 | 8/2006 | Bhogal et al. ................ 709/248 |
| 2006/0199599 A1 | 9/2006 | Gupta et al. |
| 2006/0212482 A1 | 9/2006 | Celik |
| 2006/0233335 A1 | 10/2006 | Pfleging et al. |
| 2006/0268842 A1 | 11/2006 | Takahashi et al. |
| 2006/0288112 A1 | 12/2006 | Soelberg |
| 2007/0005504 A1 | 1/2007 | Chen et al. |
| 2007/0022469 A1 | 1/2007 | Cooper et al. |
| 2007/0043739 A1 | 2/2007 | Takai et al. |
| 2007/0047533 A1 | 3/2007 | Criddle et al. |
| 2007/0050734 A1 | 3/2007 | Busey ........................... 715/853 |
| 2007/0061331 A1 | 3/2007 | Ramer et al. .................... 707/10 |
| 2007/0082668 A1* | 4/2007 | Silver et al. ................. 455/432.3 |
| 2007/0094042 A1 | 4/2007 | Ramer et al. ....................... 705/1 |
| 2007/0127597 A1 | 6/2007 | Ammer et al. |
| 2007/0214149 A1 | 9/2007 | Bodin et al. |
| 2007/0220419 A1 | 9/2007 | Stibel et al. |
| 2007/0226272 A1* | 9/2007 | Huang et al. ................. 707/201 |
| 2007/0226783 A1 | 9/2007 | Mimlitsch |
| 2008/0005080 A1 | 1/2008 | Xiques et al. |
| 2008/0005282 A1 | 1/2008 | Gaedcke |
| 2008/0009268 A1 | 1/2008 | Ramer et al. |
| 2008/0022220 A1* | 1/2008 | Cheah .......................... 715/769 |
| 2008/0027826 A1 | 1/2008 | Popick et al. |
| 2008/0039020 A1* | 2/2008 | Eskin ............................. 455/41.2 |
| 2008/0051071 A1 | 2/2008 | Vishwanathan et al. |
| 2008/0051117 A1 | 2/2008 | Khare et al. |
| 2008/0059897 A1 | 3/2008 | Dilorenzo |
| 2008/0064378 A1 | 3/2008 | Kahan et al. |
| 2008/0089299 A1 | 4/2008 | Lindsley |
| 2008/0104442 A1 | 5/2008 | Diao et al. |
| 2008/0120199 A1 | 5/2008 | Pirnack et al. |
| 2008/0127289 A1 | 5/2008 | Julia et al. |
| 2008/0208617 A1 | 8/2008 | Onyon et al. |
| 2008/0214167 A1 | 9/2008 | Natsuno et al. |
| 2008/0268823 A1 | 10/2008 | Shalev et al. |
| 2008/0270805 A1 | 10/2008 | Kean |
| 2008/0294768 A1 | 11/2008 | Sampson et al. |
| 2009/0012940 A1 | 1/2009 | Ives et al. |
| 2009/0037828 A1 | 2/2009 | Waite et al. |
| 2009/0138546 A1 | 5/2009 | Cruzada |
| 2009/0327305 A1 | 12/2009 | Roberts et al. |
| 2010/0205448 A1 | 8/2010 | Tarhan et al. |
| 2010/0251230 A1 | 9/2010 | O'Farrell et al. |
| 2011/0107203 A1 | 5/2011 | Nash et al. |
| 2011/0269424 A1 | 11/2011 | Multer et al. |
| 2012/0151346 A1 | 6/2012 | McClements, IV |

FOREIGN PATENT DOCUMENTS

| | | |
|---|---|---|
| CN | 1313697 A | 2/2005 |
| CN | 2003-122958 | 7/2006 |
| EP | 0801487 A2 | 10/1997 |
| EP | 0 836 131 A2 | 4/1998 |
| EP | 0836301 A | 4/1998 |
| EP | 0924917 A2 | 6/1999 |
| EP | 0930593 A | 7/1999 |
| EP | 1024441 A2 | 2/2000 |
| EP | 0986225 A1 | 3/2000 |
| EP | 1139608 A2 | 10/2001 |
| EP | 1180890 A2 | 2/2002 |
| EP | 1263244 A2 | 4/2002 |
| FR | 1998-106683 | 4/1998 |
| GB | 2366050 A | 6/2001 |
| JP | 7303146 A | 11/1995 |
| JP | 10191453 | 7/1998 |
| JP | 11242620 | 9/1999 |
| JP | 11242677 | 9/1999 |
| JP | 2000232680 A | 8/2000 |
| JP | 2000316053 A | 11/2000 |
| JP | 2002142254 A | 5/2002 |
| JP | 2002185575 A | 6/2002 |
| JP | 2002247144 A | 8/2002 |
| JP | 2002314689 A | 10/2002 |
| JP | 2003259011 A | 9/2003 |
| WO | WO 97/04391 | 2/1997 |
| WO | WO 97/39564 | 10/1997 |
| WO | WO 97/41520 | 11/1997 |
| WO | WO 98/03005 | 1/1998 |
| WO | WO 98/21648 | 5/1998 |
| WO | WO 98/29994 A | 7/1998 |
| WO | WO 98/54662 | 12/1998 |
| WO | WO 98/56159 A | 12/1998 |

(56) References Cited

FOREIGN PATENT DOCUMENTS

| WO | WO 99/05813 | 2/1999 |
|---|---|---|
| WO | WO 99/06900 | 2/1999 |
| WO | WO 99/36870 | 7/1999 |
| WO | WO 99/40514 | 8/1999 |
| WO | WO 99/45451 | 9/1999 |
| WO | WO 99/45484 | 9/1999 |
| WO | WO 99/46701 A | 9/1999 |
| WO | WO 99/50761 | 10/1999 |
| WO | WO 99/65256 | 12/1999 |
| WO | WO 00/11832 | 3/2000 |
| WO | WO 00/16222 | 3/2000 |
| WO | WO 00/29998 | 5/2000 |
| WO | 0133874 A1 | 5/2001 |
| WO | WO 01/71539 | 9/2001 |
| WO | WO 01/80535 A1 | 9/2001 |
| WO | 0217140 A2 | 2/2002 |
| WO | 03056789 A1 | 7/2003 |
| WO | 03-083716 A1 | 10/2003 |
| WO | WO 2005/112586 A2 | 12/2005 |

OTHER PUBLICATIONS

Rou et al., "Online File Storage System," 2002 Student Conference on Research and Development Proceedings, Shah Alam, Malaysia, Nov. 7, 2002, IEEE, pp. 83-86.
Agarwal et al., "On the Scalability of Data Synchronization Protocols for PDAs and Mobile Devices," Jul. 2002, IEEE Network, pp. 22-28.
Anonymous: "Download filter for MMS", Research Disclosure, Mason Publications, Hampshire, GB, vol. 457, No. 28, May 1, 2002, XP007130322, ISSN: 0374-4353.
Intellisync Email Accelerator, A detailed guide to functionality—Product functionality paper, Mar. 2004, pp. 1-18.
Lee et al, "Monitoring Data Archives for Grid Environments," Jul. 2002, 10 pgs.
Batista et al. "Mining Web Access Logs of an On-line Newspaper" Jul. 2002, 8 pgs http://ectrl.itc.it/rpec/.
Internet Mail Consortium: :vCard Overview, Oct. 13, 1998, 3 pages, Retrieved from the Internet: www.imc.org/pdi/vcardoverview.
Internet Mail Consortium: :vCard The Electronic Business Card, Jan. 1, 1997, 5 pages, Retrieved from the Internet: www.imc.org/pdi/vcardwhite.html.
Jennings, J. "SyncML DM: A SyncML Protocol for Device Management," slide presentation, downloaded from www.openalliance.org/tech/affiliates/syncml/syncmldm_28jan02_james_jennings.pdf, Jan. 28, 2002, 23 pgs.
Torio, T. "The SyncML Road Ahead—Application Development and Device Management," slide presentation, downloaded from www.openalliance.org/tech/affiliates/syncml/syncmldm_30jan02_teemu_Toroi.pdf, Jan. 30, 2002.
Sheha, M.A.et al. "Specification and Drawings of U.S. Appl. No. 60/493,704," filed Aug. 8, 2003.
FusionOne "FusionOne Unveils Integrated Carrier Product Suite to Deliver Mobility Solutions to Individuals and the Enterprise," Press Release, Mar. 18, 2002, 3 pgs.
FusionOne "FusionOne Unveils Mighty Phone™ Wireless Service," Press Release,Nov. 18, 2002, 3 pgs.
Business Wire, "SyncML Announces 18 New Compliant Products, SyncML DM Engineering Event Held; 99 Devices No Certified-SyncML Compliant," Press Release, Sep. 25, 2002.
Reed, Benjamin C., et al.,"Authenticating Network-Attached Storage,"IEEE, Jan.-Feb. 2000, pp. 49-57.
Gaskin, J.E.:Messaging-Instant Enterprise—Once a Novelty item, IM is Becoming a More Serious Tool for Business Users, InternetWeek, No. 810, Apr. 24, 2000, p. 55.
BusinessWire, "FusionOne Partners with WhitePages.com to Deliver Automatic Synchronization for Online Subscriber," press release, Oct. 11, 2000.
Pabla, C."SyncML Intensive," downloaded from www-128.ibm.com/developerworks/wireless/library/we-syncml2, Apr. 1, 2002.
Malone, et al., Semi-Structured Messages are Surprisingly Useful for Computer-Supported Coordination, Proceedings of the Conference on Computer-Supported Cooperative Work, Austin, Texas, Dec. 3-5, 1986, pp. 1-26.
Patel et al.,"The Multimedia Fax-MIME Gateway," 8440 IEEE MultiMedia No. 4, Jan. 1994, 7 pgs.
Lamb et al.,"LAN-Based Office for the Enterprise, A Case Study," Advantis Company, White Plains, NY 10605, Jan. 1994 IEEE, pp. 440-447.
Starfish, "TrueSync Data Synchronization," Software, http://www.starfishsoftware.com/solutions/data/data.html, Jan. 2003.
Office Action mailed Jul. 8, 2010, U.S. Appl. No. 11/437,554, pp. 1-20.
U.S. Appl. No. 11/437,554, Advisory Action mailed Jul. 8, 2009, pp. 2-3.
Non-final Office Action mailed Sep. 22, 2009, in U.S. Appl. No. 11/437,554, pp. 1-18.
Japanese Office Action, Nov. 1, 2010, Application No. 2007-513357, pp. 4-7.
European Patent Office, Office Action mailed May 19, 2011, for European Application No. 05748340.6, Ref No. P041781EPIRH, 6 pgs.
Chinese Office Action, Aug. 3, 2010, Application No. 200580020480.7, pp. 1-11.
Finnigan, Anne, "The Safe Way to Shop Online," Sep. 1998, p. 162, Good Housekeeping, v. 227 No. 3.
Chase, Larry, "Taking Transactions Online,"Oct. 1998, pp. 124-132, Target Marketing, v.21 No. 10.
Gong, Li; "Increasing Availability and Security of an Authentication Service," Jun. 1993, pp. 657-662, IEEE Journal on Selected Areas in Communications, v. 11 No. 5.
DeMaio, Harry B., "My Mips Are Sealed," Sep./Oct. 1993, pp. 46-51, Chief Information Officer Journal, v. 5 iss.7.
Final Office Action dated Dec. 13, 2011, U.S. Appl. No. 11/906,586, filed Oct. 2, 2007, Richard Onyon.
Non-final Office Action dated Sep. 13, 2011, U.S. Appl. No. 12/319,087, filed Dec. 30, 2008, Richard Onyon.
Office Action mailed Jan. 29, 2013, U.S. Appl. No. 13/479,216, filed May 23, 2012, Richard Onyon et al.

* cited by examiner

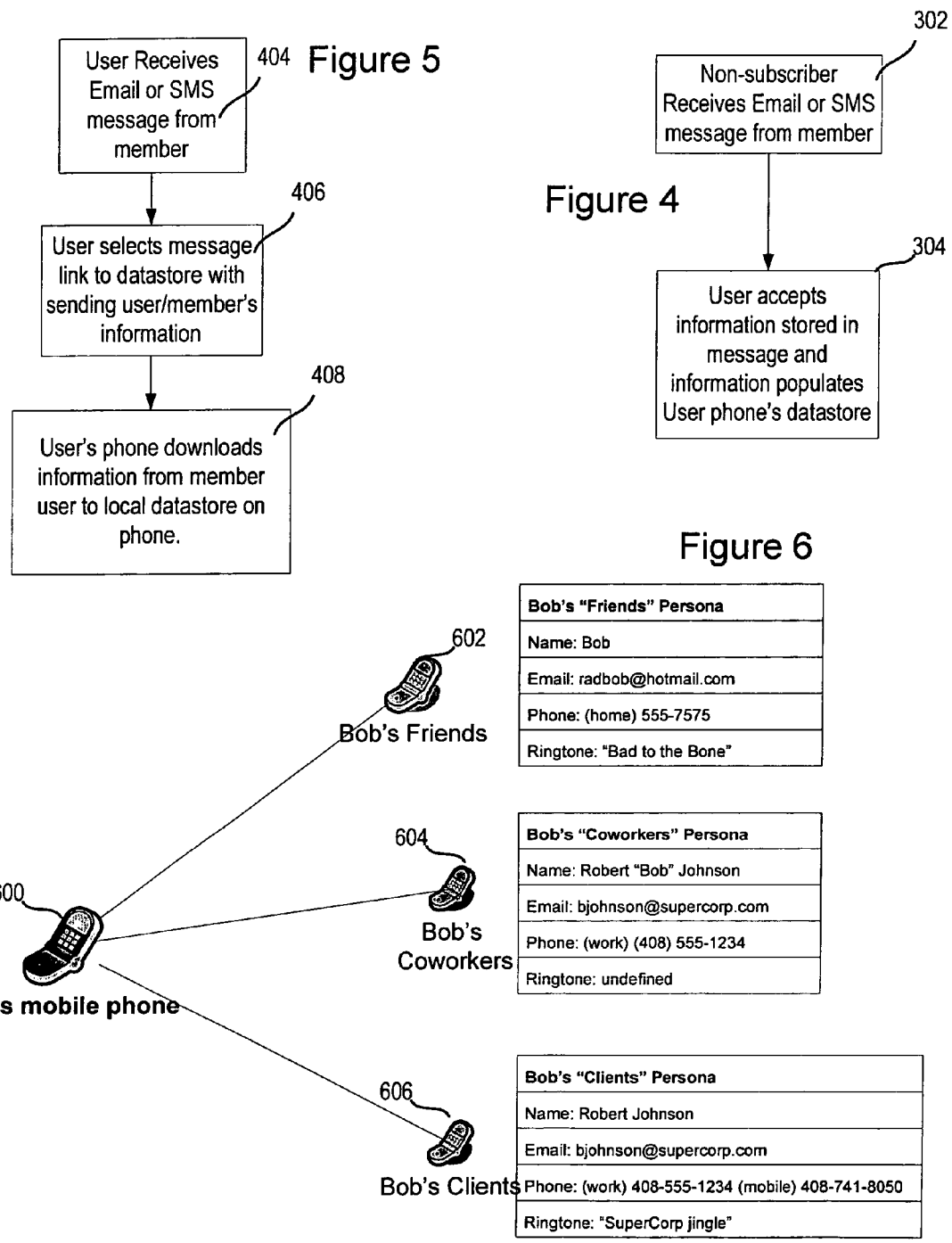

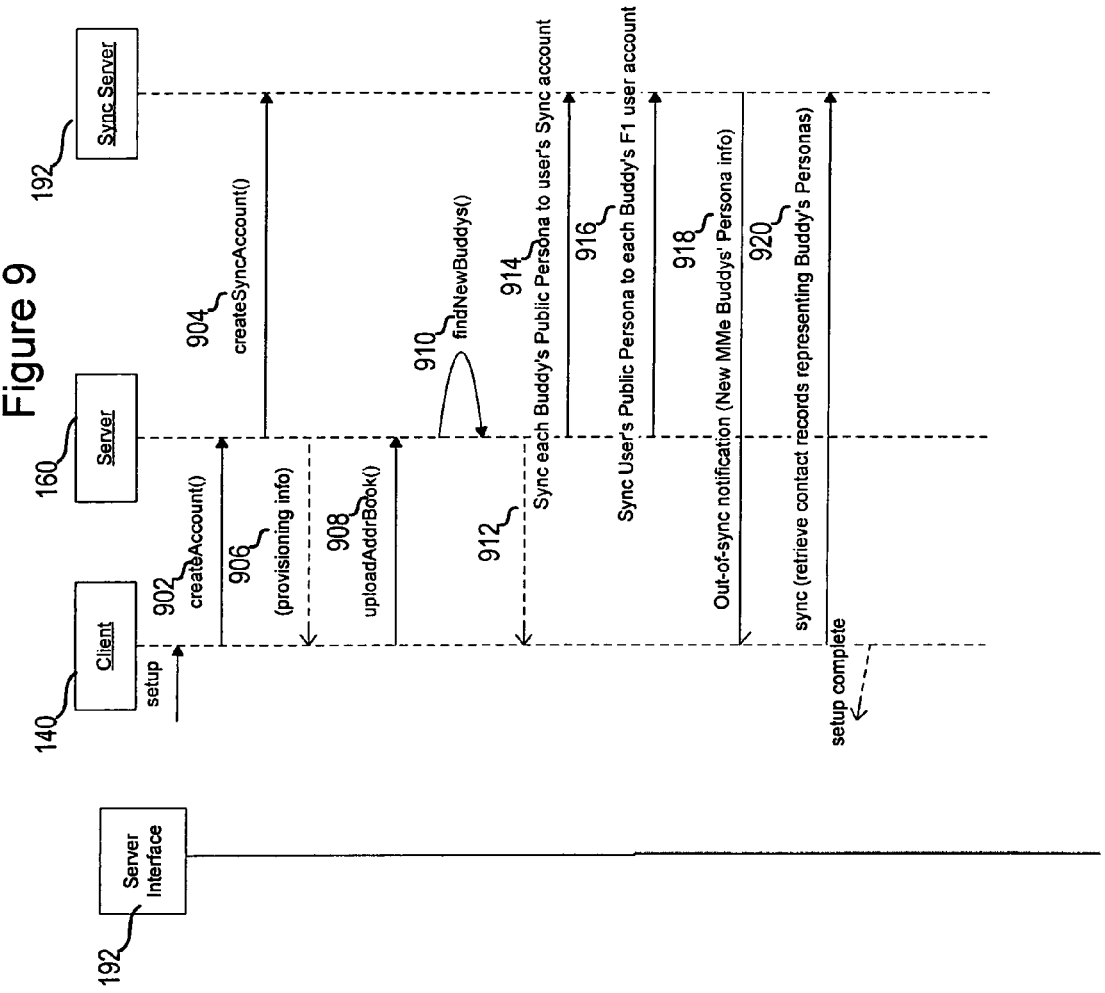
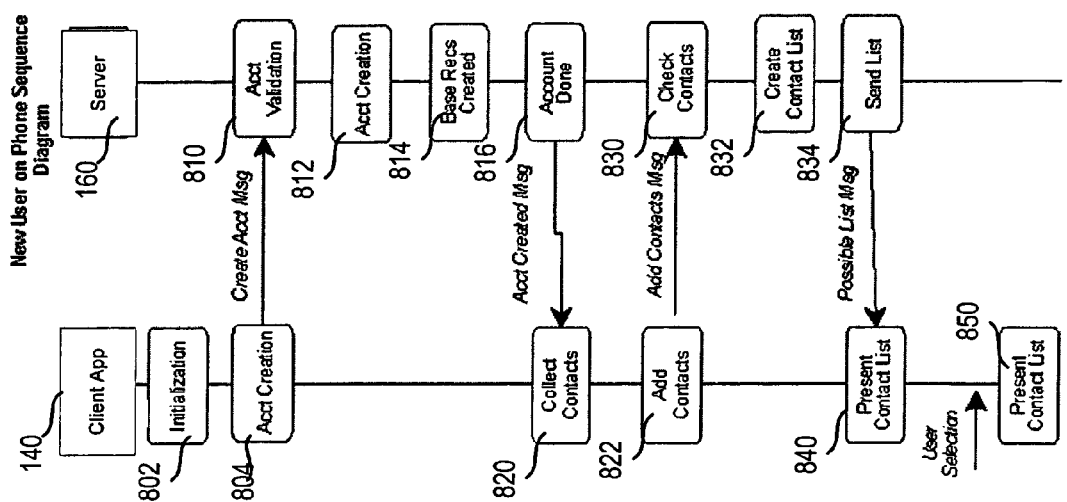

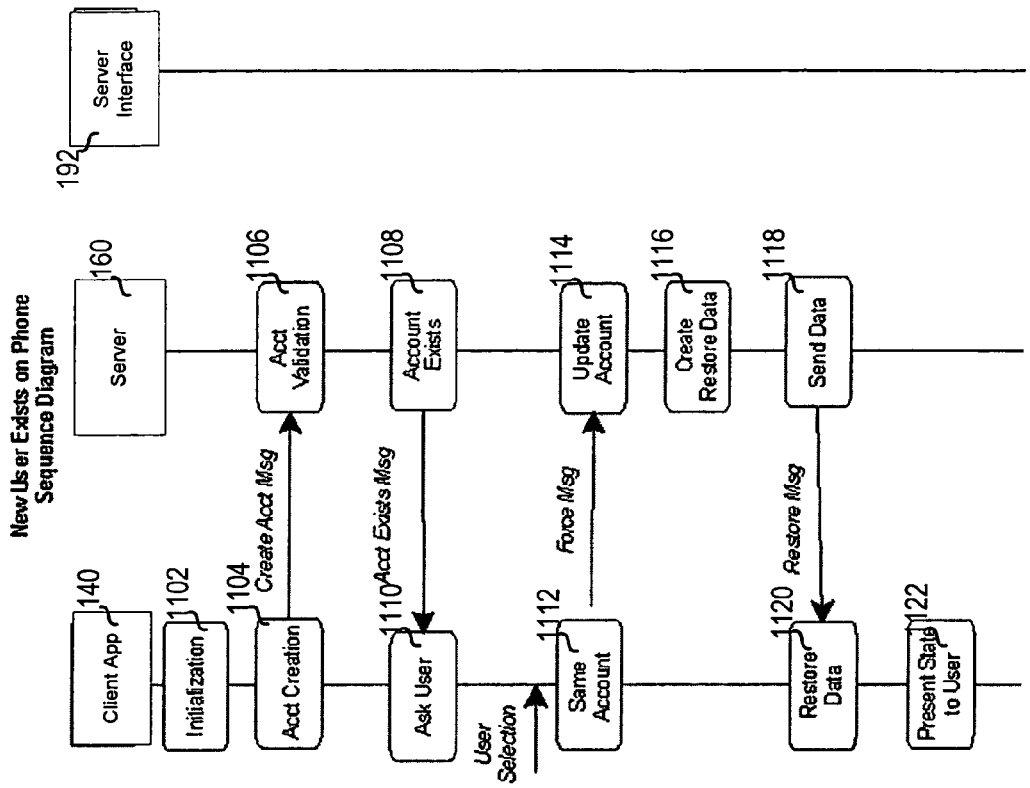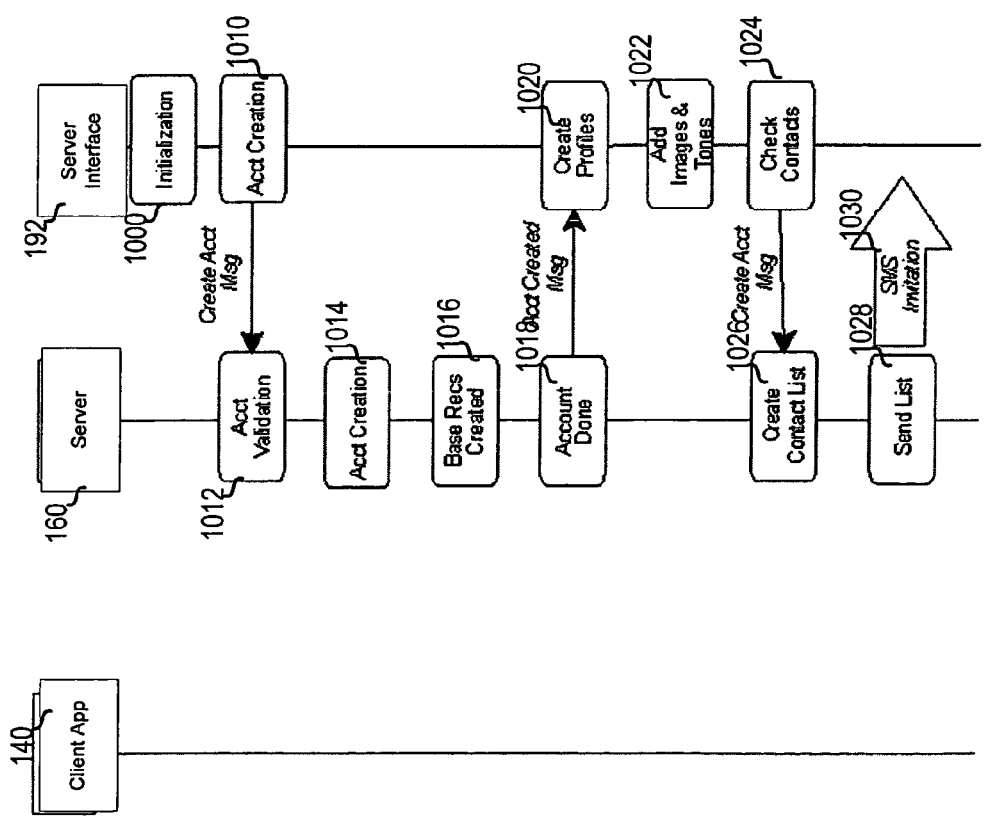

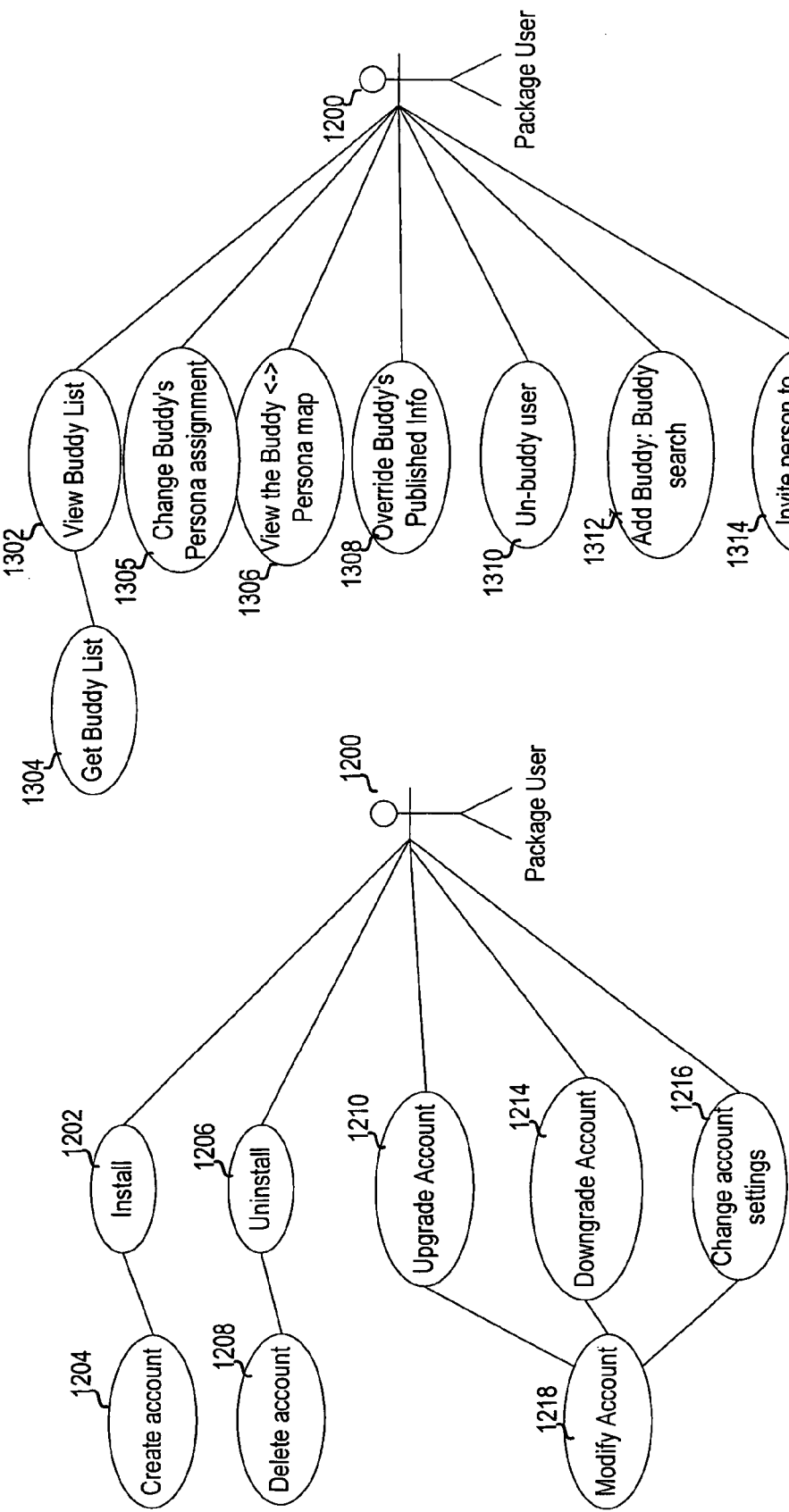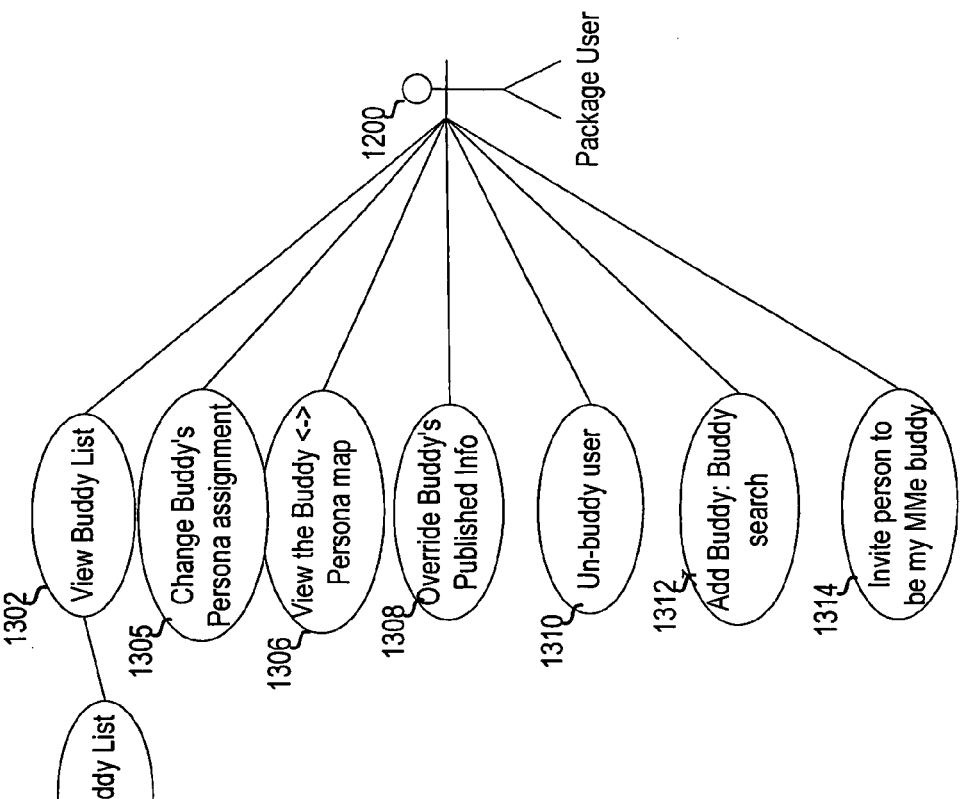

Figure 20B 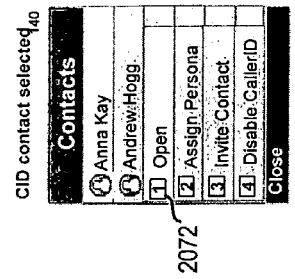 Figure 20C
Figure 20F 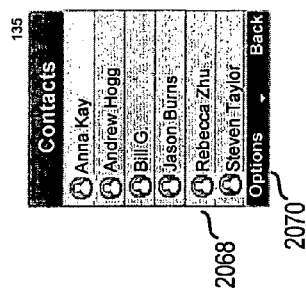 Figure 20G 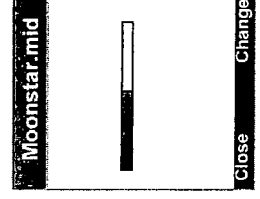 Figure 20E
Figure 20J 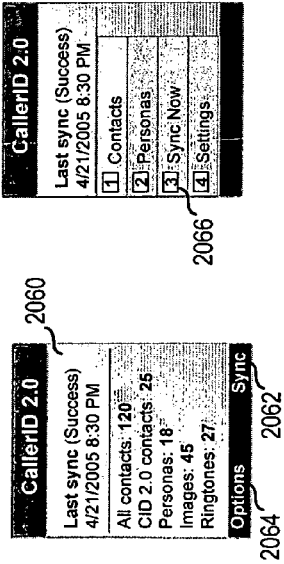 Figure 20K Figure 20L 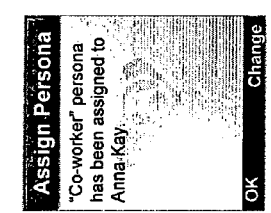 Figure 20I 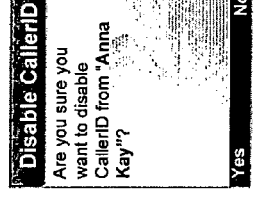
Figure 20H 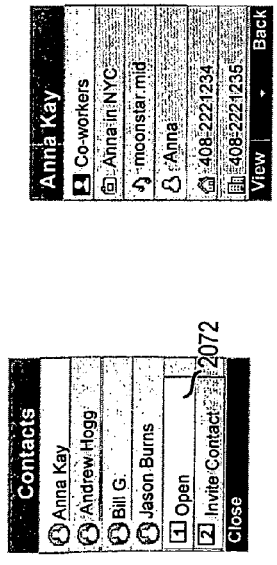 Figure 20M 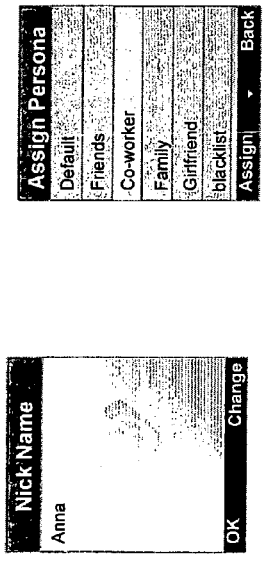

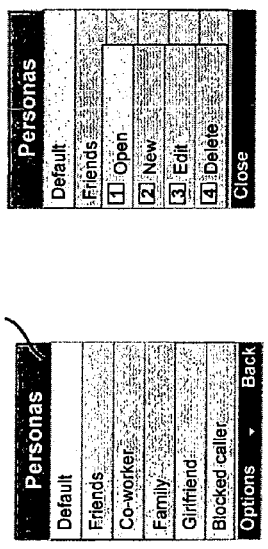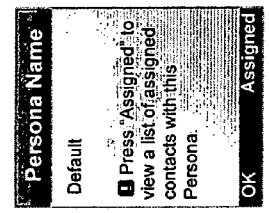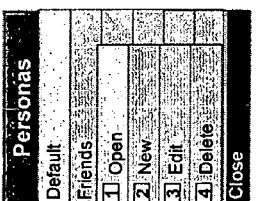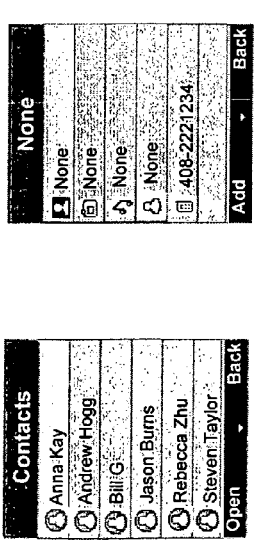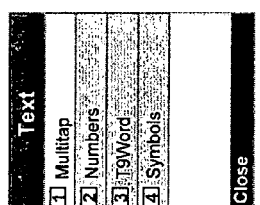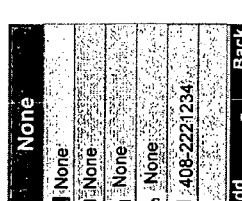

![Figure 24 - Advanced ID Service - My Details screen]

Advanced ID Service

Welcome, +1(408) 344-1246  Log out | Account | Help

MY CALLERID | CONTACTS | PERSONAS | MY IMAGES | MY RINGTONES | MY DETAILS

My Details

[Cancel] [Save]

Personal Information

| | | | |
|---|---|---|---|
| First Name: | Richard | Prefix: | |
| Middle Name: | M. | Birthday: | 01 / 01 / 2005 |
| Last Name: | Onyon | Anniversary: | 01 / 01 / 2005 |
| Nickname: | Rick | Spouse's Name: | |

Home Information ( Hide )

| | | | |
|---|---|---|---|
| Address (Line 1): | 1000 Any Street | Home Phone 1: | 415-2221234 |
| Address (Line 2): | Apt 2 | Home Phone 2: | 415-2221212 |
| City: | Any town | Home Fax: | 415-2221333 |
| State/Province: | CA | Home Mobile: | 408-2221211 |
| Postal/ZIP: | 94115 | Home Pager: | www.onyon.com |
| Country: | United States | Home IM: | rick@onyon.com |
| Email 1: | rick@onyon.com | | |
| Email 2: | rick@onyon.com | | |

Business Information ( Hide )

| | | | |
|---|---|---|---|
| Company: | FusionOne | Work Phone 1: | 408-2221234 |
| Job Title: | CEO | Work Phone 2: | 408-2221212 |
| Address (Line 1): | 1 Almaden Blvd. | Work Fax: | 408-2221233 |
| Address (Line 2): | 11th Floor | Work Mobile: | 650-2221234 |
| City: | San Jose | Work Pager: | 408-5551212 |
| State/Province: | CA | Work IM: | rick@fusionone.com |
| Postal/ZIP: | 95113 | | |
| Country: | United States | | |
| Email 1: | rick@fusionone.com | | |
| Email 2: | ronyon@fusionone.com | | |

Figure 24

ADVANCED CONTACT IDENTIFICATION SYSTEM

CLAIM OF PRIORITY

This application claims priority to U.S. Provisional Application No. 60/570,409, filed May 12, 2004, entitled "Communication Network Identification System," which is incorporated herein by reference.

BACKGROUND OF THE INVENTION

1. Field of the Invention

The invention relates to a system for allowing users to provide other individuals with a personalized representation of the user in a network environment, such as a cellular telephone network.

2. Description of the Related Art

Wireless telephones have become more powerful with the inclusion of such features as cameras, address books, calendars and games. Many now include microprocessors, operating systems and memory which allow developers to provide limited applications for the phones. Phones now include the ability to play multimedia files including polyphonic ringtones, MP3 files, MPEG, AVI and QuickTime movies, and the like, in addition to displaying pictures taken on or downloaded to the phone.

Wireless phones have long been able to access the Internet via a Wireless Access Protocol (WAP) browser, and receive messages via SMS. A user on a wireless telephone connects via the wireless network to a server which enables the phone to read WAP enabled content. Most providers enable a user to access an email message account via the WAP browser, and/or provide short message service (SMS) messages directly to the user's phone. SMS allows users to receive abbreviated text messaging directly on the phone. Messages can actually be stored on the phone, but the storage available is limited to a very small amount of memory. In addition, no provision for handling attachments in SMS is available.

More recently, phones themselves have become powerful enough to utilize data connections over a carrier's network to manipulate data. For example, users of a carrier's network can download multimedia content to their phone, shop and download phone specific applications, and send and receive more robust messaging. Devices which have been combined with wireless phones, such as Research In Motion's Blackberry device, provide a user with enhanced message capabilities and attachment handling. These devices are specifically configured to provide contact and message applications over a wireless network.

Still, the majority of phones provide limited native address and contact data storage, and only SMS messaging capability. Some phones do allow users to associate images and specific ringtones with users in their phone's address book. Most wireless phones support caller ID, which displays the number of an incoming caller. Using this information, phones having imaging and multiple ringtone capabilities display an incoming caller's address book associated picture (if available) when the incoming call is received, and play a specially designated ringtone (if specified).

With the numerous different types of wireless phones and other communications devices available, a system which will enable a user to provide a personalized representation of themselves on other user's phones would be useful in allowing the user to identify themselves to other users.

SUMMARY OF THE INVENTION

The present invention, roughly described, pertains to a System and method which allows advanced identification information to be created and distributed to users of wireless communication devices, such as mobile phones. Subscribers can define their own personas as collections of information which define the users. Subscribers can then publish their persona(s) to their friends' and associates' mobile phones, and update the others' address books with the subscriber's contact information. Users can specify different personas to be presented to different users.

In one embodiment, the invention is a system for providing personification information to users of a wireless phone.

In another embodiment, the invention is a method of identifying a service subscriber on a wireless device. The method may include the steps of: establishing a subscriber persona comprising information identifying a user to other users; and displaying at least a portion of the persona on a device when a call or other type of contact such as SMS, Push-To-Talk message, email, voiceclip, et al to the device is received from another subscriber whose personalization information has been provided to the user.

In another embodiment, the invention is a method of providing an advanced caller identification service. In this embodiment, the invention includes: maintaining a store of subscriber persona information provided by users, the persona information identifying the user to other users; and distributing persona information to others based on an established relationship between subscribers.

A still further embodiment of the invention includes an application on a subscriber phone. The application includes a store of personification information for at least one other subscriber; and a display interface providing personification information to a phone interface and an interface for managing the user's own personalization information, as well as any system or account preferences.

In another embodiment, the invention is an application server for a communication system. The sever includes a store of personification information for a plurality of subscribers; and a distribution system management application.

The present invention can be accomplished using hardware, software, or a combination of both hardware and software. The software used for the present invention is stored on one or more processor readable storage media including hard disk drives, CD-ROMs, DVDs, optical disks, floppy disks, tape drives, RAM, ROM or other suitable storage devices. In alternative embodiments, some or all of the software can be replaced by dedicated hardware including custom integrated circuits, gate arrays, FPGAs, PLDs, and special purpose computers.

These and other objects and advantages of the present invention will appear more clearly from the following description in which the preferred embodiment of the invention has been set forth in conjunction with the drawings.

BRIEF DESCRIPTION OF THE DRAWINGS

FIG. 4 is a flow chart illustrating a first method for providing an invitation to a non-subscriber to join a service established by an enterprise service provider in accordance with the present invention.

FIG. 5 illustrates a second method for providing an invitation to a non-subscriber in accordance with the present invention.

FIG. 6 is an illustration of personas and persona groups relative to a subscriber in accordance with the present invention.

FIG. 8 is a sequence diagram illustrating the actions which occur on a client device, server, and server interface to allow a new user to subscribe to the advanced identification service in accordance with the present invention from a phone.

FIG. 9 is a sequence diagram illustrating how a user account is created when the system is used with a synchronization server in accordance with U.S. Pat. No. 6,671,757.

FIG. 10 is a sequence diagram illustrating how a new subscriber is established on a server provided interface in accordance with the present invention.

FIG. 11 is a sequence diagram illustrating how a user already having an account with the system, but utilizing a new phone, would interact with a server in accordance with the present invention.

FIG. 12 use case diagram illustrating the functions available to a user/subscriber in accordance with the system of the present invention.

FIG. 13 is a use case diagram illustrating the contact management available to a user/subscriber in accordance with the system of the present invention.

FIGS. 20B-20M are exemplary user interface screens provided on a client device such as a phone to manage contacts providing the features shown with respect to FIG. 20A on a client device such as a phone.

FIG. 21B-21N are user interface screens which may be provided on a client device such as a cell phone to implement the features shown in FIG. 21.

FIG. 24 is an exemplary user interface provided in a web browser by a server in accordance with the present invention allowing a user to manage details of the user's account in accordance with the system of the present invention.

DETAILED DESCRIPTION

The present invention allows advanced identification features to be provided to a phone or other mobile device by allowing user to provide personification information for other users of advanced wireless communication devices. Each user can create one or more individualized representations of themselves and push this information to other users. The service is generally enabled by an enterprise service provider or cellular network carrier via one or more servers. Users can subscribe to the service, allowing them to create and distribute sub-sets of personification information or "personas", or merely participate in the system, receiving personification information from subscribers. Since devices have different capabilities, the system will vary in its ability to provide personification information to each device, and in one embodiment, the type of user device and its capabilities are stored for each member of the system. The method and implementing systems and applications of the present invention provided by the enterprise service provider may be subject to a service fee to maintain the personification information in the data store, and provide functionality associated with the system.

In general, a user creates a personification of themselves which may include the user's contact information, signature, photo, multimedia information and a specific ringtone identifying them to other phone users. Many cellular phones include the ability to download specific ringtones and use them to identify incoming callers by associating the ringtone and picture with the contact information in the phone and triggering it using caller ID functions. The system of the present invention allows the user to specify their own ringtone and picture, and use it to identify them to other users. In addition to the static information in the personification information a user may provide dynamic information such as GPS location, timezone, availability, and event-relevant information (e.g., a reminder it's the caller's birthday, or a summary of calendar events or tasks assigned to or by the caller) or control information to other users or participants.

Figure 1:
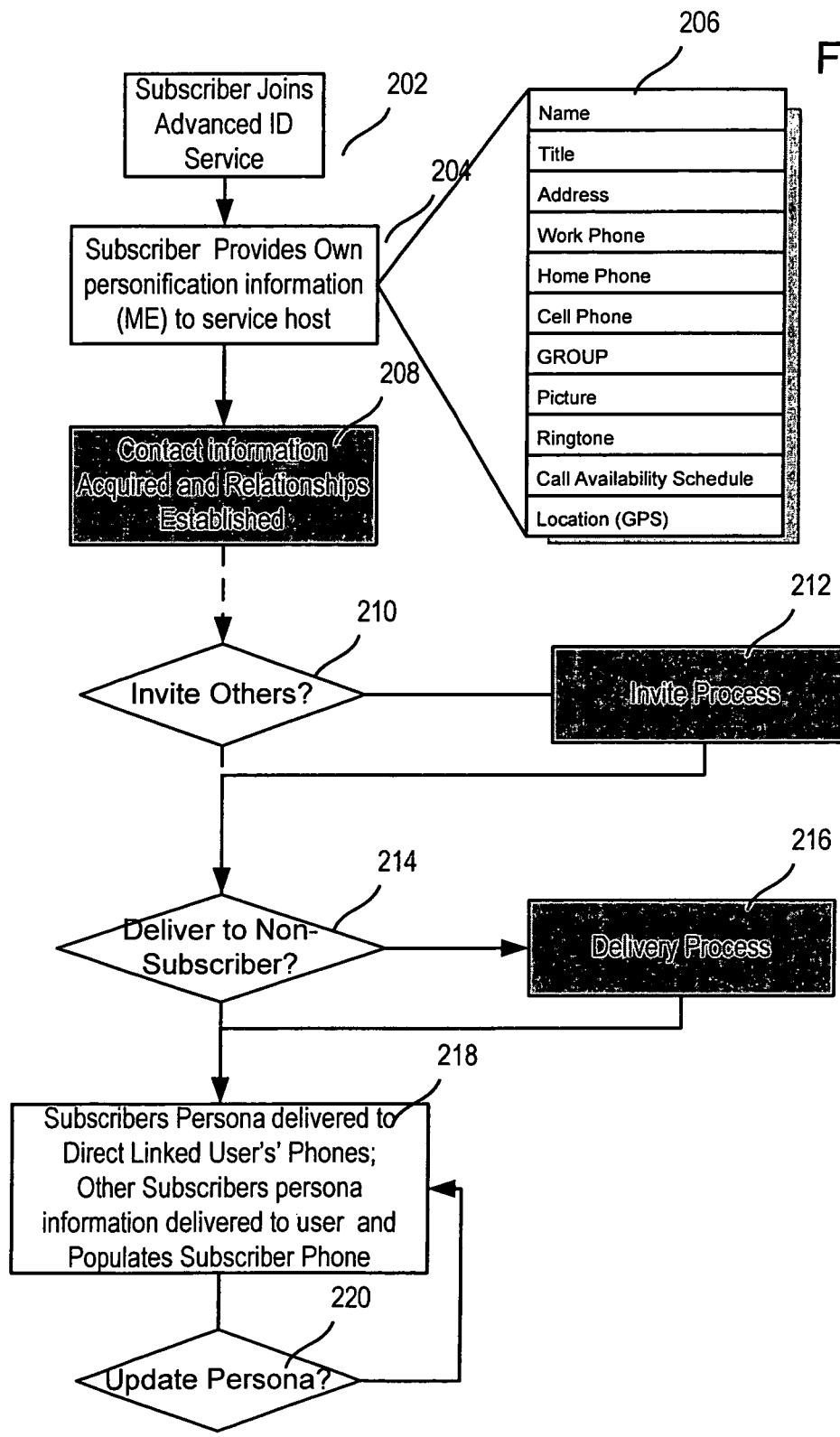
FIG. 1 is a flow chart illustrating a method in accordance with the present invention.

FIG. 1 illustrates a general method in accordance with the present invention. At step 202, a subscriber joins the system by providing account creation information. At step 202, the user may establish an account using a user name, a secure password, and provide other configuration information. This step may be performed via a phone based interface or via a web based interface, or any other suitable interface means.

At step 204, the user may set the user's own personification information. This is referred to in Figures occasionally as creating or updating "me". As shown at table 206, the user personification data may include the user's name, address, phone number and any other contact information, a picture of the user, a specific ringtone for the user, and a schedule of available times that the user may be contacted in various manners. In addition, the user may input user location information. Location information may be of varying specificity, and may initially input manually or through a connection with a GPS system in a GPS enabled phone. Information in the location section of a user's system may be updated by an agent on the phone using the phone's GPS agent. The ringtone may be uploaded by the user or may be selected from tones provided by the system administrator as part of the service, or the user may use the device's microphone (if equipped) to author a new audio clip which will be used as a ringtone. Optionally, a value added media distributor may provide phones, and digital rights management incorporated in the system to ensure proper control of copyrighted material within the system of the present invention. The phone manufacturer, the mobile phone carrier, or another entity may add DRM functionality as well, which may determine which protected content may be redistributed (and how). It should be recognized that step 204 is optional, and a user may decide not to provide personification information, but only participate in the system to acquire personification information of others. In another embodiment, subscription to the advanced ID service provided by the ESP is not required to receive personification information.

As discussed in further detail below, different sets (or "personas") of personification information may be provided for different groups of individuals in the users' contact information. For example, a user may wish one group of contacts to receive one set of personification information (such as business contacts), while another set (such as personal friends) to receive a different set of information. The group definition allows the user to define recipients who receive the particular version of contact information. The user may assign one or more users to a particular group using an interface provided on the mobile device, or alternatively via some other interface, such as a webpage or an administrative configuration console. Additionally, the user can specify a "public" persona which anyone may download (and will be automatically assigned to new contacts in the user's devices). The system or agent maintains group assignments in persistent storage. The system or agent transmits the information appropriate for each group to the members of the group using the above described techniques. An enterprise service provider can allow a user to have a default persona upon establishing an account with the system. For example, the system can establish default public friends, family, co-workers, business associates, and blacklist persona templates, allowing the user to input certain information and have established personas once the user joins the system. The blacklisted persona is intended to be assigned to buddies to whom the user does not want to publish information.

At step 208, the new subscriber's contact records are provided to the ESP in one of a number of ways, and relationships detected between the subscriber's contact records and other subscribers. This input may be as simple as downloading phone numbers that the user has stored in his phone, or may include additional contact information which allows the system to determine whether individuals are members of the system. In addition, the subscriber may manually input contacts during account creation, or download contact information from another source, such as a personal information manager on a personal computer or personal digital assistant. A search mechanism may also be provided, allowing the user to input information on individuals to determine whether an individual is part of the system. For example, if a user does not have a stored resource of personal information, the user may, via the web browser, access a form provided by the system administration which provides name and other contact fields which the system can use to search for other users participating in the system. Once, found, this information can then be provided to the user.

In accordance with the system of the present invention, different types of links may be established between users. Generally, a user's contact list is found in the user address book in the datastore of the phone. Due to the nature of human communication, it is likely that a contact in a person's address book can likewise be found in that contact's own address book. For example, assuming Bob and Alice are both friends, they will likely have each other's contact information in their respective address books. This reciprocal link between people can be utilized to recognize and distinguish different types of links. In accordance with the invention "half" linked users occur when one user has the other user's contact information in their address book, but the other user does not reciprocate. These users are not connected for purposes of data exchange and the invitation functions provided in FIGS. 4 and 5 may be offered to the unlinked user giving them the opportunity to subscribe to the system and establish a true link with the inviter. "True"—or "direct" linked users exist when both users have each other's contact information in their mobile device's phone book. These users have established some level of relationship outside of the service provided by the enterprise service provider or via system's "Invitation" function, and will automatically exchange and maintain any information each user has configured. Within a context of the foregoing description a "buddy" is any user who has established a true link with an individual user. For privacy as well as practicality, information exchange in the system occurs only between true linked users. Users who possess only a half-link to one another may invite the half-linked user to join the system and establish a true link.

When the user provides their own personification information to the service host at step 204, step 208 may include a step of detecting links between users by examining the contents of their address books which are provided to the server. In order to identify each user from the pool of all users of the system, the system uses telephone numbers and in one embodiment e-mail addresses as unique keys. In a further embodiment, the system of the present invention can use telephone number equivalence algorithms to match phone numbers regardless of formatting, country and area codes.

Users who wish to remove their information and "unlink another user" simply remove that user from their mobile device's address book. Using the rules of the system, the two users are no longer linked and no further updated information between them occurs. No information is deleted from the unlinked party's address book in this process. To accomplish this, instead of unlinking users may wish to assign another user to a "blacklisted" persona.

At step 208, once the contacts have in acquired, relationships between the subscriber's contracts and other subscribers are established. This can occur automatically by an algorithm run by the ESP, may be set manually by the user, or may occur by some combination of the two.

Optionally, at step 210, the subscriber may be offered the opportunity to invite other people to become subscribers. The user may be prompted to determine if the user wishes to invite contacts stored in the users phone to become subscribes to obtain additional benefits attributable to subscription. If the user wishes to invite others, an invite process is performed at step 212.

Optionally, at step 214, the subscriber may be given the option to allow their persona to be provided to non subscribers. If the user desires their information to be delivered, a delivery process 216 transmits personification information to non-subscriber users. This may occur in any number of ways, such as for example via SyncML, or via SMS messages, as described below.

At step 218, personification information from other subscribers in the subscriber's contact list are delivered to the new subscriber, and the new subscriber's information sent to other subscribers. As discussed below, contacts who are also subscribers are true-linked users 210 and automatically populate the new subscriber's phone. The information may be transmitted to the user in a data stream directly to the agent, which then populates the user's phone data. Alternatively, the information may be provided in a series of messages. Preferentially, the information will be transmitted via SyncML.

Included in persona information is whether the subscriber's contacts should be alerted to the subscriber's location based on system subscriber's GPS or manually entered location information in their own record. Also included may be, for example, the level of granularity available to the subscriber's contact. For example, one may be allowed to know the country, city or a more specific location. Once received, the receiving member may further configure the subscriber's persona information based on the information received. For example, suppose another member provides location information in their member record. The user may specify that the user wishes to be notified when the member with location information moves to a particular location or within a particular distance from the specifying member. Other criteria may also be configured, such as group information. For example, the user may specify which groups each member belongs to so that if such member requests personification information about the specifying user, the correct group information is provided to the requesting member.

Finally, at step 220, the new subscriber may update information in their persona. When the new subscriber does so, the information is re-transmitted to true linked subscribers and, if enabled, non-subscriber participants in the system. Updates may be started on the device by the client application as a result of data changes on the device. This may occur because of user interaction with the device, or changing transient information such as time zone. Updates can occur in one of two ways. Server-initiated updates are triggered by time intervals, or a change in data which is to be sent to the user's device. Server-initiated updates are handled via direct socket connection to the client or via SMS messages sent from the server to the client application on the device. Each advanced ID account supports a configurable "server initiated sync on/off" setting which controls whether SMS messages are automatically sent when a client is out of date. The SMS message from the server may be sent to the text port (or configured data port, if appropriate).

Figure 2:
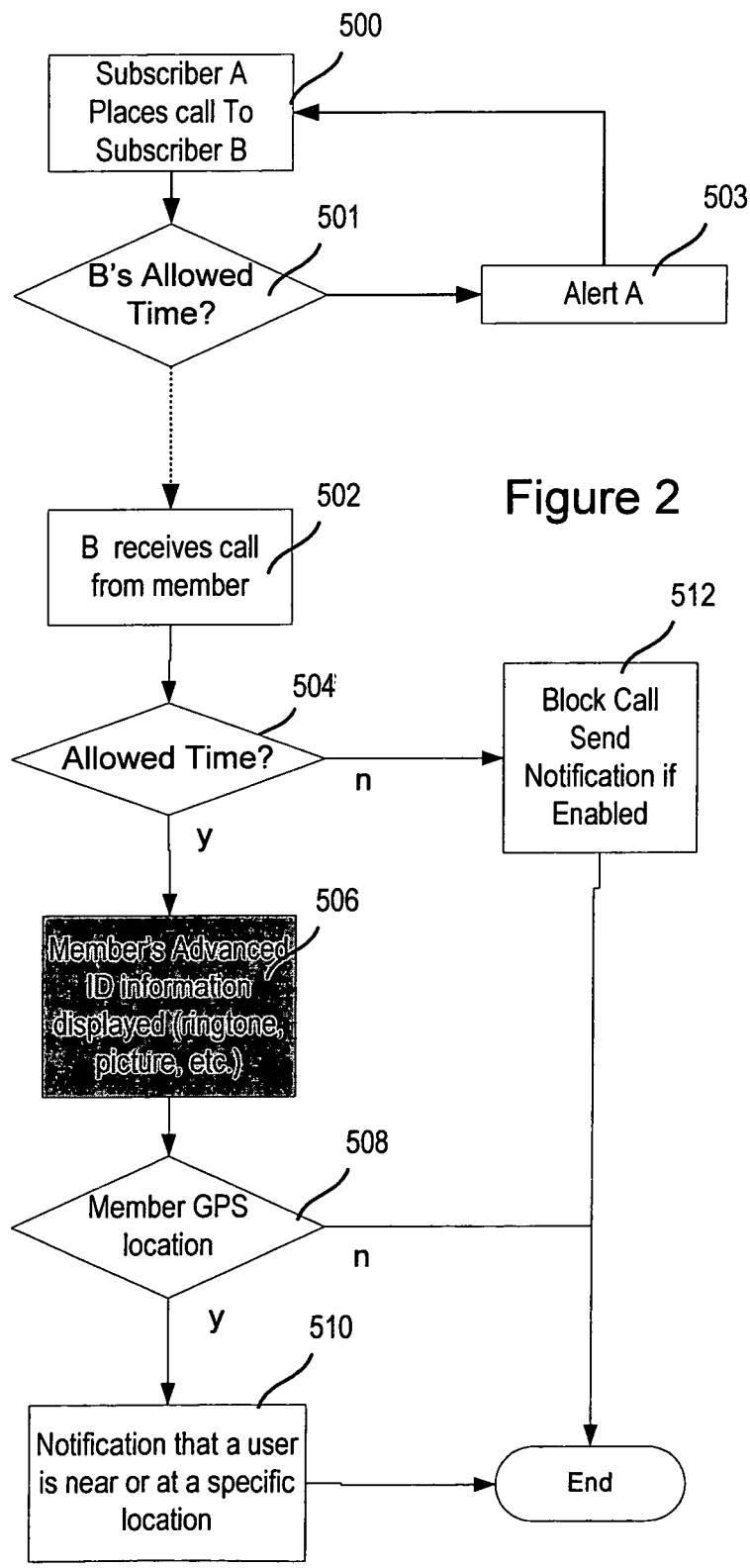
FIG. 2 is a flow chart illustrating a second method in accordance with the present invention.

FIG. 2 shows the method of the present invention once a subscriber has established a relationship with the enterprise service provider in accordance with the present invention and installed the application 140 on the user's phone 100. At step 500, when a Subscriber b receives a call from another member (subscriber A) who has downloaded the user's information into the user's phone, advanced caller identification features can provide a member's information at step 506 on the user's phone.

In one aspect, the system supports controlling both the calling user's phone and the called user's phone. At step 501, if subscriber B has configured his persona (which is downloaded to subscriber A) to prevent calls during a certain period of time, the client application on the calling user's phone can prevent subscriber A from connecting to subscriber B during this period. Hence at step 501, the method may check (on subscriber A's phone) whether a call to Subscriber B is allowed based on Subscriber B's configuration. If not, an alert 503 may be provided to Subscriber A.

At step 502, if the call is initiated by subscriber A and received by subscriber B, optionally, at step 504, the receiving user can configure the phone to prevent calls during a specific period of time. Hence, at step 504 the method may check to determine whether a call is allowed during a specific period by the receiving user. If the call is not allowed, the method may block the call at step 512. If the call is not blocked, the user's advanced ID information (persona) is displayed on the receiving caller's phone. If the call is blocked, it may be directed to the receiver's voicemail system. The advanced ID or persona is a collection of information which defines the user, such as a phone number, e-mail address, picture, geo location information and other data. This allows subscribers to manage their own "personal brand" controlling how they are represented on other user's phones specifying a ringtone or the picture associated with their contact. As discussed herein, one can have a "friends" persona and a "co-workers" persona which contain different information or different sets of information. Additional features such as geo location information provided by GPS information capable phones is also provided, as is information about the caller which is transient in nature—such as whether it's the caller's birthday or anniversary, or information concerning phone calls, meetings, or tasks assigned to or by the caller. The system may be implemented by using a direct push system from a server via a SyncML server to a SyncML client, or may be operated on by a specific client application resident in the phone which communicates with the service-side implementation. SyncML is an Extensible Markup Language (XML) protocol under development as an open standard for the universal synchronization of data between devices. Synchronization of data allows changes made to data on one device (such as a smartphone or a laptop computer) to be instantly reflected in data on another device (such as a networked computer).

Optionally, at step 508, if the member has chosen to provide the member's GPS information, at step 508 the GPS can be provided in a notification at step 510 provided to show that the user is at or near a specific location.

The present invention supports two different types of data: static and dynamic. Static data can include a user's ringtone, name and image. The static info is provided by the calling subscriber to the receiving subscriber's client on phone 100 at step 506. Step 501 indicates a feature of the present invention which allows subscribers to define their own personification information to control another user's phone—this dynamic or "active control" information can be updated more often than the static persona information. Dynamic information such as GPS or timezone information is updated regularly based on the needs of the sending subscriber. Due to the interaction of the client 140 with the phone, the subscriber may actually prevent (or merely warn) a calling subscriber from calling a receiving subscriber's phone and may instead provide them a user-configurable message which may direct the caller to use some other mechanism to contact the intended receiving subscriber (e.g., SMS, email, etc). As with all other similar information, this preferred availability information is stored users' personas.

Figure 3:
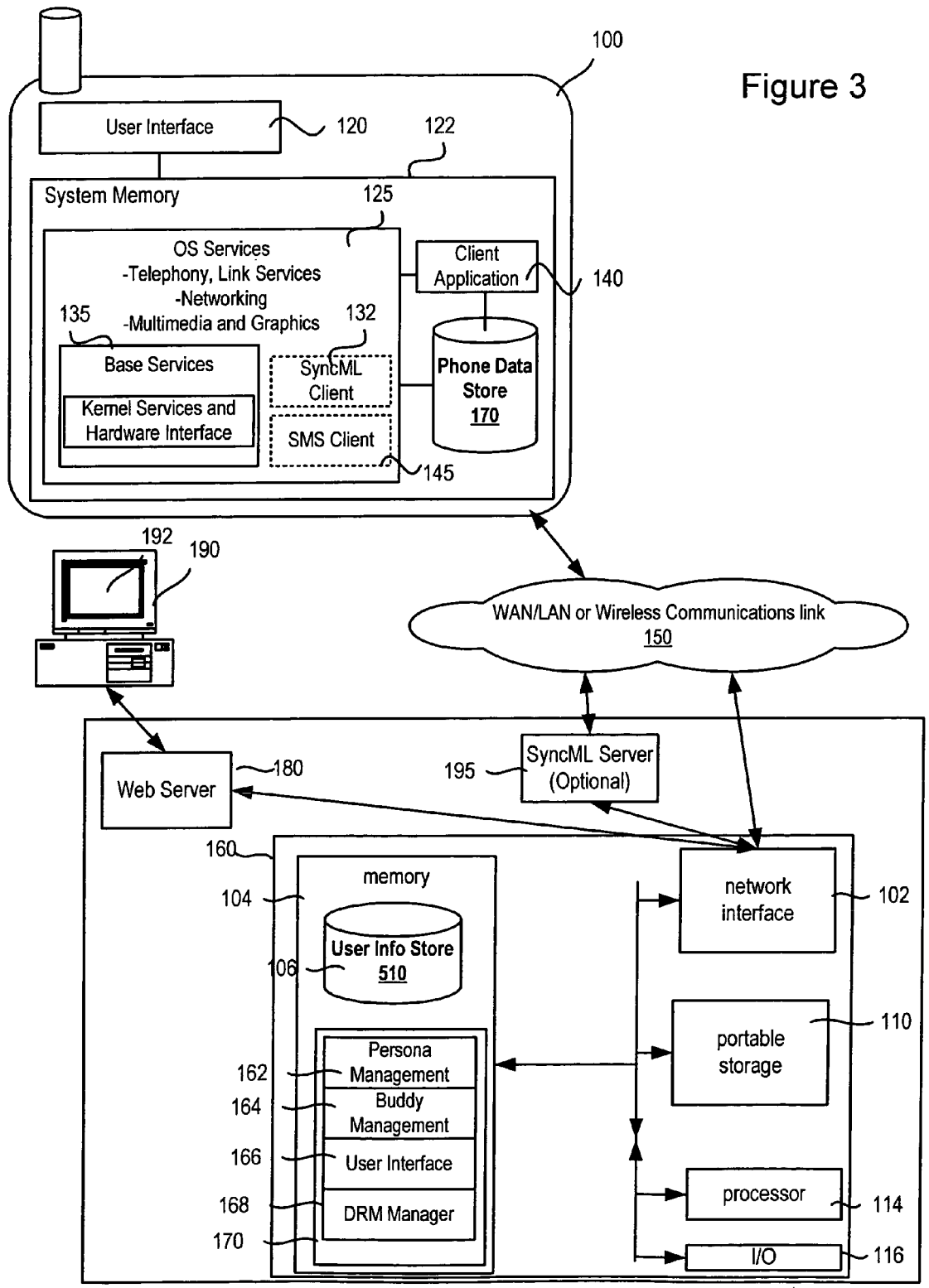
FIG. 3 is a block diagram of a system suitable for implementing the identification system of present invention.

FIG. 3 illustrates a general overview of a system for implementing the present invention. As shown in FIG. 3, a wireless communication device, such as a phone 100, is connected to a wireless communications link, such as a cellular network 150, to transmit voice and data communications to other devices coupling to the wireless network. It will be understood that the wireless link may be a wireless internet link or a cellular network maintained by a cellular carrier, a GSM or CDMA network, or some other wireless communications link. The carrier may comprise the enterprise service provider or may be separate from the enterprise service provider. Data may be transmitted over the network in any number of known formats.

An advanced ID service server 160 is also provided which communicates with the telephone via wireless network 150 directly over a data connection or via a SyncML server 195. Various embodiments of a system for implementing the advanced ID service are discussed herein. In FIG. 3, the ID server 160 communicates directly with the phone 100. In alternative embodiments, discussed below, the ID system is implemented on top of a synchronization system such as that described in U.S. Pat. No. 6,671,757, 6,694,336 or 6,757,696.

Phone 100 may be provided with a system application or agent 140. System agent 140 can include a SyncML communication client designed to interact with a SyncML server 195 in accordance with approved and proposed versions of the SyncML OMA DS specification, including proposed extensions, (available at http://www.openmobilealliance.org). Alternatively, agent 140 can be an application designed to communicate with server 160 using an existing SyncML client on the phone provided by the phone's manufacturer (as well as any custom extensions supported by such client), or an application specifically designed to communicate with server 160 via another protocol, including a proprietary protocol. In one embodiment, the agent 140 is a fully implemented SyncML client and server 160 includes a SyncML server. In another embodiment, the application 140 is a client application device sync agent such as that disclosed in U.S. Pat. No. 6,671,757. Various embodiments of the client application 140 are set forth below.

In accordance with the present invention, a phone 100 includes a system memory 122 which may further include an operating system 124 having operating system service including telephony and linking services, networking services, multimedia and graphics display services all provided to a user interface 120. OS 125 my be the phone's proprietary OS, BREW, or any other device or operating system suitable for a phone (such as the Symbian Operating system). Additional base services 135 and an operating system kernel may also be provided. The operating system may additionally provide an SMS client 145 built into the operating system allowing short messages to be provided across the wireless communications line 150 to other users. Still further, a SyncML client 132 may be provided and supported by the operating system services 124. The phone 100 includes a native phone data store 170 which contains address book contact and other information which may be provided by a subscriber. Such information can further include ringtones, pictures, sounds, and movies, all dependent on the functional capabilities of the phone 100, the space allowed in the system memory, and the services provided by the operating system 124.

A client application 140, various embodiments of which are discussed herein, is also loaded into phone 100. As will be well understood by one of average skill in the art, client application 140 can be provided by the phone manufacturer or downloaded by a user at a later time. To download and install the application, the user selects a download area of the phone operating system services 124, selects the application from offerings provided by the service provider or carrier who maintains the wireless communications line 150, or an enterprise service provider who maintains the system server 160, and installs the application onto phone 100. In an alternative embodiment, agent 140 is a self-supporting application designed to run as a JAVA or BREW agent, or any other device or operating system specific agent (such as an agent operable on the Symbian Operating system). This agent can either include its own SyncML client, or interact with an existing SyncML client on the telephone. Changes can occur at field level or byte level. Alternative embodiments can communicate via alternative protocols via the wireless communications link to store information on the System data base 510.

Client 100 includes at least a user interface 120, the application 140 having a communication or sync engine and data store manager, a SyncML client 132 and a local database 150. The client application 140 provides an appropriate graphical user interface to UI 120 which provides the user an alternative point of interaction with the system and service provided by the enterprise service provider. The user interface allows the user to define and manage personas and buddies as well as other tasks as specified in the case definition described herein. Interaction with the system can be via this client user interface or via the server user interface provided by the web server 180. The engine and data store manager is responsible for maintaining the user settings and options in the device's persistent storage as well as automatically pushing and retrieving changes to those object to the system server. The client datastore includes account information, persona data, buddy information, data for other users who have true links with the subscriber, and multimedia content The storage server 160 is a centralized storage location for all system service information, including buddy, persona, relationship, and user data. Clients 140 can connect to and synchronized with the server information to update their local copy of this data as well as publish any changed information or retrieve any new available information from the server. In the mobile device, the persona information belonging to a user's buddy is primarily stored in the native address book or a separate address book provided by the client. As some devices will not support all the published buddy information including the extended information such as geo location and presence information, the client can store this information in a local database and provide access to it via the phone interface.

In general, a hardware structure suitable for implementing server 160, webserver 180 or SyncML server 195 includes a processor 114, memory 104, nonvolatile storage device 106, portable storage device 110, network interface 112 and I/O device(s) 116. The choice of processor is not critical as long as a suitable processor with sufficient speed is chosen. Memory 104 could be any conventional computer memory known in the art. Nonvolatile storage device 106 could include a hard drive, CDROM, CDRW, flash memory card, or any other nonvolatile storage device. Portable storage 108 could include a floppy disk drive or another portable storage device. The computing system may include one or more network interfaces 102. An example of a network interface includes a network card connected to an Ethernet or other type of LAN. I/O device(s) 116 can include one or more of the following: keyboard, mouse, monitor, display, printer, modem, etc. Software used to perform the methods of the present invention are likely to be stored in memory 104 which include nonvolatile storage and volatile memory as well as, portable storage media 110.

The computing system also includes a database 106. In alternative embodiments, database 106 is stored in memory 104, portable storage 110 or another storage device that is part of the system of FIG. 3 or is in communication with the system of FIG. 3. Other alternative architectures can also be used that are different from that depicted in FIG. 3. Various embodiments, versions and modifications of systems of FIG. 3 can be used to implement a computing device that performs all or part of the present invention. Examples of suitable computing devices include a personal computer, computer workstation, mainframe computer, handheld computer, personal digital assistant, pager, cellular telephone, smart appliance or multiple computers, a storage area network, a server farm, or any other suitable computing device. There may be any number of servers 160$n$, $n+1$ managed by a system administrator providing a back up service in accordance with the present invention.

Also provided on server 160 is a system data store 310. The System data store is provided in the non-volatile memory space of server 160. While only one System data store computer is shown, it should be recognized that the store may be replicated to or stored over a plurality of computers to ensure that the data thereon is protected from accidental loss. It should be understood that the representation of the SyncML server 195 and web sever 180 need not require that such servers be provided on different physical hardware than the System server 160.

The system of FIG. 2 illustrates one server and client system suitable for use in the present invention. In an alternative embodiment of the invention, the advanced ID system can be constructed using a synchronization server described in U.S. Pat. No. 6,671,757, 6,694,336 or 6,757,696.

A synchronization system described with respect to U.S. Pat. No. 6,671,757, 6,694,336 or 6,757,696 comprises client software which provides the functions of a differencing transmitter/receiver/engine, and differencing synchronizer in the form of a device engine. The device engine may include at least one component particular to the type of device on which the device engine runs, which enables extraction of information from the device and conversion of the information to difference information, and transmission of the difference information to the storage server. The storage servers utilized in the may be any type of storage server, such as an Internet server or an FTP server, and may be provided from any source, such as any Internet service provider. In a key aspect of the sync system, the Internet connection between the devices or between the devices and a server, need not exist at the same point in time. In addition, only those changes to the information which are required to be forwarded to other systems on the system of the present invention are transmitted to enable fast response times.

Data from each of the sync client devices is coupled with a storage server. In one embodiment, each device engine implements all processing required to keep all the systems fully synchronized. Only one device engine needs to be coupled to the sync server at one particular point in time. This permits synchronization of multiple systems in a disconnected fashion. Each device engine will download all transactions encapsulating changes that have occurred since the last synchronization from the server and apply them to the particular device. The change or difference information (termed a "data package" or "change log") is provided in one or more data packages. Each data package describes changes to any and all transfer information across all device engines, including but not limited to application data, files, folders, application settings, and the like. Each device engine can control the download of data packages that include classes of information that apply to the specified local device. For example, contact names and phone numbers while another needs only changes to e-mail, changes to document files.

Compression and encryption of the data packages may be optionally provided. Each device engine performs mapping and translation steps necessary for applying the data packages to the local format required for that type of information in the application data stores. The device engine also includes components which allow it to track ambiguous updates in cases where users have changed data to a particular data field on two different systems simultaneously since the last update. The output of the device engine comprises a data package which is output to sync server database. As noted above, only one device engine need be connected to the storage server 850 at a given time. The data package can be stored on the storage server until a request is made to a particular location of the storage server by another device engine. Access to areas of the storage server is controlled by a management server (MS). In one embodiment, each sync operation requires that the device engine for each device login to the management server to authenticate the device and provide the device engine with the location of the individual device's data packages on the storage server.

When data is returned to the delta module from the storage server, the delta module returns differenced data to the application object for the particular application which then translates the delta information into the particular interface utilized for application. Once a device engine has been fully applied all data packages from an input stream, it generates a series of data packages that describe the changes made on the local system. The device engine uses the local application object 920 to keep track of the last synchronized version of each application's actual data, which is then used for the next data comparison by the delta module on the next sync request. Generated data packages can include operations and encode changes generated from resolving ambiguous cases as described above.

The sync server uses the concept of a universal data record in its internal sync differencing engine and when sending data to and retrieving from external The management server supports an authentication interface that requires each device engine to authenticate with the management server before performing synchronization. Certain storage server implementations may utilize locking semantics to control read and write access to storage for multiple device engines. For example, in a generic FTP request, if two device engines attempt to connect to the same data at the same time, there must be some form of locking control to prevent device engines accessing the same data at the same time. In this instance, the management server controls the device engine acquisition, renewal, and releasing of locks against data stored in the network.

Each device engine is uniquely identified and tracked by the management server. This allows for tailoring behavior between the management server and specific types of storage systems and device engine components. All device engine components are tagged and version stamped for management via the management server.

Also shown in FIG. 3 is a server-side application ID service controller application 170 which includes a persona management component 162, a buddy management component 164, a user interface 166, and a digital rights manager 168. It will be understood in various implementations of the present invention, the functional components operating within the service-side application 170 can come in one case, push information maintained by the system of the present invention directly into phone 100 via a SyncML server 195 interacting with a fully robust SyncML client. Optionally, certain aspects of the control are handled by either the server-side application 170 or the client-side application 140, as described herein.

In accordance with the invention, application agent 140 communicates personification information and changes made to the personification information stored in the data store of the telephone 100 to server 160 via the wireless network. Communication of user data from the device may take several forms. Where the client utilized SyncML communications with the server 160, communication may take place using the standards set forth in the SyncML specification. Changes are transmitted on a record-by-record basis or field-by-field basis. Alternatively, communication may occur via another protocol. The SyncML client is utilized to update the phone's native address book with buddy published information as well as to retrieve persona and link information from the server. Information can be exchanged via the SyncML protocol, or via a direct data link with the server 160. The system server stores and maintains each user account, link personal and buddy information as well as multimedia content, both system provided and user created. The server is a stand alone server and may be incorporated with the features of a synchronization system such as that described in U.S. Pat. No. 6,671,757. Details of this integration are described in further detail below. As noted above, a management interface is provided via the web server 180. Description of this interface is shown below.

The server 160 stores user data in the personification store 150 in a manner which associates the data with the user of the phone. In one embodiment the data is stored in bulk—that is all records and information for the user are stored in simple text form, (or binary form, depending on the type of data in use). This information is stored in the data store using a unique identifier (UID) associating the personification data with the individual user. The identifier may be any randomly selected identifier, so long as the user is uniquely identified, and the data is associated with the user. In a further aspect, this user UID may be a universally unique identifier (UUID), created in a manner described in the aforementioned U.S. Pat. No. 6,671,757, 6,694,336 or 6,757,696 or other manners to create a single ID for a given user. In yet another embodiment, user data and changes to the user data are stored in a change logs in a manner described in the aforementioned U.S. Pat. No. 6,671,757, 6,694,336 or 6,757,696.

A web server 180 allowing a user on a computer or other device 190 having a web browser may optionally be provided to allow a user to configure aspects of the system of the invention. Server 180 may have a hardware configuration similar to computer 160 and may comprise one or more physical computers. Additionally, web server 180 may be integrated with server 160.

In one embodiment, aspects of the system of the present invention are configured via a phone interface. The system can alternatively be configured by a user via a web interface provided by the web server 180 via the user device 190.

FIG. 4 one process for implementing an invitation (step 212) from a subscriber to a non-subscriber or participant. At step 302, a non-subscriber may receive an SMS message from another subscriber. The SMS message may contain all the information necessary for the user to publish the information into their current data book. In one aspect, this can include all persona information itself in a format which can be read by a native or non-native application such as a SyncML client, a vCard parser, or other application and incorporated into the local data store of the phone. If the user accepts the information at step 304, the information can be populated into the user's data book and the next time the subscriber calls, information will be displayed on the user's phone.

In another embodiment, shown in FIG. 5, a user may receive an SMS message from a subscriber, at step 404 and at step 406, the user can select a link stored in the SMS message to connect the user's phone with a server side data store which sends the subscriber's information directly to the phone. At step 408, the user's phone downloads the information from the subscriber to the local data store in the phone.

FIG. 6 illustrates the concept of different personas for different groups of users. FIG. 6 shows a linkage example of different users linked to a central user 600. User 600 "Bob" has a mobile phone which is linked to other users 604, 606, and 602. For each group of users 602, 604, and 606, user 600 can establish a different persona. A friend's persona may show Bob's personal address and home phone number and provide a first type of ringtone. A co-worker's persona 604 provides a more formalized name setting, a work e-mail address, and a work phone number with an undefined ringtone, a client's persona 606 shows an even more formal name, and includes different work and mobile phone numbers as well as a different ringtone more suitable to provide to Bob's clients.

As shown in FIG. 6, people usually have distinct groups with whom which they communicate including friends, co-workers, and clients. The establishment of different personas allows the publication of different information to each individual. As illustrated in FIG. 1, personas can include names, e-mail addresses, phone numbers, physical addresses, corporate information, a picture, ringtones, URLs, personal physical characteristics (eye/hair color, et al) and birthday information. This information handling is flexible and extensible and can accommodate any additional permanent as well as transient information such as a current time zone, digital certificates, a physical location, including GPS coordinates, and availability.

Figure 7:
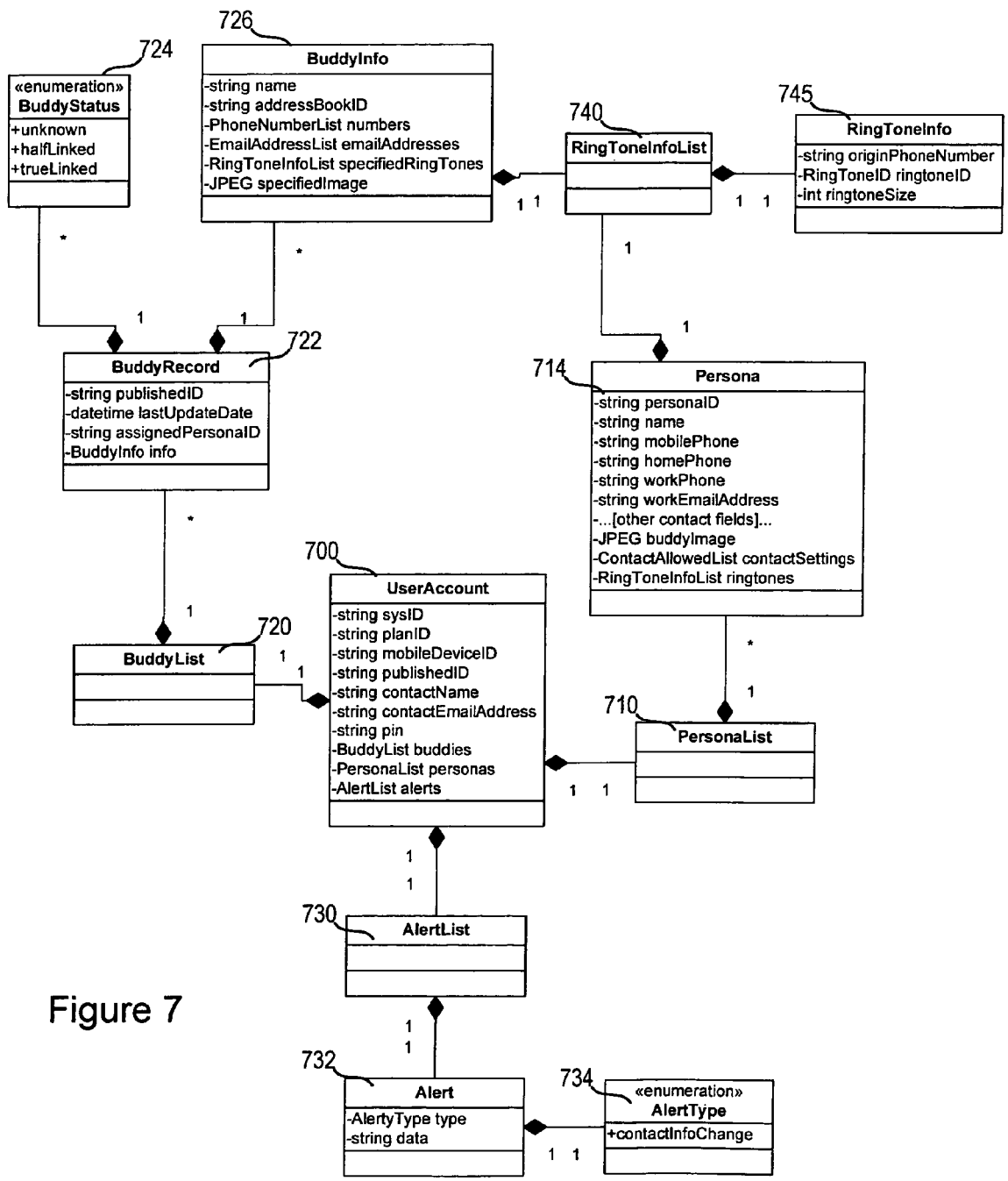
FIG. 7 is an illustration of the structure of a system database store on a server in accordance with the present invention.

FIG. 7 depicts a static structure of the records maintained for an individual user and the server of the present invention. For an individual user account 700, each account will include a system ID, a plan ID (indicating a service level description), a mobile device ID, a published ID, a contact name, a contact e-mail address, and a user security pin. The user account will also contain a buddy's persona list 710, a buddy list 720, and an alert list 730. The persona list will define a number of personas 712, each including, for example, a personal ID, a name, a mobile phone, a home phone, work phone and other information as specified above with respect to FIG. 1. Other information can include a buddy image, contact list allowed settings, and ringtone information. The ringtone information 740 may be a list of information which links to specific ringtone records 745. Each buddy in buddy list 720 has a buddy list record 722 which includes a published identifier, a last update date (indicating when the buddy record was last updated), a personal identifier, a status identifier 724, and information 726. Buddy information 726 includes a name, address book identifier, phone list numbers, e-mail address lists, and ringtone information.

FIG. 8 is a sequence diagram illustrating how a new user can sign up for the system service provided by an enterprise service provider in accordance with the present invention. FIG. 8 shows the sequence of steps which occur on a phone 100 and on the server 160. Upon initialization of the application at step 802, an account creation message is generated at step 804. A create account message is sent to the server and at step 810, an account validation process begins. The account creation step occurs at step 812, and basic records are generated at step 814. The account creation step 804 will prompt the user at step 810 to provide certain basic information such as name and e-mail contact information to the phone system. The account validation step 810 will acquire required information from the user via the phone interface, and an account will be created at step 812 once the required information is provided. Basic account records, including for example, base persona's from the information provided in the validation step 810, are created at step 814. Once the account creation step is finished, at step 816, an account created message will be sent to the user's phone. At step 820, contacts in the user's phone which are present in the user's native address book are collected at step 820, and at step 822 an add contacts message or data transmission will be sent to the server 160. These contacts will be checked and evaluated at step 830 to determine links between known users in the system already, and users who are not linked in the system. A contact list is created at step 832, and the list of potential true links generated at step 834. Note that true links can be created and maintained automatically, without user intervention or approval. However, in this embodiment, at step 834, this list is returned to the user and presented to the user at step 840. The user can then select which of those contacts the user wishes to establish links with, and these links will be established at step 850. Optionally the system can establish links with any user who has already established themselves with the system service as a subscriber, who already appears in the new subscriber's local address book.

FIG. 9 is an alternative method for establishing an account with the enterprise service provider wherein a synchronization system of U.S. Pat. No. 6,671,757, 6,694,336 or 6,757,696 is used. This sequence illustrates that account creation for such a system requires creation of an underlying sync account with the synchronization server, but such account can be created through the advanced ID interface.

At step 902, an account creation step is initiated on the server 160. Server 160 will also create an account with the application server 185 at step 904. Server 160 will provide provisioning information 906 to the client 140, which will then upload its address book at step 908 to server 160. Server will attempt to establish whether direct links are present at step 910 and return those true links to the user at step 912. Concurrently, the system will attempt to perform a synchronization with the user's contact information on the synchronization server 185. At step 916, the user's public persona is synced to each user's synchronization account and if there's any problem with the synchronization at step 918 an out of sync notification message is returned to the client 140. At step 920, records are retrieved regarding the records representing the buddy's personas at step 920. Persona records are thereafter synced as other records are synced in accordance with the description in U.S. Pat. No. 6,671,757.

FIG. 10 is a sequence diagram illustrating the establishment of a new subscriber account on server 160 via the server's user interface provided via the web server 180. At the initialization step 1000 in the user interface 192, account creation interface 1010 is provided to the server user interface 192. The user provides information into the interface and the information is transmitted via a create account message to the server 160. An account validation step will occur at step 1012 after the user has provided sufficient information to establish an account with the enterprise service provider. Once this occurs, an account creation will occur at step 1014 and base records will be created at step 1016. When the account has been established at step 1018, an account created message will be returned to the user offering the user the opportunity to create personas and providing the user with a set of default personas at step 1020. The user will be provided with an initial opportunity to add images and multimedia at step 1022. Next, at step 1024, the user will be provided with the opportunity to check "buddies" which have been created during the contact link establishment steps 208. Once the user has selected which contacts the user wishes to establish connection with, a contact list will be created at step 1026. The list will be sent back to the user at step 1028 and may be used to initialize SMS invitations to those users who are not already established as subscribers with the enterprise service provider.

FIG. 11 illustrates the interaction between a phone client and the server application in a situation where a subscriber may have lost their phone but already has an existing account with the system. Hence, the user merely needs to reestablish connection with the account using the user's new phone. At the initialization step 1102, an account creation routine run on the phone application 140 at step 1104 will send an account creation message to the server 160. When the account attempts to validate the user information at step 1106, a determination that the account already exists will occur at step 1108. This will prompt a message returning to the phone application to ask the user at step 1110 whether the account which has been entered is in fact the user's account. Once the user selects a prompt indicating that it is the same account at step 1112, message will be returned to the server and the account will be updated at step 1114 with the user's new device information. The system may be utilized to restore information to the user's new phone by creating a restored data set at step 1116, which may be returned to the user at step 1118, and the data restored in the phone device at step 1120. This restores the user's information in the user's new phone to the state it was when the user last updated the user's information on the system's server.

As noted above, the client application 140 and server application 180 provide the user with a number of functions to create and manage accounts with the ESP and the advanced ID system.

FIG. 12 illustrates functional use cases for a particular subscriber. A user 1200 can install the application 1202, such as for example by downloading the application to the phone via the phone interface, and create accounts at 1204 in accordance with the foregoing description. Likewise, the user can uninstall the application 1206 delete accounts with the enterprise service provider. The user can also use the application to upgrade accounts at 1210, downgrade accounts at 1214, and change account settings at 1216 in order to modify an account 1218.

FIG. 13 illustrates the functions a user 1200 can implement to perform tasks linking to other subscribers. The user can review a buddy list 1302, requiring the buddy list to be retrieved at 1304. Likewise, the user change a particular buddy's persona assignment at 1305, view a mapping of buddy and personas 1306, override the buddy's published information 1308 in their own phonebook, such as, for example, where a "buddy" had downloaded a ringtone which is not desired to user 1200, remove the buddy from the list of buddies at step 1310, add a buddy by performing a search function at 1312, or invite another person who is not a subscriber to be the user's buddy by subscribing to the system.

Figure 14:
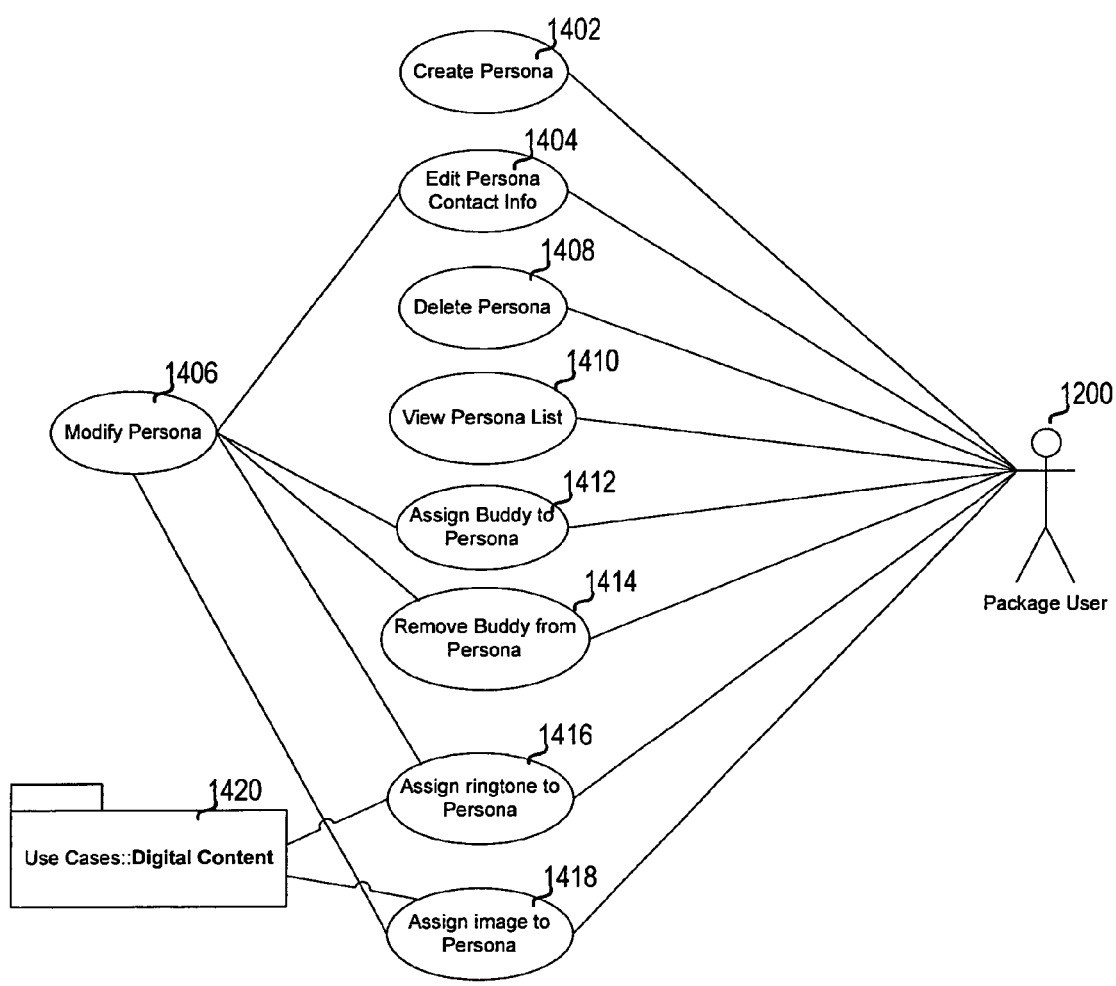
FIG. 14 is a use case diagram illustrating the persona control functions available to a user/subscriber in accordance with the system of the present invention.

FIG. 14 illustrates use cases for the subscriber 1200 with respect to persona manipulation. The user can create persona 1402, edit personas 1404 (which results in a modify persona 1405) delete a persona at 1408, or view a persona list at 1410. Other instances which result in modifying a persona included assign a buddy to a persona at 1412, removing a buddy from a persona at 1414, assigning a ringtone to a persona at 1416 or assigning an image to a persona at 1418. Assigning a ringtone or image also gives rise to the modification of the digital content at 1420, illustrated in FIG. 15.

Figure 15:
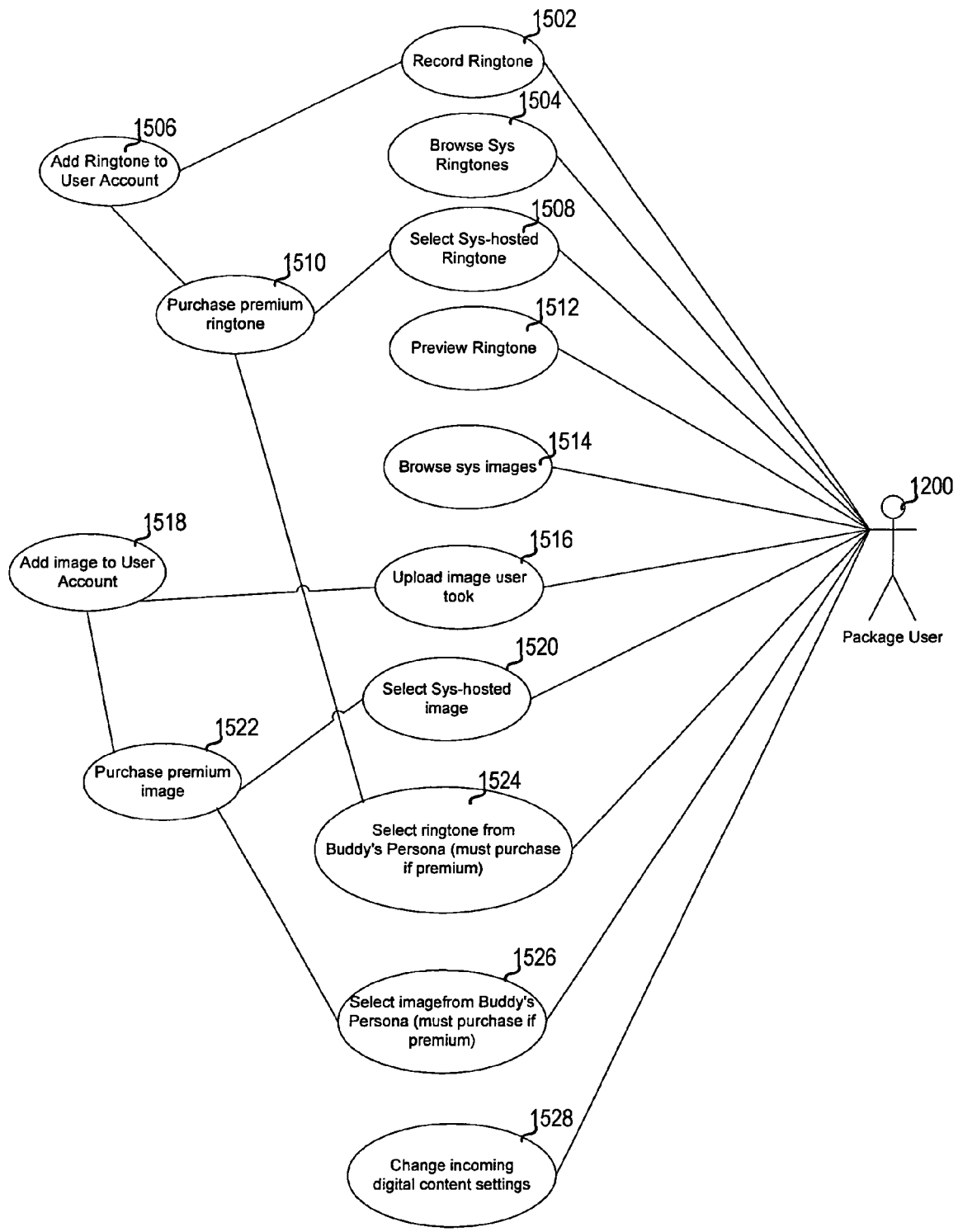
FIG. 15 is a use case diagram illustrating the multimedia control functions available to a user/subscriber in accordance with the system of the present invention.

FIG. 15 illustrates the use cases for an application user 1200 interacting with multimedia content. The user can record a user's own ringtone at 1502, or browse system ringtones provides by a value added service provider via the enterprise service provider at 1504. Recording a ringtone at 1402 results in a ringtone being added to the user's account at 1506. The user can also browse system hosted ringtones at 1508 and may choose to purchase premium ringtones at 1510. The user can also preview ringtones at 1512, and browse system provided images at 1514. The user is allowed to upload images 1516 to and from the user's phone when, for example, the user's phone supports taking pictures, and adding the phone to the user's account at 1518. The user can also choose to select system hosted images at 1520 and purchase premium value added images at 1522. Where a user has purchased a ringtone, at 1524, the user may choose to share this ringtone with buddies. When a buddy selects the ringtone, digital rights management provider rights in the ringtone may require that the second user utilizing the ringtone purchase a license to use that ringtone for themselves. Step 1524 allows a prompt where the system asks the user requesting a buddy's ringtone for their own use to purchase the ringtone from the enterprise service provider. Likewise at 1526, a buddy's image can be utilized by the subscriber 1200, and if such image is premium content, a prompt requiring the user to purchase the image is provided at 1526, at 1528, the user is allowed to change digital content settings in their own phone. If for example a buddy has provided an image and/or ringtone that are unsuitable for the user 1200, the user is allowed to override those settings in their own phone using the application interface.

Figure 16:
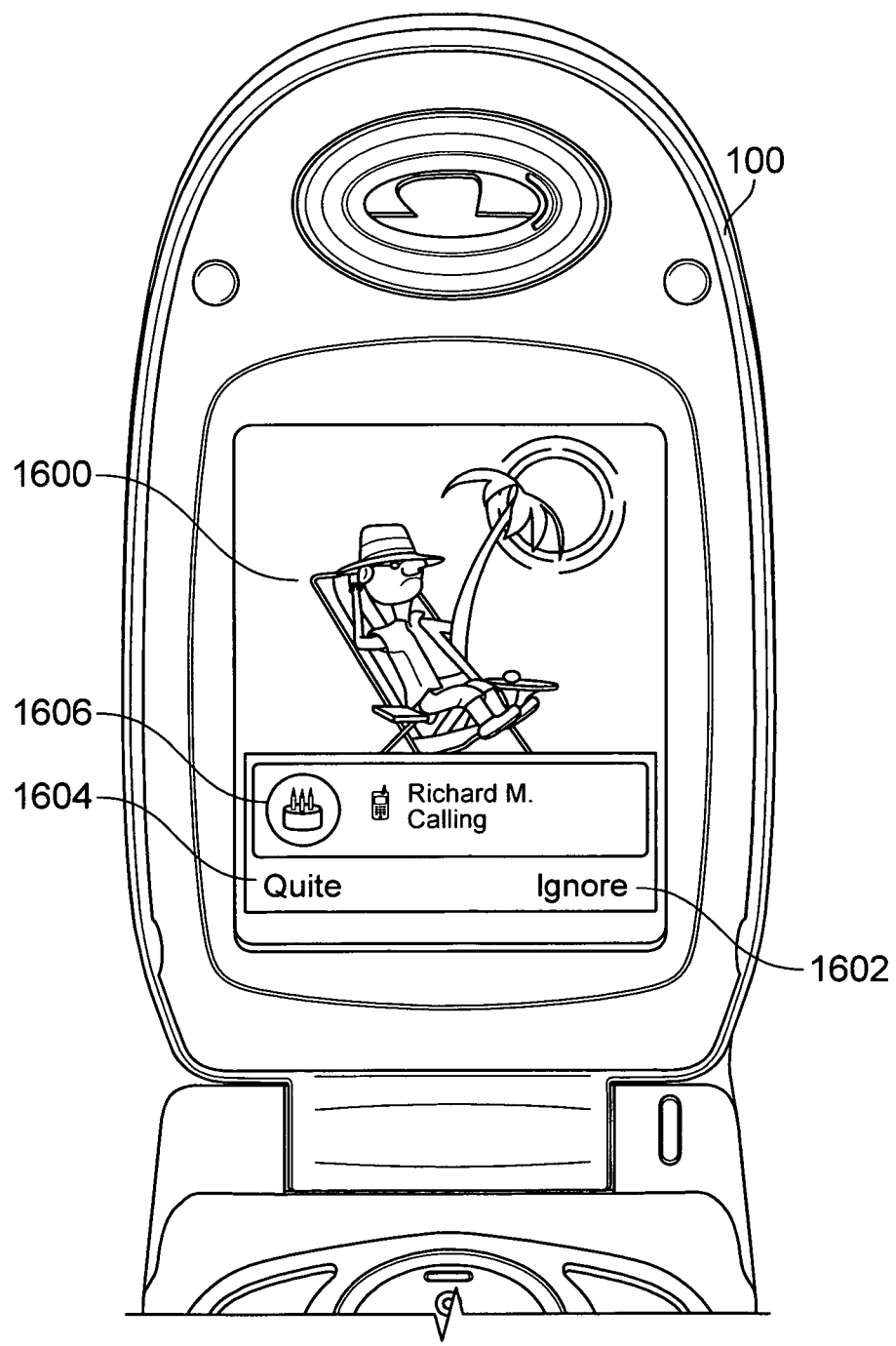
FIG. 16 is an exemplary advanced ID screen provided on a phone in accordance with the present invention.
Figure 17:
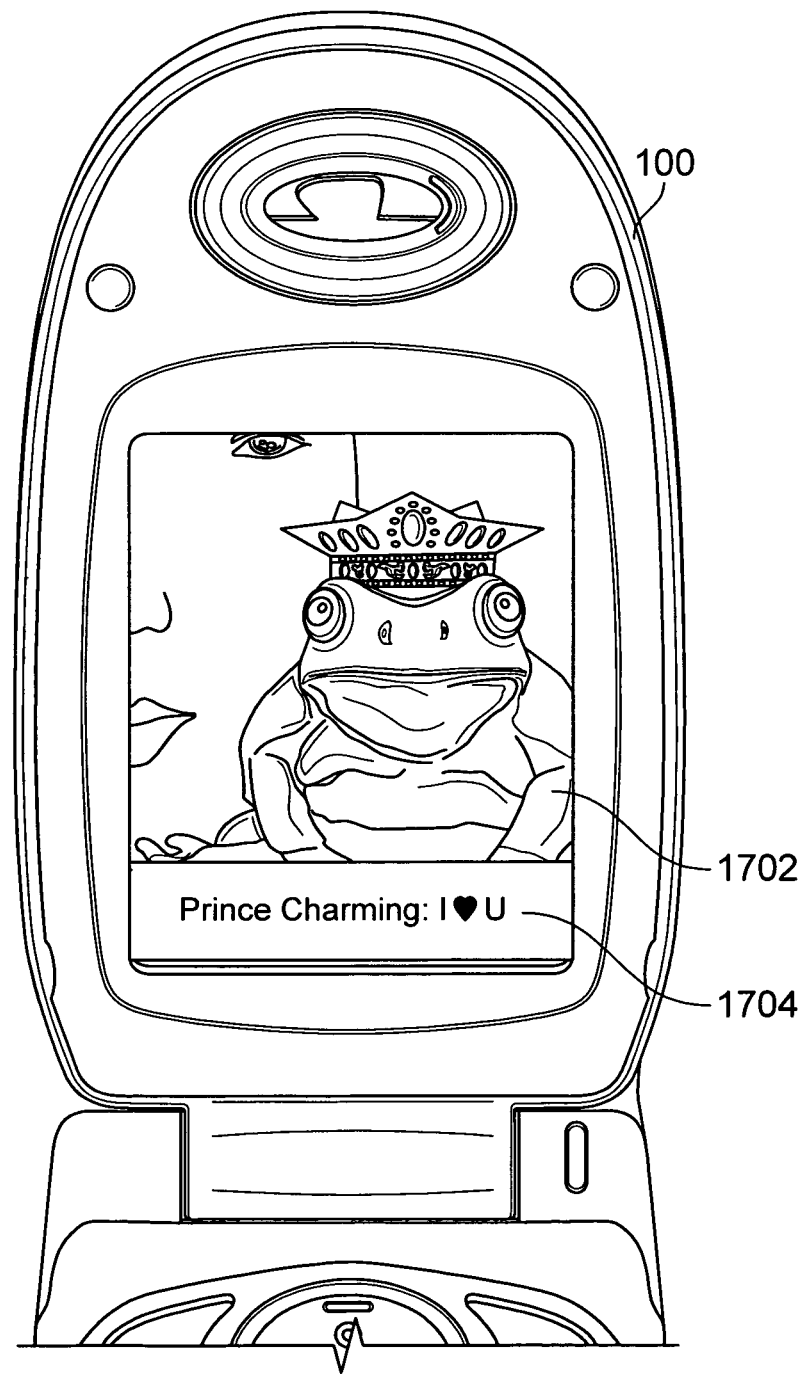
FIG. 17 is an exemplary advanced ID screen with metadata provided on a phone in accordance with the present invention.
Figure 18:
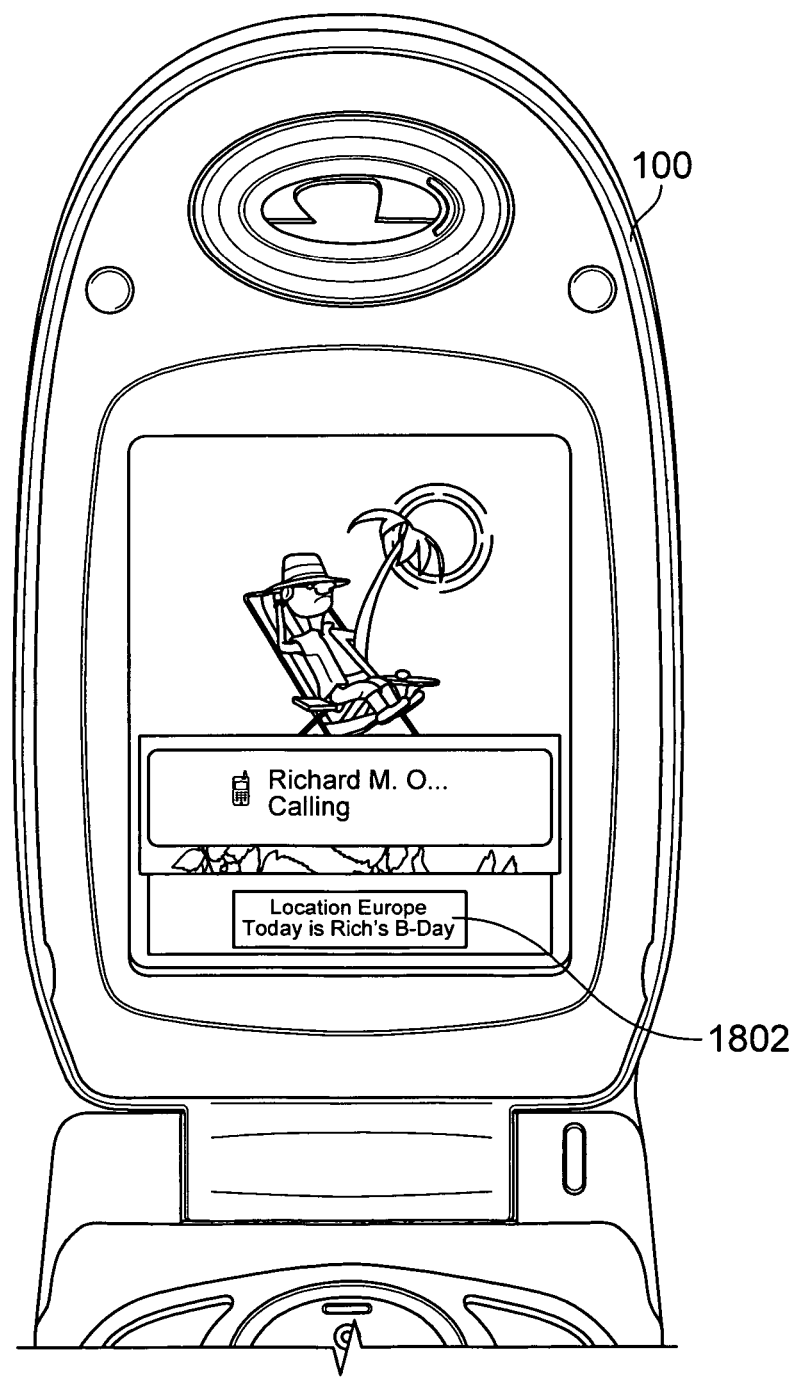
FIG. 18 is an exemplary advanced ID screen with control functions provided on a phone in accordance with the present invention.

FIGS. 16, 17, and 18 illustrate different aspects of an advanced caller ID function as displayed on a phone 100. Once the subscriber information for other users is downloaded to phone 100, displays such as those set forth in FIGS. 16, 17, and 18 may appear.

FIG. 16 shows a first example of a subscriber display. When a calling subscriber "Richard" phones device 100, a display 1600 of the user's name and an image that Richard has provided is displayed on the phone. Even if the native display of the phone 100 includes only support for a thumbnail image (or an image that does not occupy the entire display area of the phone) client 140 can cause the OS services in the phone 100 to display a full screen image along with soft-key enabled function menus 1602, 1604. The display can include an icon 1606 indicating additional information for the user. In this example, a birthday cake indicates it is Richard's birthday. As will be understood by those of average skill in the art, many phones include "soft-keys" which activate variable commands in a menu display in a phone. Selection of the soft keys (generally directly under an interface screen) in the example of FIG. 16 provide ignore prompt 1602 and a quiet prompt 1604.

FIG. 17 shows a depiction of a movie display 1702 on a phone device 100 with a text message 1704 displayed underneath. It will be understood that the image in FIG. 16 is, for example, an AVI, MPEG, QuickTime, or other sample video image supported by the playback features of phone 100.

FIG. 18 is another example of a display for "Richard" wherein additional meta data is provided. This information is depicted in a text message at the bottom portion 1802 of the screen, and includes location information as well as information indicating that today is Richard's birthday.

In a further embodiment, a subscriber display may be provided which incorporates data from sources other than the address book. If, for example, the user has populated a phone's native calendar with information concerning meetings with a contact, the client application can extract this information and display, for example, the user's last or future meetings with the contact. Alternatively, this information can be extracted from a sync user account when a synchronization server is utilized as described herein.

Figure 19:
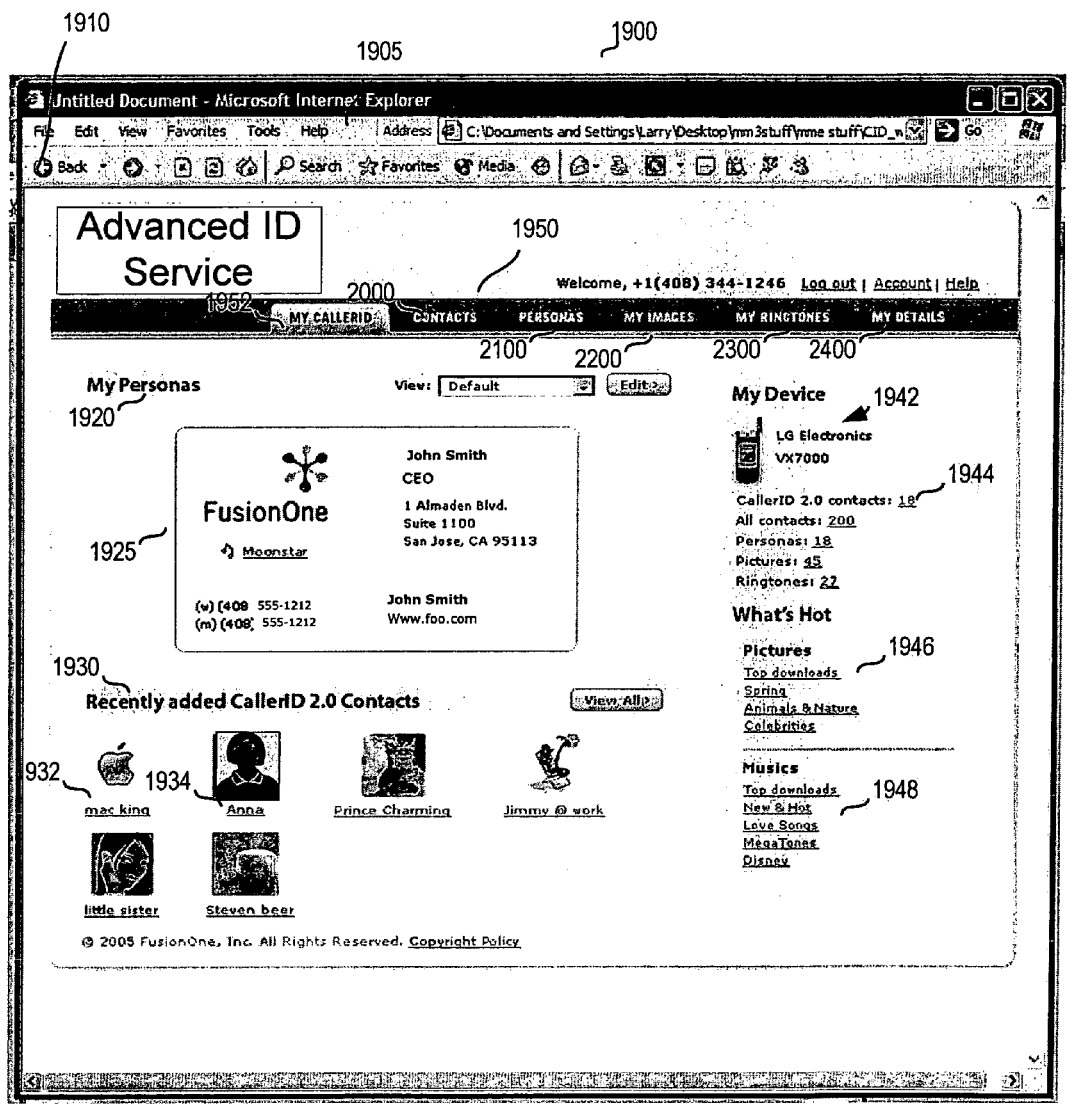
FIG. 19 is an exemplary user interface home screen for a user managing an advanced ID system in via a web browser in accordance with the present invention.

FIG. 19 is a depiction of a user interface 1900 which may be provided by server 160 via web browser 180 to a client device 190. A typical web browser 1910 includes the menu bar 1905 having a number of standard features well recognized to those of average skill in the art. Likewise a menu bar 1910 which includes navigation features for the world wide web is provided. User interface 1900 may be accessed via URL supplied by web server 180. Interface 1900 includes a menu bar 1950 having a "caller ID" "home" menu option 1952, a contacts menu option 2000, a personals menu option 2100, a my images menu option 220, a my ringtones menu option 2300 and a my details menu option 2400. The welcome screen includes a logout account and help link and displays a welcome message to a user based on the user's telephone number. The my device window 1940 displays the system's understanding of the user's current type of device at 1942, status information 1944 including the number of contacts the user has specified as direct link contacts "caller ID 2.0 contacts", the number of total contacts the user has, the number of personas the user has, the number of pictures the user has, and the number of ringtones the user has. An additional section labeled "What's hot" can be utilized by a value added reseller to display digital content such as picture 1946 and music 1948 which allow the user to download this information from the value added service provider and provided to the user's account. A My Personas window 1920 includes a depiction of an address card for the user John Smith and the user's general information in the form of a contact card. A recently added contact section 1930 displays links to user's contacts as hyperlinks 1932 along with a graphic depiction associated with that user's contact. It will be understood that each of the terms on the page highlighted by underlining can provide a hyperlink to more detailed information about the links content.

Figure 20A:
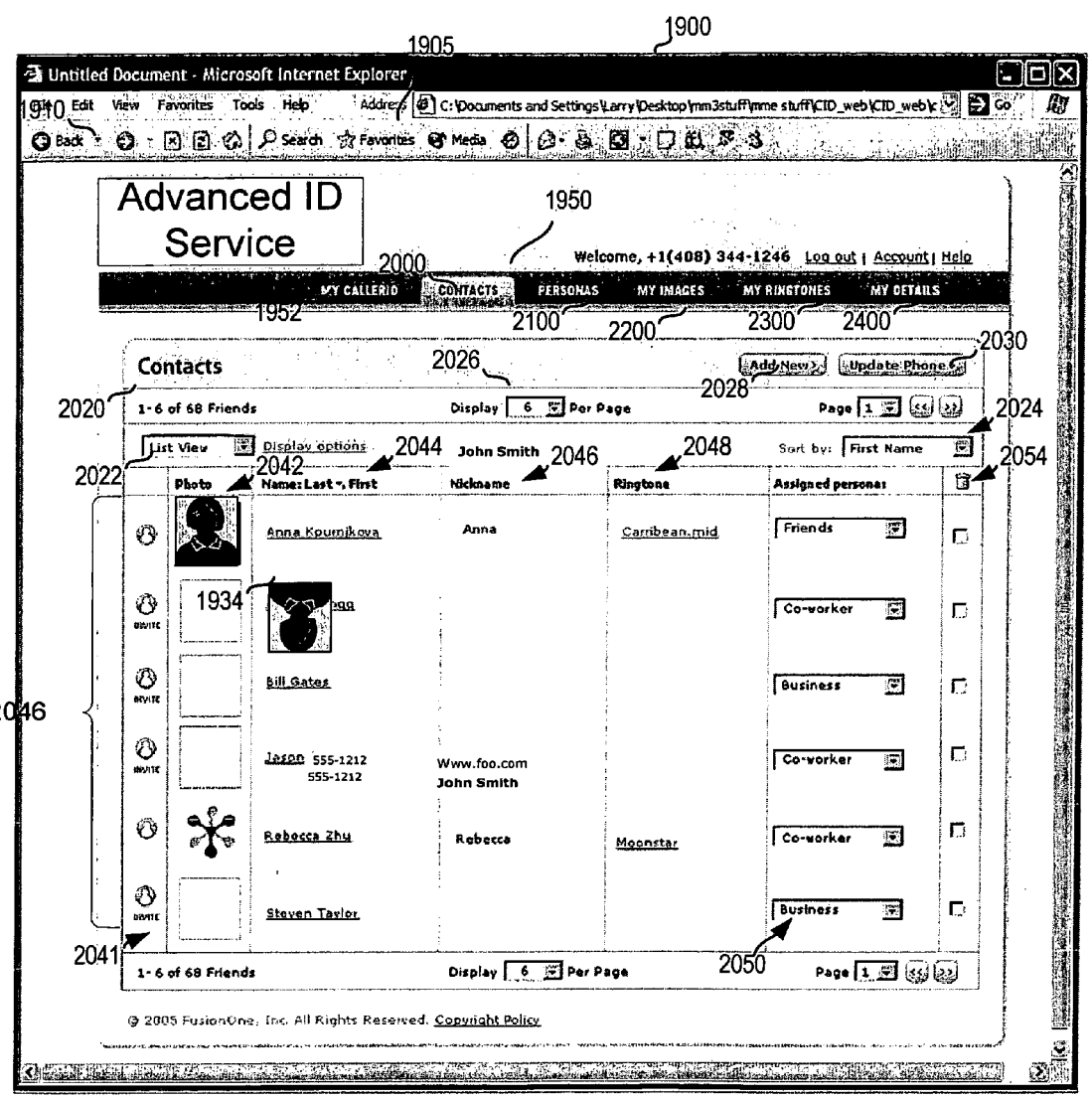
FIG. 20A is an exemplary user interface for managing contacts via a web browser provided by a server in accordance with the present invention.

Selection of the contacts link 2000 on the menu bar 1950 gives rise to the user interface 2000 shown in FIG. 20*a* which is suitable to allow the user to manage user's contacts in the system of the present invention. Contacts interface 2000 includes a contact display 20/20 which provides a user a number of options for listing and editing contacts. A user can choose from any of a number of different types of use via a drop down box 2022. The view shown in FIG. 20*a* is that of a list view for a series of contact 1040. Each contacts includes a photo depiction in column 2042, a name display in column 2044, a nickname field in column 2046, the ringtone associated with that user in column 2048, the assigned persona which may be selected via drop down boxes in column 2050. Likewise, each user is associated with an invite link in column 2041 and tick boxes in column 2052 allow the user to select one or more contacts for immediate deletion via selection of the delete icon 2054. Selection of one of the hyperlinks of a user contact will cause the server 180 to render an edit page allowing the user to edit information associated with that contact.

The functionality associated with the user interface in FIG. 20*a* on a web browser can likewise be provided on a screen on a phone. FIGS. 20*b*-20*m* depict the contact interface which is displayed on a user phone.

FIG. 20b shown an initial start-up screen displaying a "last successful synchronization" that the user has made, as well as status information, (all contacts, Advanced ID contacts, personas, images and ringtones) such as that depicted in FIG. 20a. Options provided to the user at this point by soft-key menu items allow the user to initiate a sync at 2062, or select different options at 2064.

FIG. 20C shows a menu 2066 resulting from selection of the "options" link in FIG. 20b allowing the user to select a contacts interface a personas interface, a sync now instruction, or more detailed settings.

At FIG. 20D, if the user has selected contacts in FIG. 20c, a list of contacts 2068 is displayed. The user can use the soft keys and any other input device on the phone to highlight a user in the display for selection. Selection of a contact opens a record for that contact. Optionally an options menu 2070 is displayed depending on whether the contact is an advanced ID contact or not.

At FIG. 20E, the user may display an options menu 2072 for an advanced ID contact by selecting the options button 2064 in FIG. 20D. This menu allows the user to open a contact, assign a persona to the contact, invite the contact into subscription with the system of the present invention, or disable caller ID for that particular contact. FIG. 20F shows the options interface if a contact which has been selected in FIG. 20D is not an advanced ID enabled contact. The only two options available for the user in FIG. 20F are to open the contact, or invite the contact into subscription with the system.

If an advanced ID contact is opened (from FIG. 20E), the screen of FIG. 20g is displayed. The depiction of FIG. 20g shows that for a particular contact and Anna K, she is a member of the co-workers persona, has a picture assigned entitled "Anna in NYC," is assigned the moonstar midi (moonstar.mid) ringtone, as a nickname "Anna" and has a work number and a home number associated with her contact information. Each of these items is selectable by moving a selection input on the phone and depressing an entry button. For example, pressing the Anna in NYC selection will result in the display shown in FIG. 20H wherein a graphic image associated with the contact is displayed. Selecting the moonstar midi ringtone will result in playing the ringtone in the depiction shown in FIG. 20I. Selecting the nickname will allow the user to change the nickname via an interface 20J displayed on the phone.

Selecting the persona brings up a change persona menu as shown in FIG. 20K. A change persona menu will display current personas which are associated with the user and allow the user to select one or more personas to change the particular user to. If the user selects, for example, the co-worker persona, a message such as that shown in FIG. 20L will be displayed indicating to the user that the co-worker persona has been assigned to Anna K. Finally, if the user selects to disable caller ID from the user, a warning message is displayed such as that shown in FIG. 20M.

Figure 21A:
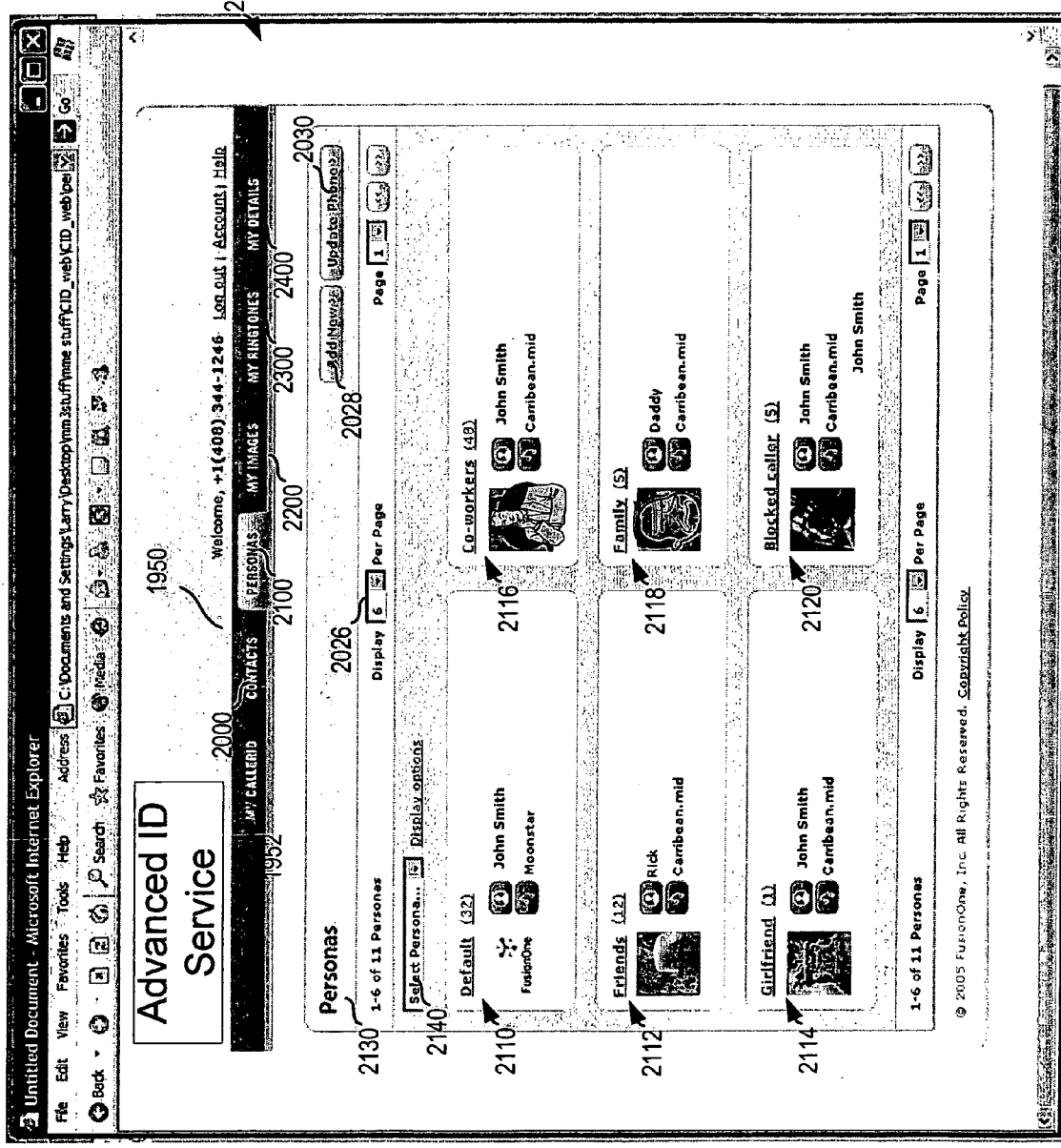
FIG. 21A is an exemplary user interface for managing personification information provided by a server on a web server in accordance with the present invention.

Pressing the "persona" menu item 2100 in menu bar 1950 in FIG. 19 displays a personas interface 21000 shown in FIG. 21A.

As shown in FIG. 21A, the persona screen displays a number of personas 2110 and 2112, 2114, 2116, 2118, and 2120 which provide the user with a short display of name of the persona, the number of users to whom the persona is assigned in parentheses, and the image the user is displaying in the persona to others, the name the user's displaying to others and the ringtone the user is displaying to others. It should be recognized that components of the interface include additional components of the persona, or less components of the persona depending on the real estate available on the user interface on the web page.

FIGS. 21B-21N illustrate the same functionality provided in the interface 2100 on a phone device.

FIG. 21B shows a personas menu 2130 which includes links to each of the defined personas for a given user. In FIG. 21B these are "default" friends, co-worker, family, girlfriend, and blocked caller. Selection of the options soft key menu gives rise to a menu shown in FIG. 21C allowing the user to open, create a new persona, edit a current persona, or delete a current persona. If a user selects to open a persona such as the default persona, the display shown in FIG. 21D is shown. The display in FIG. 21D shows that for a given "default" persona, the name of the persona is displayed, the associated image "F1 logo" is displayed, the ringtone "moonstar.mid" is displayed, the nickname associated with the persona is displayed and a work number and home number associated with the persona is displayed. Selection of the persona name by navigating to the name and selecting using a phone input selection mechanism results in the display shown in FIG. 21E offering the user a selection changing the soft keys to "ok" and "assign." Selection of the assigned soft key results in the display shown in FIG. 21F, showing the users which have been assigned to this particular persona by the user. Current returning to FIG. 21C, selection of the "new" menu item results in a template shown in FIG. 21D. All the items in the template are blank, allowing the user to add via a soft menu selection button, the items for each of the entries depicted in FIG. 21D. The only menu entry which is pre-populated is the user's phone number as shown in FIG. 21G. Depressing the add name selection in FIG. 21D results in the display in FIG. 21H, allowing the user to enter via the phone's text entry method the name of the persona. FIG. 21I shows at selection of the "multitap" soft key at the base of the FIG. 21H allows the user several input methods for text such as multitap, numbers, T9 word entry, or symbols. Once the name has been specified in FIG. 21H the display of FIG. 21J illustrating the name of the persona is displayed. FIG. 21K results when the user has selected the add soft key in FIG. 21J and the associated entry with a selection to add a graphic. FIG. 21K displays those graphical or image entries which are "on the phone" and allows the user to select one of the displayed entries. If the user selects the "bird" entry the image that's displayed is shown in FIG. 21L. Likewise, FIG. 21M displays a list of ringtones available for the user, and FIG. 21M displays a user's availability to delete the ringtone.

Figure 22:
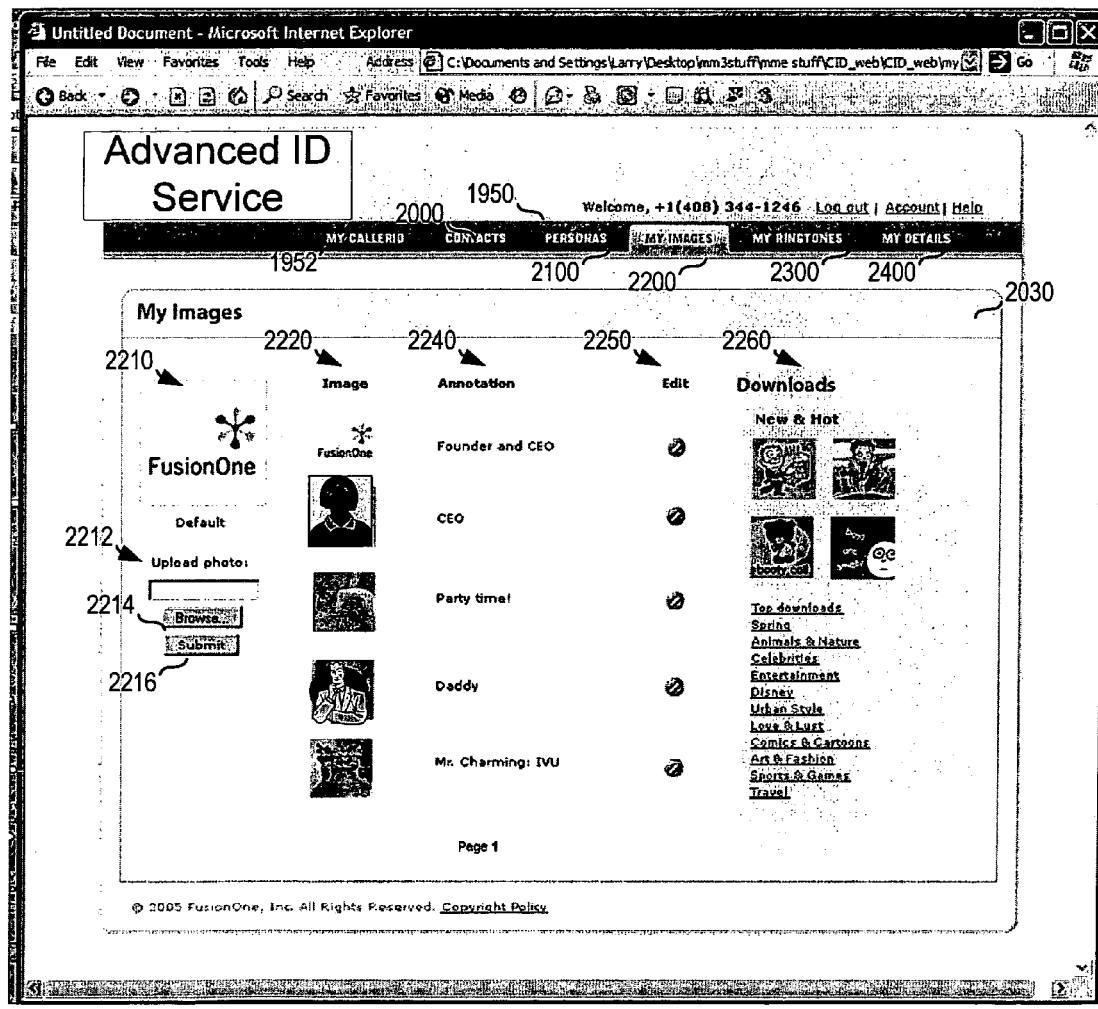
FIG. 22 is an exemplary user interface screen provided on a server allowing a user to manage images in accordance with the system of the present invention.

FIG. 22 is a graphical user interface displayed in web browser allowing the user to manage images in accordance with the present invention. Images available to the user are displayed in a column 22/20, along with an associated nickname in column 22/40, and an edit function hyperlink in column 22/50. A default image for the user 2110 is displayed such that should the user create personas, the default image will be used. A upload interface 2212 including a browse selection button and a submit button 2216 are provided allowing the user to upload various images to their account. A premium downloads section 2660 offers the user links to value added service provider content to be downloaded and utilized by the user in accordance with the terms of the value added service provider.

Figure 23:
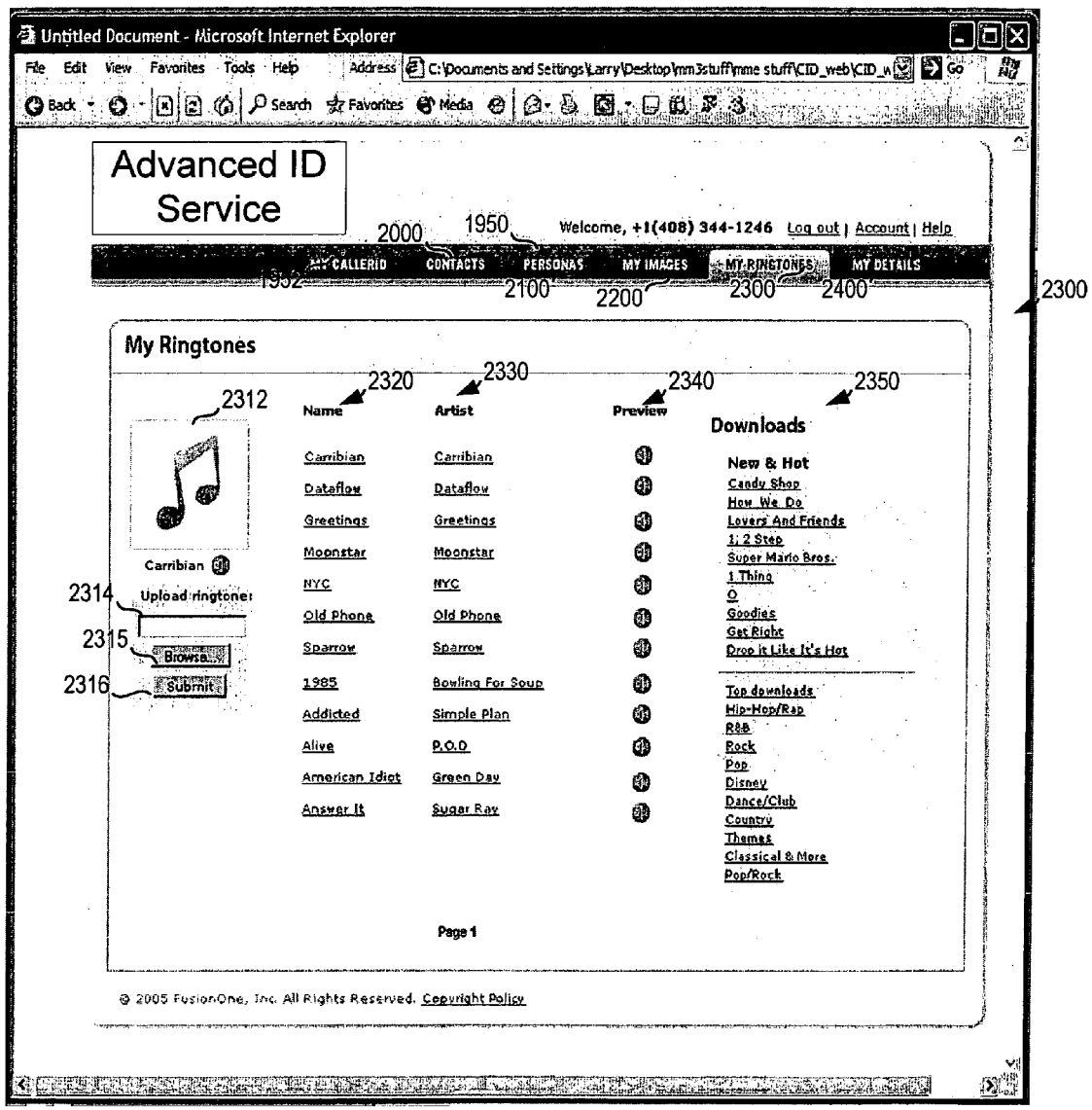
FIG. 23 is an exemplary user interface provided by a server in a web browser allowing a user to manage multimedia in accordance with the system of the present invention.

FIG. 23 illustrates an interface for managing ringtones in accordance with the present invention which provided in a user-interface and web browser by the web server 180. A My Ringtones window 2310 includes a list of ringtones 2320 which have been uploaded or are available to the user via their account. The name of the ringtone is displayed in column 2320, the artist in column 2330 and a preview in hyperlink 2340. Likewise, default ringtone for the user is displayed at 2312 and an upload interface provided as in a manner somewhere to the image upload interface. Again, a value added download section 2350 can be provided to allow a digital content provider to provide value-added content downloadable by the user via this interface. An upload interface 2314 including a browse button 2315 and submit button 2316 allow a user to add to the ringtone selections for his account In a well known manner.

FIG. 24 displays a My Details interface 2400 upon selection of link 2400 in bar 1950 of FIG. 19. The interface 2400 allows the user to manage information associated with the user's account. A personal information section 2412 allows the user to input and change the user's first, middle and last name, as well as the user's nickname and detailed personal information, such as their birthday, anniversary and spouse's name. A home information and business information section 2420 and 2430 allow the user to specify a number of contact points and contact numbers for the user which are then used to allow the user to create personas in accordance with the foregoing description.

Figure 25:
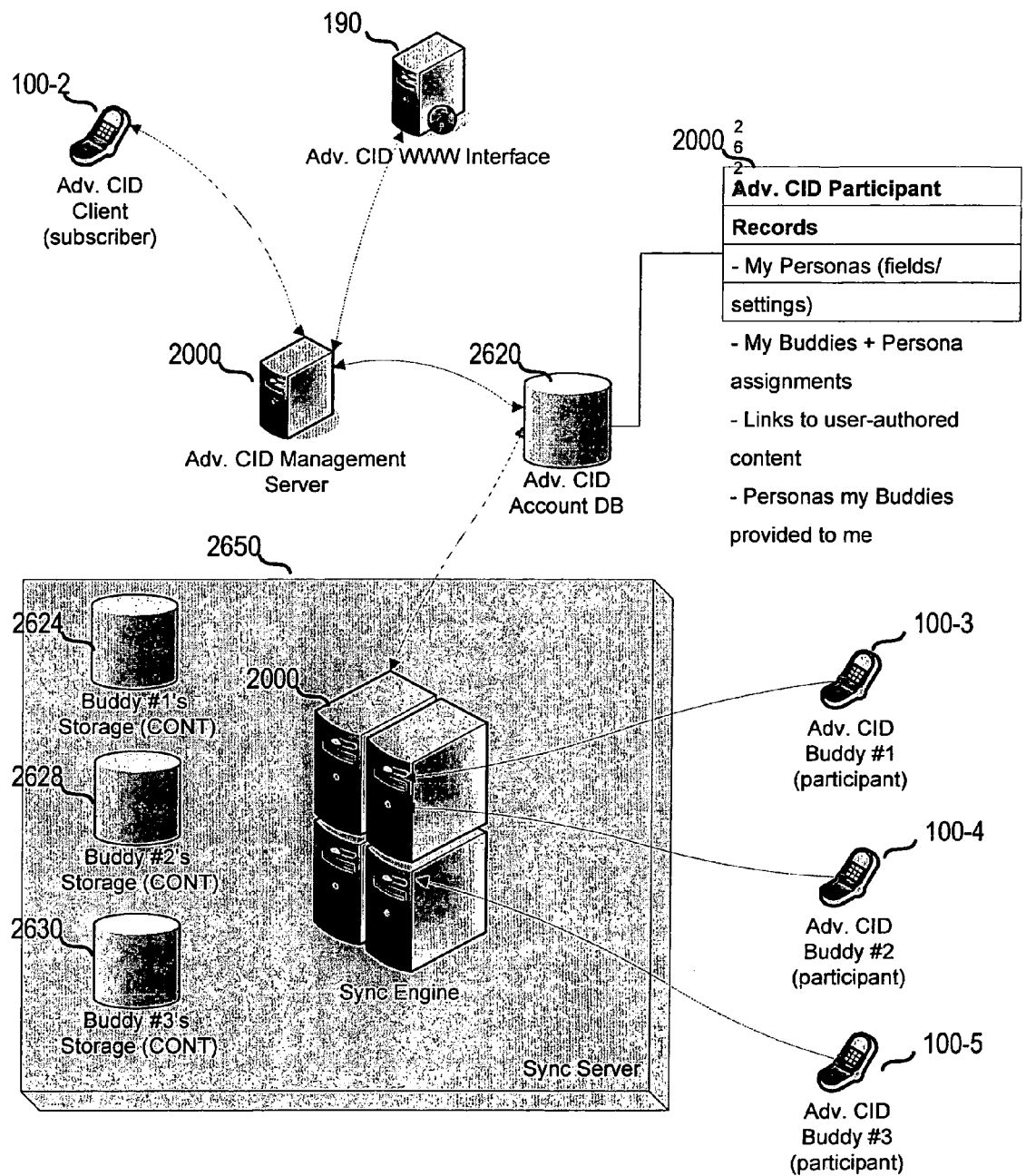
FIG. 25 is an alternative client server configuration utilizing the synchronization system disclosed in U.S. Pat. No. 6,671,757 to implement the system of the present invention.

As noted above, when the system is implemented in accordance with a synchronization system as shown and described with respect to U.S. Pat. No. 6,671,757, 6,694,336 or 6,757,696, additional elements other than those shown in FIG. 3 may be present. FIG. 25 is block diagram illustrating how the integration between a number of users and the synchronization server 2550 implemented in accordance with U.S. Pat. No. 6,671,757, 6,694,336 or 6,757,696 as used in to the present invention. An advanced ID management server 2510 may comprise a server 160 or a sub-set of the elements of server 160, but including at least a management application 170 and a user info store 2520 to a persona database 2520 containing subscriber records 2522. The synchronization server 2550 is provided with sync account records 2524, 2528, 2530 for a number of buddies of a subscriber 100-1. Synch server 2550 communicates the synchronization mechanism disclosed in U.S. Pat. No. 6,671,757, 6,694,336 or 6,757,696 with buddy users 100-3, 100-4, and 100-5. Rather than directly communicating changes via a download and upload of data, the transaction data packages as disclosed in U.S. Pat. No. 6,671,757, 6,694,336 or 6,757,696 communicate persona information by distributing changed logs to the client 100-3-100-5. The user communicates with the system server 2510 via the phone interface or web interfaces as previously described.

Figure 26:
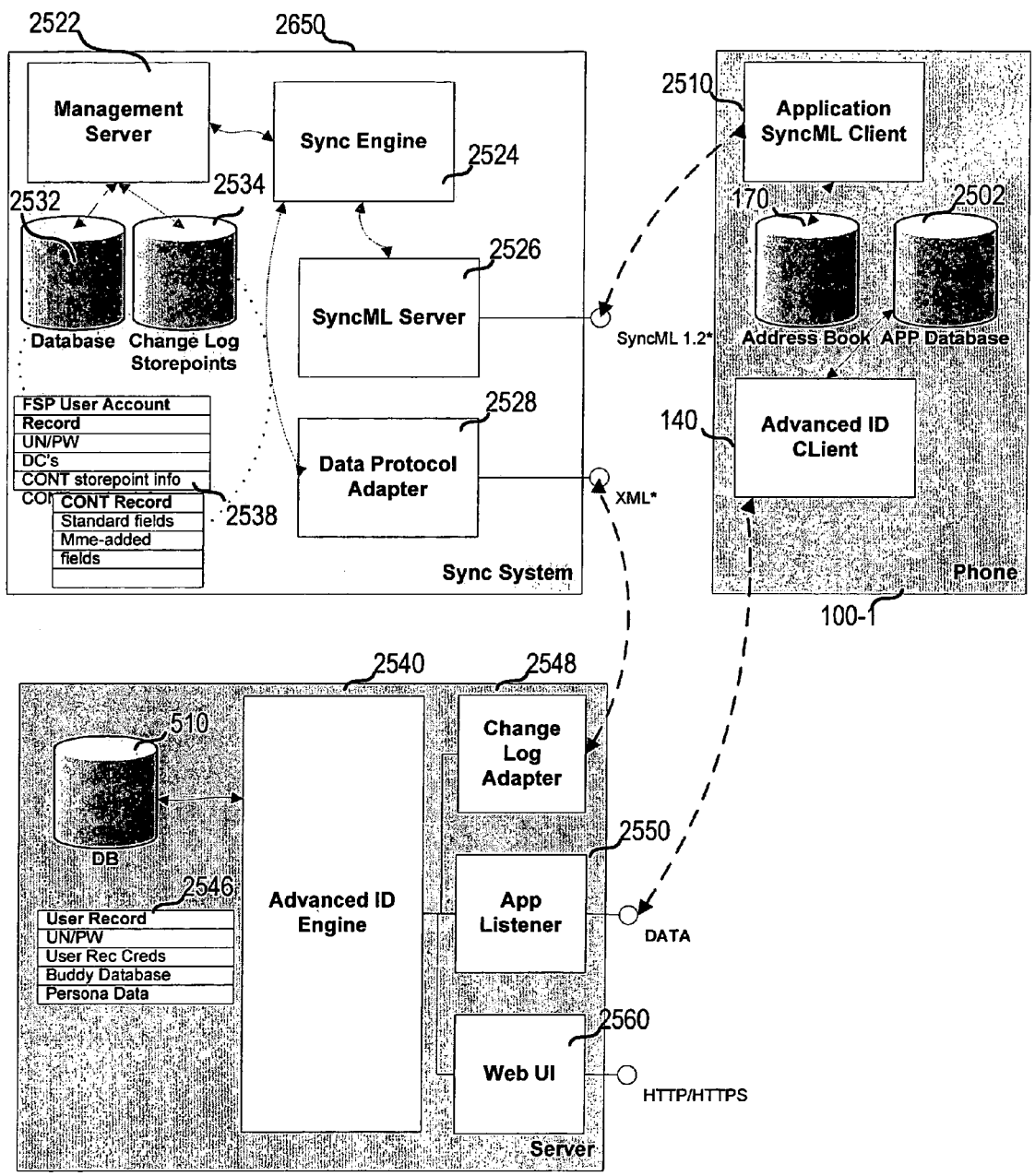
FIG. 26 is a depiction of the system of FIG. 25 integrated with multiple participants and subscribers in accordance with the system of the present invention.

FIG. 26 is a block diagram depicting a more detailed alternative configuration of a sync server system, advanced ID server and client system for implementing the present invention. In FIG. 2, the server system is depicted as a stand-alone device communicating with a client such as a phone 100. In FIG. 26 a phone 100-6 is depicted as including an application client 140 as well as synchronization client 2610, such as that described with respect to U.S. Pat. No. 6,671,757. An advanced ID system server 2640 includes a database 510 having a user content records 2646, which include personas stored for subscribers as previously described. Server 2640 also includes a web server 2660 providing the web based interface screens disclosed in the foregoing figures. A client listener engine 2650 communicates with the client application 2675 to allow the user to input changes directly to the server side of the system 2640. A change log adapter engine 2640 allows communication of changes to and from the synchronization server 2650. A synchronization server 2620 is also provided. The synchronization server communicates with the synchronization client 2610 via a SyncMO server 2626 and with the Advanced ID server 2640 via a data protocol adapter 2628. A management server 2622 as described in U.S. Pat. No. 6,671,757 communicates with a synchronization engine 2624 to control synchronization data packages stored in data store 2632. The system allows the user's information to be stored across any number of multiple devices, and allows users having accounts with the synchronization server to have their information incorporated into the subscriber's advanced ID system. Each user account with the advanced ID service in the present invention requires the creation of corresponding synchronization account of the user. The synchronization account is used to synchronize the user's contents between the device and the system server 2640. The system server 2640 modifies the appropriate contact in the user's persona and information.

The personal records may be represented in the synchronization system's content records by a specially added contact record field. When a change log describing a persona arrives at the listener engine 2640, advanced ID engine 2642 collects the affected buddies, finds the corresponding synchronization server record, and provides the contact modified transaction change log containing the new persona information back to the synchronization server. The synchronization server adds these modified transactions in accordance with the description of U.S. Pat. No. 6,671,757, 6,694,336 or 6,757,696 to the directly linked buddies' synchronization accounts. On such buddies' next synch, each party retrieves the updated contact record representing the persona that the user has assigned it to. Once the synchronization server 2650 contacts the system server 2640, the system server tracks which persona a given buddy is assigned to by adding a field to the contact record. Device 100-6 incorporates a device sync client 2610 which syncs with the device's address book with change logs provided by the synchronization server 2650. Both the native database 150 and the application ID database 2602 may be used to store records for the advanced ID system in accordance with the present invention.

Figure 27:
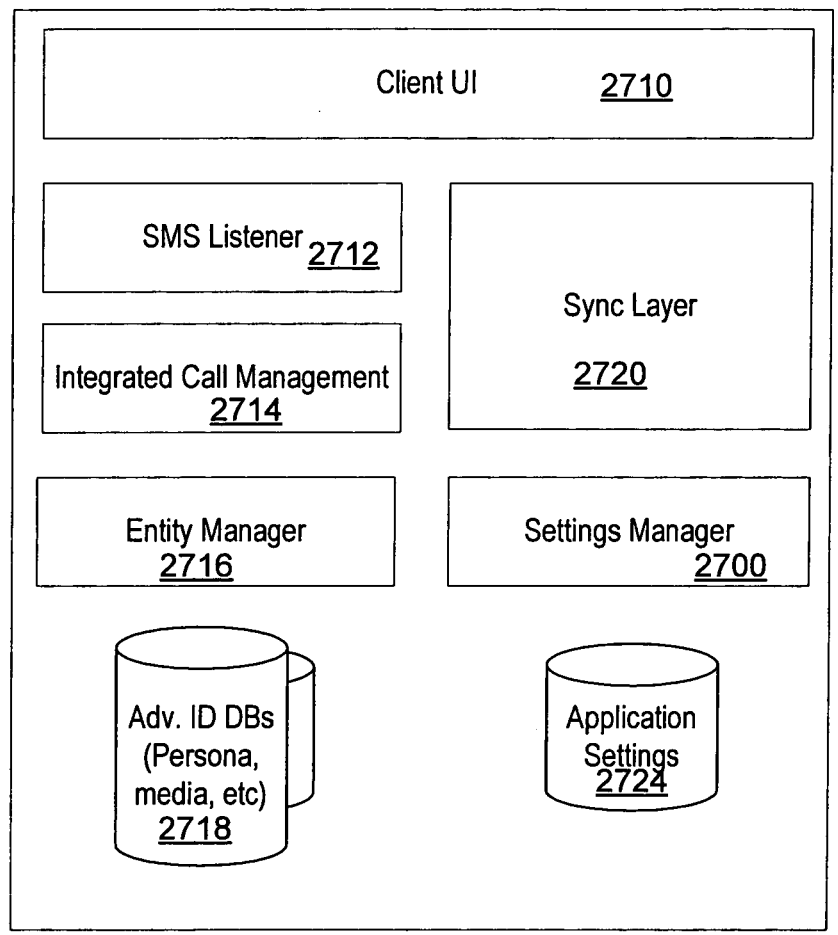
FIG. 27 is an exemplary client application structure suitable for use in accordance with the present invention.

FIG. 27 depicts a client side application including a number of subsystems. A client 2700 includes user interface 2710, an SMS listener 2712, integrated call management 2714, an entity manager 2716, a application database 2718, a synchronization layer 2720, (if utilized with the technology of U.S. Pat. No. 6,671,757, a settings manager 2722, and an application settings data store 2724. Client 2700 includes a user interface which displays the interface screens of the present invention as previously described. In various configurations, portions of the phone's native address book 150 and an application specific, secondary data store 2718 store advanced ID information on the device. As noted above, when a subscriber contacts phone 100-6, the application 2700 accepts the inbound call and depending on the robustness of the supported device and displays a custom user interface, including for example, the full screen image overlay with meta data, or a video clip. Integrated call management 2714 allows the user a variety of options to dispense with the call, such as answering, sending it to voice mail, or blocking the call to automatically populate the address book with the caller's public information. The entity manager maintains persona and buddy information on the client itself, as discussed below. The Sync layer 2720 supports synchronization with a sync server such as that described in U.S. Pat. No. 6,671,757. The settings manager 2722 maintains the user's preferences with respect to the application (such as application defaults and when the user may not want to be disturbed), which are stored in application settings store 2724.

Figure 28:
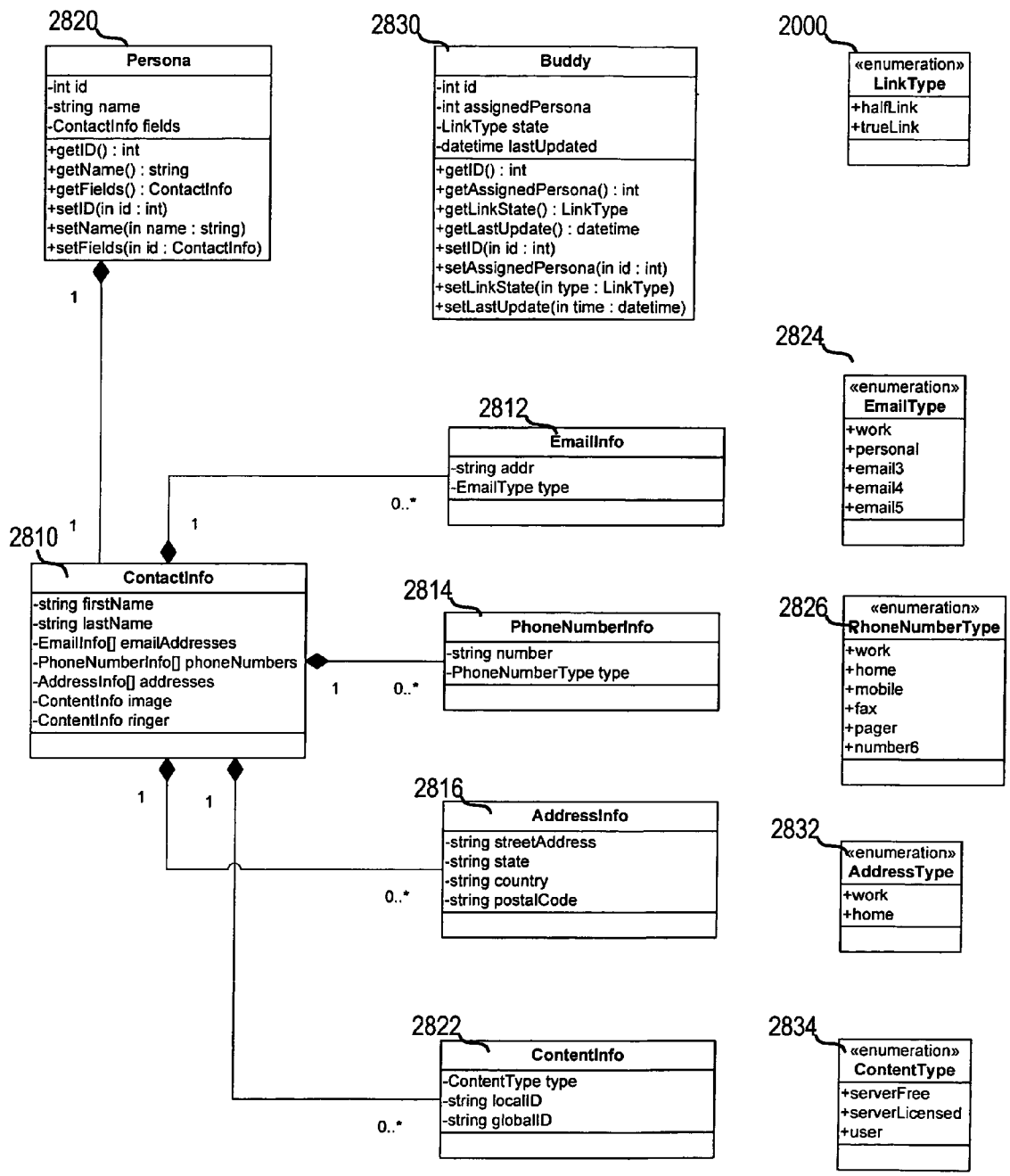
FIG. 28 is a static structure illustrating the information contained in a client-side database in accordance with the present invention.

FIG. 28 is a static illustration of the fundamental client objects utilized in the client database 2718 alone or in conjunction with a native database 150. As shown in FIG. 28, for each instance 2810 of content information for a user, the instance may include email information 2812, phone number information 2814, address information 2816 and other content information 2822 such as a local ID 2822 and global ID. Each contact instance 2810 is associated with a persona 2820 and each persona identified by an identifier associated with the user. Buddy records 2830 include a buddy identifier, an assigned persona, what type of buddy they are (link type) and a filed indicating when the buddy information was last updated. Likewise, the e-mail information includes e-mail type enumeration 2824, phone number information 2814 includes phone number enumerations 2826, address information 2816 includes address enumerations 2832 (for work or home addresses), and content information 2822 includes for digital content, whether it is free or licensed information 2834.

Figure 29:
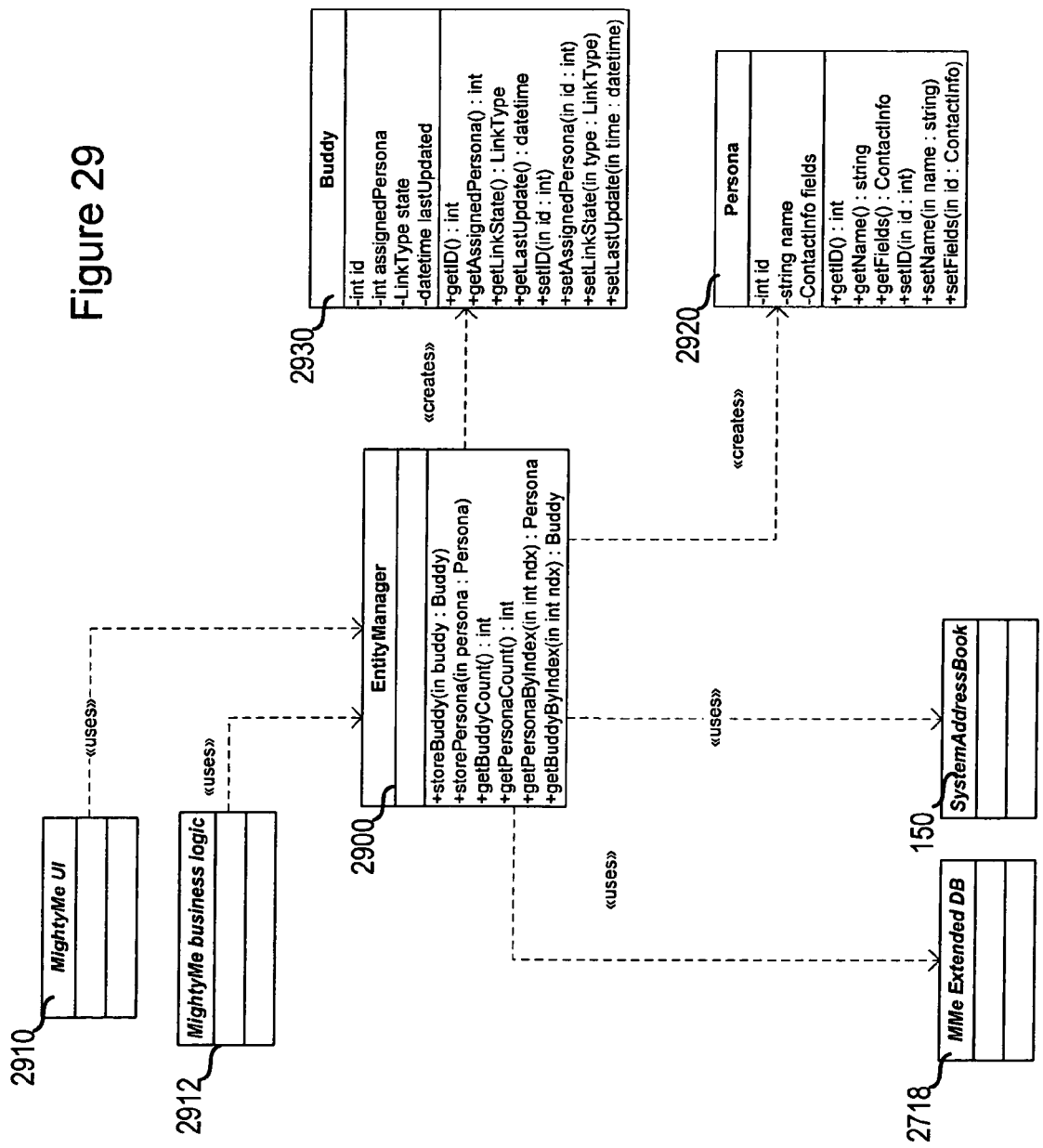
FIG. 29 is a static structure of an entity manager utilized on a client structure such as that shown in FIG. 28.

FIG. 29 is a depiction of the entity manager 2716 shown in FIG. 27. Personas and buddies are collectively referred to as entities and are handled by the entity manager 2900. As noted above, very few available devices support sufficiently robust address book data required for the implementation of the system in the present invention. To support the new data types required for this system, extended database 2718 depicted in FIG. 27 may be required. Entity manager 2900 controls the use of these two data stores. Due to the peculiarities at the particular platform in question, entity manager 2900 serializes the buddy and persona objections from the system address book and its additional databases. Entity manager 2900 gathers the serialization code in a central place and allows expansion of the data set to include additional fields. Entity manager 2900 manager creates a serialized a buddy and persona records 2830, 2820, respectively and uses the system address book, the user interface 2710 and business logic, which is then created by the user at 2912.

Figure 30:
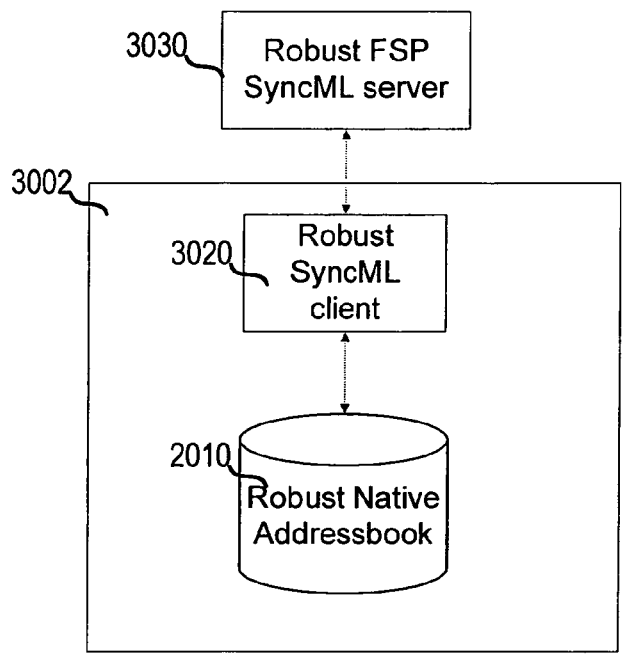
FIG. 30 an exemplary alternative configuration of a client application in accordance with the present invention.

FIGS. 30, 31, 32, 33, and 34 illustrate alternative configurations for the client shown in FIG. 27. An optimal configuration 3002 is shown in FIG. 30 wherein a native robust address book 3010, a robust SyncML client 3020, and a robust synchronization server 3030 are provided. In this configuration, there may be very little for the client application 3002 to do, other than managing multimedia content presenting user interface. Most of the management and push of persona information occurs on the server 3030.

Figure 31:
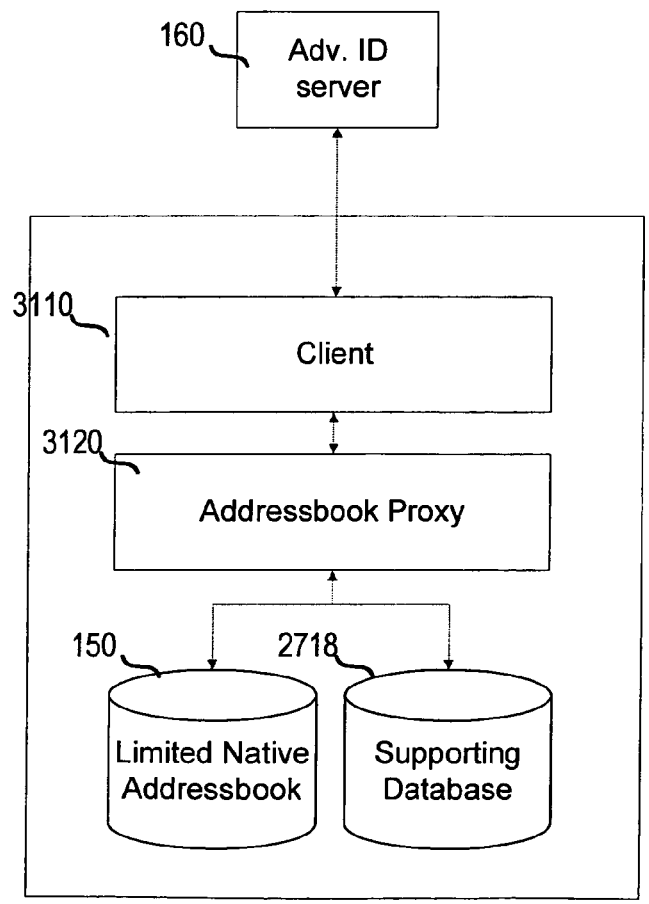
FIG. 31 is another alternative client configuration in accordance with the present invention.

Since most current clients do not include native robust address books and SyncML clients, FIG. 21 presents an alternative configuration allowing a client 3102 to communicate with an advanced ID server 160. The server 160 communicates with client 3102 via a shared communications protocol as shown in FIG. 31. Client 3102 includes a protocol engine 3110 being an address book proxy 3120 and utilizes both the limited native address book 150 and supporting database 2718. An address book proxy 3120 (such as entity manager 2900 or some other form of proxy mechanism) manages communications and storage of information between the respective stores 2718 and 150.

Figure 32:
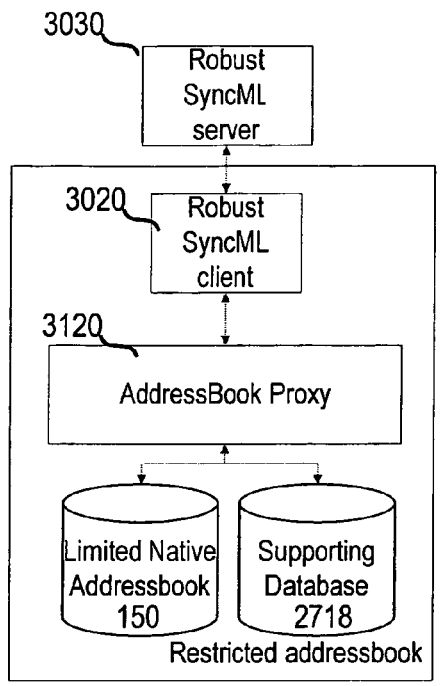
FIG. 32 is yet another alternative client configuration in accordance with the present invention.

Yet another alternative configuration is shown in FIG. 32. In FIG. 32, a robust SyncML server communicates with a robust SyncML client 3020, but utilizes an address book proxy 3120 to split information between the database 2718 and address book 150.

Figure 33:
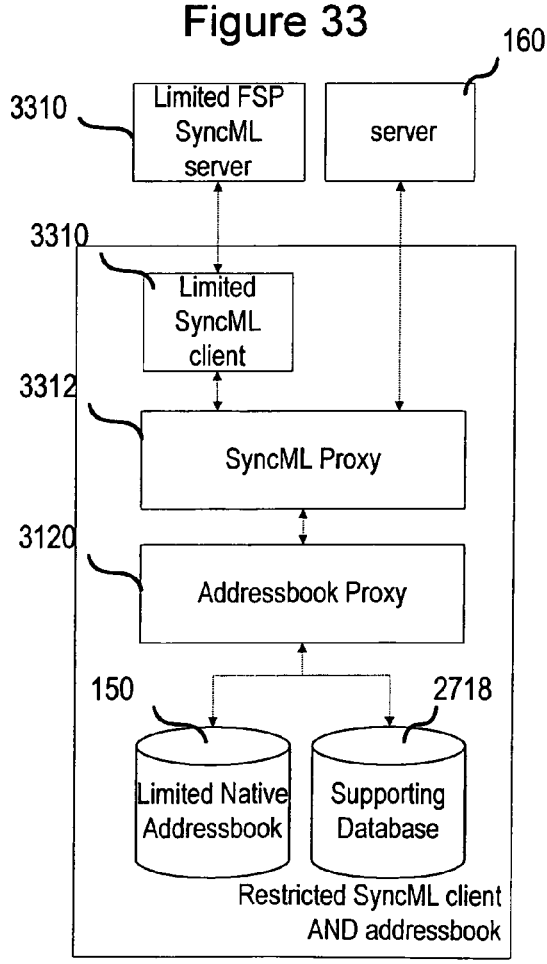
FIG. 33 is yet another alternative client configuration in accordance with the present invention.

In FIG. 33, a limited SyncML server provides support for some synchronization information required for the persona, but not all the necessary information required. Likewise the phone's SyncML client may only support limited synchronization or field support. For example, the server 160 may support address and phone number synchronization but not downloading of movies and ringtones. In this embodiment, server 3310 cooperates with the systems server 160 to communicate certain information via a limited SyncML client 3130, while other information is communicated directly to phone's proxy 3312. Multimedia information can be provided via the support applications 3310 and 3130, while more basic information is provided to proxy 3312. An address book proxy 3120 to split information between the database 2718 and address book 150.

Figure 34:
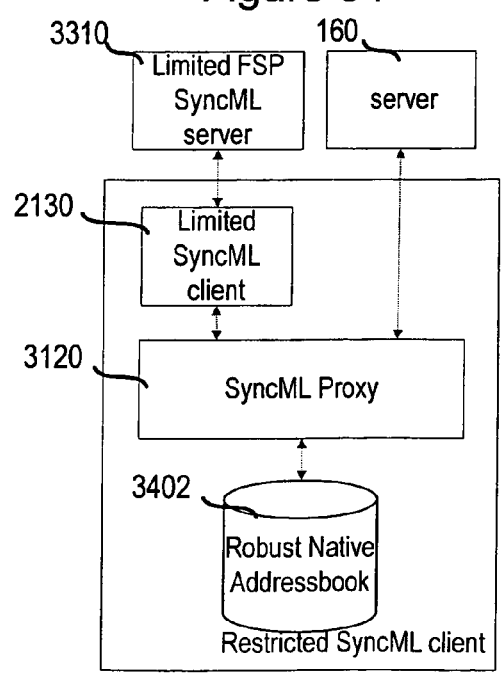
FIG. 34 is yet another alternative client configuration in accordance with the present invention.

In FIG. 34, the client is equivalent to FIG. 33 except that information is stored in a robust native address book 3402.

Figure 35:
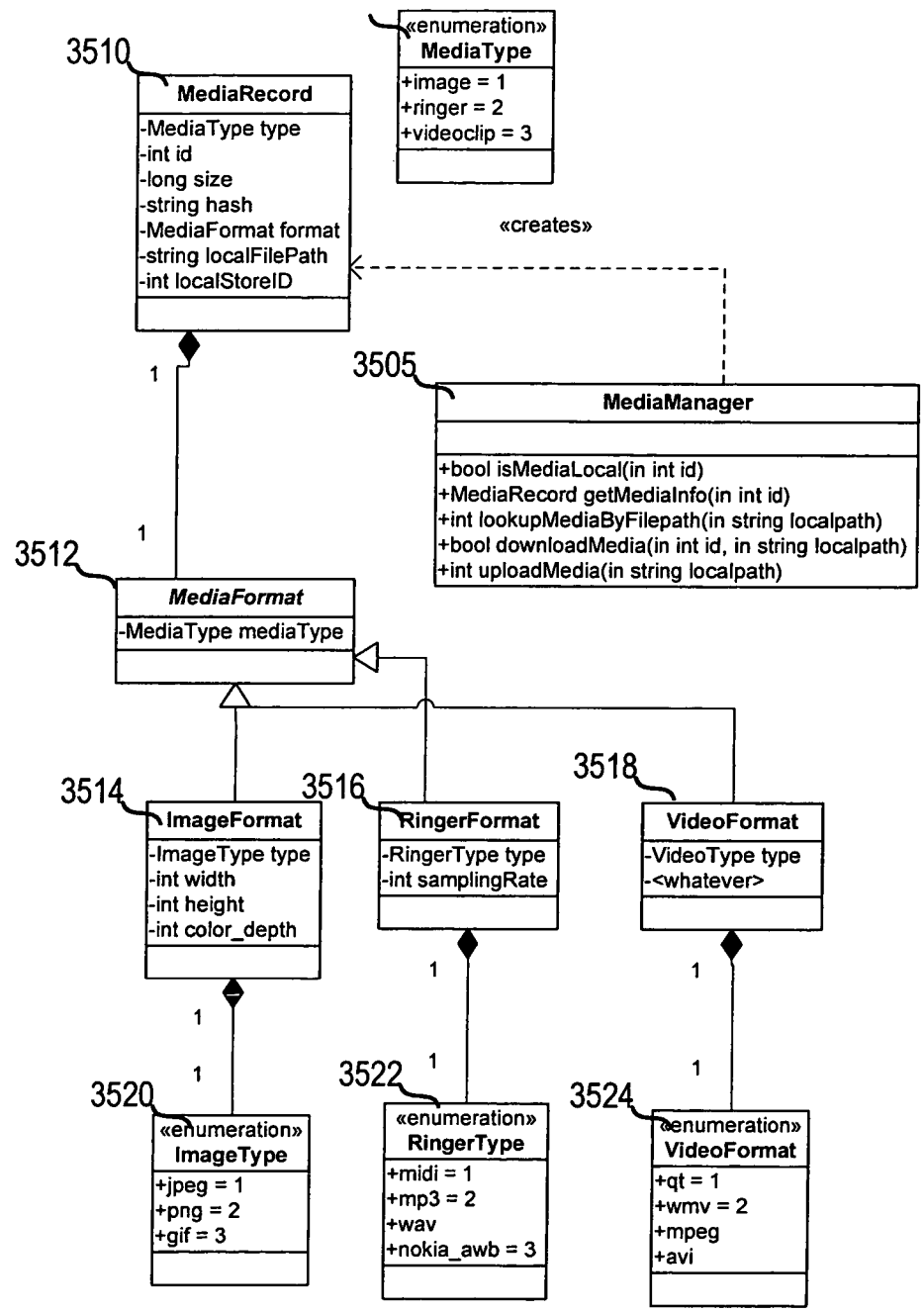
FIG. 35 is a structure illustrating the functions of the client side media manager in accordance with the present invention.

FIG. 35 illustrates a Media manager 3505 and the records associated with a piece of media information. The system supports digital rights media management. The MediaManager object provides an interface to the other client components which allows media uploading, media downloading, and retrieval of media information. Since each device has different capabilities, transcoding media objects from their original format is often required in order to support them on different devices. Transcoding refers to a process by which media in one format on one type of device or phone can be made available to other types of phones. For example, if a first user's phone creates pictures in JPG format, but a receiving user's phone only supports GIF, the system server can automatically convert the format of the image based on the server's knowledge of the receiving user's phone. This same process may be used to change the resolution of an image to fit properly on the target device's display, given its characteristics.

Transcoding can involve an actual conversion or may involve simply selecting an alternative version of the media it already knows about. For example, a value added service provider may supply ringtones in two or more formats, and selection of the appropriate format can be made and distributed to the receiving user. When requesting media requires the media object, the transcoding will be performed by the server; the transcoded media will be transmitted to the device automatically. Clients may query information related to the media they are about to download using a function supplied in the communications protocol. This function will return relevant information concerning the transcoded media available to the client. The server may also provide transcode-on-demand support for clients which need multiple formats of the same media (e.g., image) in different sizes (e.g., a thumbnail for the contact in the addressbook and a full screen picture).

FIG. 35 illustrates the digital rights media record format utilized in the client application and present invention. Media manager 3505 determines whether or not the information in any media utilized in the device, whether a jpeg, mp3 movie, or the like. This determines first determining whether the media is a locally implemented piece of media or media from a value added provider. The media manager maintains records of the media location, whether it is downloadable or uploadable and the like.

The system supports digital rights management contained in the native applications, allowing value added providers to check any media uploaded or downloaded to or from the server or client device to determine whether the information contained therein is subject to digitalized management. The media record 3510 which contains a media record type (local or nor) and identifier, size, hash value, a formula identifier, and a location. The media format 3512 can be any of an image format 3514, a ringer format 3516, a video format 3518. The image format type includes jpegs, pngs and gifs, as indicated at 3520. The ringtone format can be a midi-type or an mp3 wav or a special awp format. The video format can be an mpeg, wmp file, quicktime, or an avi. Additional formats for images, ringers, and videoclips may be easily added without requiring significant system modification.

The foregoing detailed description of the invention has been presented for purposes of illustration and description. It is not intended to be exhaustive or to limit the invention to the precise form disclosed. Many modifications and variations are possible in light of the above teaching. The described embodiments were chosen in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A computer-implemented method of providing an advanced caller identification service programmed in a memory of a device, comprising:
   maintaining in the device a store of subscriber persona information provided by users, the persona information identifying a user to other users;
   pushing persona information to a group of others based on an established relationship between subscribers, the group including a first subscriber having a phone and a second subscriber; and
   controlling the first subscriber's phone based on the second subscriber's persona information prior to establishing a communication link between the first subscriber and the second subscriber, wherein the controlling of the first subscriber's phone is performed by a client application on the first subscriber's phone, and controlling comprises one of:
   synchronizing persona information stored in a memory on the first subscriber's phone with the store of subscriber persona information in the memory of the device; and
   blocking an incoming call to the first subscriber's phone from the second subscriber's phone to automatically populate an address book on the first subscriber's phone with public information regarding the second subscriber.

2. The computer-implemented method of claim 1 wherein the method further includes the step of distributing client application to wireless devices to display persona information.

3. The computer-implemented of claim 1 further including the step of charging a fee for said method.

4. The computer-implemented of claim 1 further including the step of establishing subscriber accounts for subscribers and receiving at least one persona for a subscriber.

5. The computer-implemented of claim 1 further including the step of establishing links between subscribers who have established personas and distributing personas based on said link.

6. The computer-implemented of claim 1 wherein the method further includes the step of providing at least one default persona.

7. The computer-implemented of claim 1 wherein the method further includes receiving persona information including at least one of the following: a user name, user email addresses, phone numbers, physical addresses, birthday, instant messenger user identifiers, a movie; a ringtone; an image.

8. The computer-implemented of claim 1 wherein the persona information includes location information.

9. The computer-implemented of claim 8 wherein the location information includes GPS information.

10. The computer-implemented of claim 8 wherein the location information includes a user selectable granularity.

11. The computer-implemented of claim 8 further including the step of distributing a client application interpreting persona information.

12. A computer-implemented method of providing an advanced caller identification service, comprising:
    maintaining in a device a store of subscriber persona information provided by users, the persona information identifying the user to other users;
    pushing the persona information to the others based on an established relationship between subscribers, the group including a calling party and a called party;
    a client application on the calling party's phone displaying an alert on the calling party's phone when the calling party attempts to place a call to the called party's phone during the period of time that is included as part of the called party's persona information that is locally stored on the calling party's phone, the period of time indicating that the called party does not accept calls; and
    a client application on the called party's phone controlling the called party's phone based on the calling party's persona information prior to establishing a communication link between the called party and the calling party, wherein controlling comprises one of:
    synchronizing persona information stored in a memory on the called party's phone with the store of subscriber persona information of the device; and
    blocking an incoming call to the called party's phone from the calling party's phone to automatically populate an address book on the called party's phone with information regarding the calling party.

13. The computer-implemented method of claim 12, further comprising receiving, by the calling party's phone, a message that the call to the user's phone was blocked and the client application on the calling party's phone performing one of: terminating the attempted call to the user's phone and displaying, on the calling party's phone, the received message that the call to the user's phone was blocked.

* * * * *